United States Patent
Kaczur et al.

(10) Patent No.: US 10,047,446 B2
(45) Date of Patent: Aug. 14, 2018

(54) METHOD AND SYSTEM FOR ELECTROCHEMICAL PRODUCTION OF FORMIC ACID FROM CARBON DIOXIDE

(71) Applicant: Dioxide Materials, Inc., Boca Raton, FL (US)

(72) Inventors: Jerry J. Kaczur, North Miami Beach, FL (US); Hongzhou Yang, Boca Raton, FL (US); Syed Dawar Sajjad, Boca Raton, FL (US); Richard I. Masel, Boca Raton, FL (US)

(73) Assignee: Dioxide Materials, Inc., Boca Raton, FL (US)

( * ) Notice: Subject to any disclaimer, the term of this patent is extended or adjusted under 35 U.S.C. 154(b) by 0 days.

(21) Appl. No.: 15/260,213

(22) Filed: Sep. 8, 2016

(65) Prior Publication Data
US 2017/0037522 A1 Feb. 9, 2017

Related U.S. Application Data

(63) Continuation-in-part of application No. 14/704,934, filed on May 5, 2015, now Pat. No. 9,481,939, which
(Continued)

(51) Int. Cl.
*C25B 3/04* (2006.01)
*C25B 9/10* (2006.01)
(Continued)

(52) U.S. Cl.
CPC ............ *C25B 3/04* (2013.01); *B01J 41/14* (2013.01); *C25B 1/00* (2013.01); *C25B 1/02* (2013.01);
(Continued)

(58) Field of Classification Search
CPC ....................................................... C25B 3/04
See application file for complete search history.

(56) References Cited

U.S. PATENT DOCUMENTS

| 3,401,099 A | 9/1968 | McEvoy |
| 3,779,883 A * | 12/1973 | Heit ............... B01D 61/44 |
| | | 204/530 |

(Continued)

FOREIGN PATENT DOCUMENTS

| KR | 101360269 B1 | 2/2014 |
| WO | 2016039999 A1 | 3/2016 |

OTHER PUBLICATIONS

Mahmood et al, Use of gas-diffusion electrodes for high-rate electrochemical reduction of carbon dioxide. II> Reduction at metal phthalocyanine-impregnated electrodes, Journal of Applied Electrochemistry, vol. 17, No. 6, Nov. 1987, pp. 1223-1227 (Year: 1987).*

(Continued)

*Primary Examiner* — Harry D Wilkins, III
(74) *Attorney, Agent, or Firm* — Corridor Law Group, P.C.

(57) ABSTRACT

An electrochemical device converts carbon dioxide to a formic acid reaction product. The device includes an anode and a cathode, each comprising a quantity of catalyst. The anode and cathode each have reactant introduced thereto. Two membranes, a cation exchange polymer electrolyte membrane and an anion exchange polymer electrolyte membrane, are interposed between the anode and the cathode, forming a central flow compartment where a carbon dioxide reduction product, such as formic acid, can be recovered. At least a portion of the cathode catalyst is directly exposed to gaseous carbon dioxide during electrolysis. The average current density at the membrane is at least 20 mA/cm$^2$, measured as the area of the cathode gas diffusion layer that (Continued)

is covered by catalyst, and formate ion selectivity is at least 50% at a cell potential difference of 3.0 V. In some embodiments, at least one polymer electrolyte membrane comprises a polymer in which a constituent monomer is (p-vinylbenzyl)-R, where R is selected from the group consisting of imidazoliums, pyridiniums and phosphoniums. In some embodiments, the polymer electrolyte membrane is a Helper Membrane comprising a polymer containing an imidazolium ligand, a pyridinium ligand, or a phosphonium ligand.

34 Claims, 8 Drawing Sheets

Related U.S. Application Data is a continuation-in-part of application No. PCT/US2015/014328, filed on Feb. 3, 2015, and a continuation-in-part of application No. PCT/US2015/026507, filed on Apr. 17, 2015, which is a continuation-in-part of application No. PCT/US2015/014328, filed on Feb. 3, 2015, application No. 15/260,213, which is a continuation-in-part of application No. 15/090,477, filed on Apr. 4, 2016, now Pat. No. 9,580,824, which is a continuation-in-part of application No. 14/704,935, filed on May 5, 2015, now Pat. No. 9,370,773, which is a continuation-in-part of application No. PCT/US2015/014328, filed on Feb. 3, 2015, and a continuation-in-part of application No. PCT/US2015/026507, filed on Apr. 17, 2015, application No. 15/260,213, which is a continuation-in-part of application No. 15/158,227, filed on May 18, 2016, which is a continuation-in-part of application No. 14/704,935, filed on May 5, 2015, now Pat. No. 9,370,773, and a continuation-in-part of application No. 14/704,934, filed on May 5, 2015, now Pat. No. 9,481,939, and a continuation-in-part of application No. PCT/US2015/014328, filed on Feb. 3, 2015, and a continuation-in-part of application No. PCT/US2015/026507, filed on Apr. 17, 2015, application No. 15/260,213, which is a continuation-in-part of application No. PCT/US2015/014328, filed on Feb. 3, 2015, and a continuation-in-part of application No. PCT/US2015/026507, filed on Apr. 17, 2015, and a continuation-in-part of application No. PCT/US2016/045210, filed on Aug. 2, 2016, which is a continuation of application No. 15/090,477, filed on Apr. 4, 2016, now Pat. No. 9,580,824, and a continuation of application No. 15/158,227, filed on May 18, 2016.

(60) Provisional application No. 62/066,823, filed on Oct. 21, 2014.

(51) Int. Cl.
| | |
|---|---|
| C25B 1/02 | (2006.01) |
| C25B 15/08 | (2006.01) |
| C25B 15/02 | (2006.01) |
| B01J 41/14 | (2006.01) |
| C25B 13/08 | (2006.01) |
| C25B 9/08 | (2006.01) |
| C25B 1/00 | (2006.01) |
| C25B 1/04 | (2006.01) |
| H01M 8/1023 | (2016.01) |
| H01M 8/1053 | (2016.01) |
| H01M 4/86 | (2006.01) |

(52) U.S. Cl.
CPC ............ *C25B 1/04* (2013.01); *C25B 9/08* (2013.01); *C25B 9/10* (2013.01); *C25B 13/08* (2013.01); *C25B 15/02* (2013.01); *C25B 15/08* (2013.01); *H01M 4/8668* (2013.01); *H01M 8/1023* (2013.01); *H01M 8/1053* (2013.01); *H01M 2300/0082* (2013.01); *Y02E 60/366* (2013.01); *Y02P 70/56* (2015.11)

(56) References Cited

U.S. PATENT DOCUMENTS

| | | | |
|---|---|---|---|
| 3,896,015 A | | 7/1975 | McRae |
| 4,113,922 A | | 9/1978 | D'Agostino et al. |
| 4,430,445 A | | 2/1984 | Miyake et al. |
| 4,456,521 A | | 6/1984 | Solomon et al. |
| 5,883,762 A | * | 3/1999 | Calhoun ............... G11B 5/187 205/119 |
| 7,704,369 B2 | | 4/2010 | Olah et al. |
| 8,138,380 B2 | | 3/2012 | Olah et al. |
| 8,313,634 B2 | | 11/2012 | Bocarsly et al. |
| 8,357,270 B2 | | 1/2013 | Gilliam et al. |
| 8,414,758 B2 | | 4/2013 | Deguchi et al. |
| 8,449,652 B2 | | 5/2013 | Radosz et al. |
| 8,500,987 B2 | | 8/2013 | Teamey et al. |
| 8,524,066 B2 | | 9/2013 | Sivasankar et al. |
| 8,552,130 B2 | | 10/2013 | Lewandowski et al. |
| 8,562,811 B2 | | 10/2013 | Sivasankar et al. |
| 8,568,581 B2 | | 10/2013 | Sivasankar et al. |
| 8,592,633 B2 | | 11/2013 | Cole et al. |
| 8,658,016 B2 | | 2/2014 | Lakkaraju et al. |
| 8,663,447 B2 | | 3/2014 | Bocarsly et al. |
| 8,696,883 B2 | | 4/2014 | Yotsuhashi et al. |
| 8,721,866 B2 | | 5/2014 | Sivasankar et al. |
| 9,255,335 B2 | | 2/2016 | Kanan et al. |
| 9,267,212 B2 | * | 2/2016 | Twardowski ......... C07C 51/347 |
| 9,370,773 B2 | | 6/2016 | Masel et al. |
| 9,481,939 B2 | * | 11/2016 | Masel ..................... B01J 41/14 |
| 9,580,824 B2 | | 2/2017 | Masel et al. |
| 2009/0266230 A1 | | 10/2009 | Radosz et al. |
| 2011/0114501 A1 | * | 5/2011 | Teamey ............... B01D 53/326 205/351 |
| 2011/0114502 A1 | | 5/2011 | Cole et al. |
| 2011/0237830 A1 | | 9/2011 | Masel |
| 2012/0171583 A1 | | 7/2012 | Bocarsly et al. |
| 2012/0186446 A1 | | 7/2012 | Bara et al. |
| 2012/0247969 A1 | | 10/2012 | Bocarsly et al. |
| 2013/0105304 A1 | | 5/2013 | Kaczur et al. |
| 2013/0146448 A1 | | 6/2013 | Wang et al. |
| 2013/0175181 A1 | | 7/2013 | Kaczur |
| 2013/0180865 A1 | | 7/2013 | Cole et al. |
| 2013/0199937 A1 | | 8/2013 | Cole et al. |
| 2014/0206894 A1 | * | 7/2014 | Cole ..................... C25L 31/00 560/204 |
| 2014/0206895 A1 | * | 7/2014 | Twardowski ......... C07C 51/347 560/204 |
| 2014/0206896 A1 | * | 7/2014 | Sivasankar ........... C07C 51/347 560/204 |
| 2015/0171453 A1 | * | 6/2015 | Chikashige .......... H01M 8/1004 429/450 |
| 2015/0345034 A1 | | 12/2015 | Sundara et al. |
| 2016/0107154 A1 | * | 4/2016 | Masel ..................... B01J 41/14 252/62.2 |
| 2016/0108530 A1 | * | 4/2016 | Masel ..................... B01J 41/14 204/265 |
| 2016/0251766 A1 | * | 9/2016 | Masel ..................... C02F 1/461 204/252 |

OTHER PUBLICATIONS

Korean Office Action dated Sep. 13, 2016 in connection with Korean Patent Application No. 10-2016-7022952.

Dewulf et al., "The electrochemical reduction of CO2 to CH4 and C2H4 at cu/nafion electrodes (solid polymer electrolyte structures)", Catalysis Letters 1 (1988), pp. 73-80.

(56) References Cited

OTHER PUBLICATIONS

Kaneco et al., "Electrochemical conversion of carbon dioxide to methane in aqueous NaHCO3 solution at less than 273 K" Electrochimica Acta 48 (2002), pp. 51-55.
Lee et al., "Humidity-sensitive properties of new polyelectrolytes based on the copolymers containing phosphonium salt and phosphine function", J. Applied Polymer Science 89 (2003), pp. 1062-1070.
Tang et al., "Poly(ionic liquid)s as New Materials for CO2 Absorption", Journal of Polymer Science Part A: Polymer Chemistry 43 (2005), pp. 5477-5489.
Siroma et al., "Compact dynamic hydrogen electrode unit as a reference electrode for PEMFCs", J. of Power Sources 156 (2006), pp. 284-287.
Chen et al., "A Concept of Supported Amino Acid Ionic Liquids and Their Application in Metal Scavenging and Heterogeneous Catalysis", J. Am. Chem. Soc. 129 (2007), pp. 13879-13886.
Delacourt et al., "Design of an Electrochemical Cell Making Syngas (CO + H2) from CO2 and H2O Reduction at Room Temperature", J. of the Electrochemical Society 155 (2008), pp. B42-B49.
Wang et al., "Water-Retention Effect of Composite Membranes with Different Types of Nanometer Silicon Dioxide" Electrochemical and Solid State Letters 11 (2008), p. B201.
Luo et al., "Quaternized poly(methyl methacrylate-co-butyl acrylate-co-vinylbenzyl chloride) membrane for alkaline fuel cells", J. Power Sci. 195 (2010), pp. 3765-3771.
Tsutsumi et al., "A Test Method of a PEFC Single Cell with Reference Electrodes", Electrical Engineering in Japan, vol. 172, No. 1 (2010), pp. 1020-1026.
Li et al., "Novel anion exchange membranes based on polymerizable imidazolium salt for alkaline fuel cell applications", J. Mater. Chem. 21 (2011), pp. 11340-11346.
Narayanan et al., "Electrochemical Conversion of Carbon Dioxide to Formate in Alkaline Polymer Electrolyte Membrane Cells", J. of the Electrochemical Society 158 (2011), pp. A167-A173.
Rosen et al., "Ionic Liquid-Mediated Selective Conversion of CO2 to CO at Low Overpotentials", Science 334 (2011) pp. 643-644.
Weber et al., "Thermal and Ion Transport Properties of Hydrophilic and Hydrophobic Polymerized Styrenic Imidazolium Ionic Liquids", J. of Polymer Sci.: Part B: Polymer Phy. 49 (2011) pp. 1287-1296.
Sarode et al., "Designing Alkaline Exchange Membranes from Scratch", The Electrochemical Society, 220th ECS Meeting (2011).
Zhang et al., "Imidazolium functionalized polysulfone anion exchange membrane for fuel cell application", J. Mater. Chem. 21 (2011), pp. 12744-12752.
Aeshala et al., "Effect of solid polymer electrolyte on electrochemical reduction of CO2", Separation and Purification Technology 94 (2012), pp. 131-137.
Deavin et al., "Anion-Exchange Membranes for Alkaline Polymer Electrolyte Fuel Cells: Comparison of Pendent Benzyltrimethylammonium- and Benzylmethylimidazolium-Head-Groups", Energy Environ. Sci. 5 (2012), pp. 8584-8597.
Oh, "Synthesis and Applications of Imidazolium-Based Ionic Liquids and Their Polymer Derivatives", Dissertation at the Missouri University of Science and Technology (2012).
Qiu et al., "Alkaline Imidazolium- and Quaternary Ammonium-Functionalized Anion Exchange Membranes for Alkaline Fuel Cell Applications", J. Mater. Chem. 22 (2012), pp. 1040-1045.
Rosen et al., "In Situ Spectroscopic Examination of a Low Overpotential Pathway for Carbon Dioxide Conversion to Carbon Monoxide", J. of Physical Chemistry 116 (2012), pp. 15307-15312.
Aeshala et al., "Effect of cationic and anionic solid polymer electrolyte on direct electrochemical reduction of gaseous CO2 to fuel", Journal of CO2 Utilization 3-4 (2013), pp. 49-55.
Carmo et al., "A comprehensive review on PEM water electrolysis", International J. of Hydrogen Energy 38 (2013), pp. 4901-4934.
Chen et al., "Composite Blend Polymer Membranes with Increased Proton Selectivity and Lifetime for Vanadium Redox Flow Batteries", J. of Power Sources 231 (2013), pp. 301-306.
Genovese et al., "A gas-phase electrochemical reactor for carbon dioxide reduction back to liquid fuels", AIDIC Conference Series 11 (2013), pp. 151-160.
Hickner et al., "Anion Exchange Membranes: Current Status and Moving Forward", J. of Polymer Sci. 51 (2013), pp. 1727-1735.
Lin et al., "Alkaline Stable C2-Substituted Imidazolium-Based Anion-Exchange Membranes", Chem. Mater. 25 (2013), pp. 1858-1867.
Prakash et al., "Electrochemical reduction of CO2 over Sn-Nafion coated electrode for a fuel-cell-like device", J. of Power Sources 223 (2013), pp. 68-73.
Rosen et al., "Low temperature electrocatalytic reduction of carbon dioxide utilizing room temperature ionic liquids", Dissertation at the University of Illinois (2013).
Rosen et al., "Water Enhancement of CO2 Conversion on Silver in 1-Ethyl-3-Methylimidazolium Tetrafluoroborate", J. of the Electrochemical Society 160 (2013), pp. H138-H141.
Shironita et al., "Feasibility investigation of methanol generation by CO2 reduction using Pt/C-based membrane electrode assembly for a reversible fuel cell", J. of Power Sources 228 (2013), pp. 68-74.
Shironita et al., "Methanol generation by CO2 reduction at a PteRu/C electrocatalyst using a membrane electrode assembly", J. of Power Sources 240 (2013), pp. 404-410.
Thorson et al., "Effect of Cations on the Electrochemical Conversion of CO2 to CO", J. of the Electrochemical Society 160 (2013), pp. F69-F74.
Wu et al., "Electrochemical Reduction of Carbon Dioxide", J. of the Electrochemical Society 160 (2013), pp. F953-F957.
Aeshala et al., "Electrochemical conversion of CO2 to fuels: tuning of the reaction zone using suitable functional groups in a solid polymer electrolyte", Phys. Chem. Chem. Phys. 16 (2014), pp. 17588-17594.
Carlisle et al., "Vinyl-Functionalized Poly(imidazolium)s: A Curable Polymer Platform for Cross-Linked Ionic Liquid Gel Synthesis", Chem. Mater. 26 (2014), pp. 1294-1296.
Ma et al., "Efficient Electrochemical Flow System with Improved Anode for the Conversion of CO2 to CO", J. of the Electrochemical Society 161 (2014), pp. F1124-F1131.
Parrondo et al., "Degradation of Anion Exchange Membranes Used for Hydrogen Production by Ultrapure Water Electrolysis", Royal Soc. of Chem. Adv. 4 (2014), pp. 9875-9879.
Said et al., "Functionalized Polysulfones as an Alternative Material to Improve Proton Conductivity at Low Relative Humidity Fuel Cell Applications", Chemistry and Materials Research 6 (2014), pp. 19-29.
Shi et al., "A novel electrolysis cell for CO2 reduction to CO in ionic liquid/organic solvent electrolyte", Journal of Power Sources 259 (2014) pp. 50-53.
Varcoe et al., "Anion-exchange membranes in electrochemical energy systems", Energy Environ. Sci. 7 (2014), pp. 3135-3191.
International Search Report and Written Opinion dated Jul. 6, 2015 in connection with International Application PCT/US2015/014328.
International Search Report and Written Opinion dated Jul. 20, 2015 in connection with International Application PCT/US2015/026507.
Kim et al., "Influence of dilute feed and pH on electrochemical reduction of CO2 to CO on Ag in a continuous flow electrolyzer", Electrochimica Acta 166 (2015), pp. 271-276.
Schauer et al., "Polysulfone-based anion exchange polymers for catalyst binders in alkaline electrolyzers", Journal of Applied Polymer Science (2015), pp. 1-7.
Xiaoming Yan et al. "Imidazolium-functionalized poly(ether ether ketone) as membrane and electrode ionomer for low-temperature alkaline membrane direct methanol fuel cell", Journal of Power Sources, vol. 250, Nov. 8, 2013, pp. 90-97.
Partial International Search Report dated Nov. 24, 2016 in connection with International Application PCT/US2016/045210.
International Search Report and Written Opinion dated Jan. 20, 2017 in connection with International Application No. PCT/US2016/045210.
Patent Examination Report dated Mar. 22, 2017 in connection with U.S. Appl. No. 15/158,227.

(56) References Cited

OTHER PUBLICATIONS

International Preliminary Report on Patentability dated May 4, 2017 in connection with International Application No. PCT/US2015/014328.
International Preliminary Report on Patentability dated May 4, 2017 in connection with International Application No. PCT/US2015/026507.
Patent Examination Report dated May 26, 2017 in connection with U.S. Appl. No. 15/400,775.
Patent Examination Report dated May 29, 2017 in connection with Korean Patent Application No. 10-2016-7022952.
Patent Examination Report dated Jun. 29, 2017 in connection with Australian Application No. 2015337093.
International Search Report and Written Opinion dated Jul. 12, 2017 in connection with International Application PCT/US2017/025628.
International Search Report and Written Opinion dated Aug. 16, 2017 in connection with International Application PCT/US2017/025624.

* cited by examiner

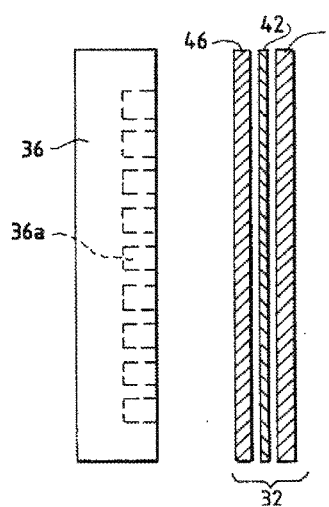
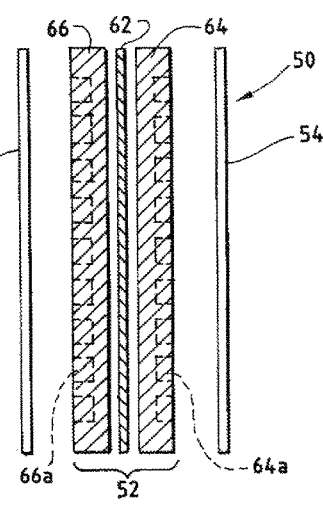
FIG. 1  FIG. 2
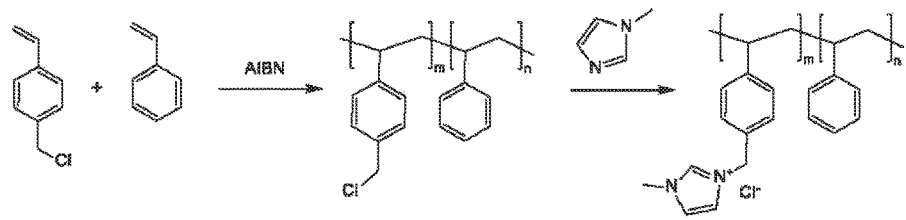
FIG. 3

METHOD AND SYSTEM FOR ELECTROCHEMICAL PRODUCTION OF FORMIC ACID FROM CARBON DIOXIDE

CROSS-REFERENCE TO RELATED APPLICATIONS

The present application is a continuation-in-part of U.S. non-provisional patent application Ser. No. 14/704,934, filed on May 5, 2015, entitled "Electrochemical Device for Converting Carbon Dioxide to a Reaction Product". The '934 non-provisional application is a continuation-in-part of International Application No. PCT/US2015/14328, filed on Feb. 3, 2015, entitled "Electrolyzer and Membranes". The '328 international application also claimed priority benefits from U.S. provisional patent application Ser. No. 62/066,823, filed on Oct. 21, 2014.

The '934 non-provisional application is also a continuation-in-part of International Application No. PCT/US2015/26507, filed on Apr. 17, 2015, entitled "Electrolyzer and Membranes". The '507 international application is a continuation-in-part of the '328 international application. The '934 non-provisional application also claims priority benefits from the '823 provisional application.

The present application is also a continuation-in-part of U.S. non-provisional patent application Ser. No. 15/090,477, filed on Apr. 4, 2016, entitled "Ion-Conducting Membranes". The '477 non-provisional application is a continuation-in-part of U.S. non-provisional patent application Ser. No. 14/704,935 filed on May 5, 2015, entitled "Ion-Conducting Membranes" (now U.S. Pat. No. 9,370,773). The '935 non-provisional application is a continuation-in-part of the '328 international application, which claims priority benefits from the '823 provisional application. The '935 non-provisional application is also a continuation-in-part of the '507 international application.

The present application is also a continuation-in-part of U.S. non-provisional patent application Ser. No. 15/158,227 filed on May 18, 2016, entitled "Catalyst Layers and Electrolyzers". The '227 non-provisional application is a continuation-in-part of the '935 non-provisional application. The '227 non-provisional application is also a continuation-in-part of the '934 non-provisional application, a continuation-in-part of the '328 international application, and a continuation-in-part of the '507 international application.

The present application is also a continuation-in-part of the '328 international application, a continuation-in-part of the '507 international application, and a continuation-in-part of international application No. PCT/US2016/45210, filed on Aug. 2, 2016, entitled "Catalyst Layers and Electrolyzers". The '210 international application is a continuation of the '477 non-provisional application and the '227 non-provisional application.

The '823 provisional application, the '934 non-provisional application, the '477 non-provisional application, the '227 non-provisional application, the '328 international application, the '507 international application, and the '210 international application are each hereby incorporated by reference herein in their entirety.

This application is also related to U.S. patent application Ser. No. 12/830,338, filed on Jul. 4, 2010, entitled "Novel Catalyst Mixtures" (now abandoned); international application No. PCT/2011/030098, filed on Mar. 25, 2011, entitled "Novel Catalyst Mixtures" (now expired); U.S. patent application Ser. No. 13/174,365, filed on Jun. 30, 2011, entitled "Novel Catalyst Mixtures"; international application No. PCT/US2011/042809, filed on Jul. 1, 2011, entitled "Novel Catalyst Mixtures"; U.S. patent application Ser. No. 13/530,058, filed on Jun. 21, 2012, entitled "Sensors for Carbon Dioxide and Other End Uses"; international application No. PCT/US2012/043651, filed on Jun. 22, 2012, entitled "Low Cost Carbon Dioxide Sensors"; U.S. patent application Ser. No. 13/445,887, filed on Apr. 12, 2012, entitled "Electrocatalysts for Carbon Dioxide Conversion"; U.S. patent application Ser. No. 13/775,935, filed on Feb. 24, 2013, entitled "Carbon Dioxide Conversion to Fuels and Chemicals" (now U.S. Pat. No. 9,193,593); and U.S. patent application Ser. No. 14/035,935, filed on Sep. 24, 2013, entitled "Devices and Processes for Carbon Dioxide Conversion into Useful Fuels and Chemicals" (now U.S. Pat. No. 9,181,625).

STATEMENT OF GOVERNMENT INTEREST

This invention was made, at least in part, with U.S. government support under ARPA-E Contract No. DE-AR-0000345 and the Department of Energy under Contract No. DE-SC0004453. The government has certain rights in the invention.

FIELD OF THE INVENTION

The field of the invention is electrochemistry. The devices and systems described involve the electrochemical conversion of carbon dioxide into useful products, the electrolysis of water, electric power generation using fuel cells and electrochemical water purification. In particular, the present disclosure generally relates to a method and system for the production of formic acid as well as other products from the electrochemical reduction of carbon dioxide.

BACKGROUND OF THE INVENTION

There is a desire to decrease carbon dioxide ($CO_2$) emissions from industrial facilities and power plants as a way of reducing global warming and protecting the environment. One solution, known as carbon sequestration, involves the capture and storage of $CO_2$. Often the $CO_2$ is simply buried. It would be beneficial if instead of simply burying or storing the $CO_2$, it could be converted into another product and put to a beneficial use.

Over the years, a number of electrochemical processes have been suggested for the conversion of $CO_2$ into useful products. Some of these processes and their related catalysts are discussed in U.S. Pat. Nos. 3,959,094; 4,240,882; 4,349,464; 4,523,981; 4,545,872; 4,595,465; 4,608,132; 4,608,133; 4,609,440; 4,609,441; 4,609,451; 4,620,906; 4,668,349; 4,673,473; 4,711,708; 4,756,807; 4,818,353; 5,064,733; 5,284,563; 5,382,332; 5,457,079; 5,709,789; 5,928,806; 5,952,540; 6,024,855; 6,660,680; 6,664,207; 6,987,134; 7,157,404; 7,378,561; 7,479,570; U.S. Patent App. Pub. No. 2008/0223727; Hori, Y., "Electrochemical $CO_2$ reduction on metal electrodes", *Modern Aspects of Electrochemistry* 42 (2008), pages 89-189; Gattrell, M. et al. "A review of the aqueous electrochemical reduction of $CO_2$ to hydrocarbons at copper", *Journal of Electroanalytical Chemistry* 594 (2006), pages 1-19; and DuBois, D., *Encyclopedia of Electrochemistry*, 7a, Springer (2006), pages 202-225.

Processes utilizing electrochemical cells for chemical conversions have been known for years. Generally, an electrochemical cell contains an anode, a cathode and an electrolyte. Catalysts can be placed on the anode, the cathode, and/or in the electrolyte to promote the desired chemical reactions. During operation, reactants or a solution containing reactants are fed into the cell. A voltage (potential difference) is then applied between the anode and the cathode, to promote the desired electrochemical reaction.

Formic acid is one of the chemical products considered as a potential $CO_2$ conversion product. Formic acid is an important industrial chemical with a manufacturing volume of more than a million tons annually. Formic acid is used as a preservative in livestock feed, in leather tanning, and in making fine chemicals. The current commercial process for manufacturing formic acid is from the carbonylation of methanol, in which carbon monoxide and methanol are reacted in the presence of a strong base, such as sodium methoxide. The methyl formate product can then be hydrolyzed by various routes to form formic acid. The formic acid product can then be purified and concentrated by various methods to make commercial formic product concentrations of 85% and 99% by weight. Depending on the hydrolysis process employed, various byproducts, such as ammonium sulfate, can be formed and managed. In this disclosure, an electrochemically efficient method for the conversion of $CO_2$ to formic acid is disclosed.

Chinese patent publication No. 103741164A, U.S. Pat. Nos. 8,562,811 and 9,315,913 discuss how to raise the current and Faradaic efficiency into the practical range. Generally, quite high (negative) cathode potentials are needed to achieve reasonable currents. For example, Chinese patent publication No. 103741164A reports a potential of −1.8 V vs. the standard hydrogen electrode (SHE,) U.S. Pat. No. 8,562,811 reports a potential of −1.46 V vs. the standard calomel electrode (SCE, equal to −1.22 V vs. SHE,) and U.S. Pat. No. 9,315,913 reports a potential of −1.8 vs. Ag/AgCl (equals −1.58 vs. SHE). In practice, a lower cathode potential is desired to achieve reasonable results.

When an electrochemical cell is used as a $CO_2$ conversion system, a reactant comprising $CO_2$, carbonate or bicarbonate is fed into the cell. A voltage is applied to the cell, and the $CO_2$ reacts to form new chemical compounds.

Several different cell designs have been used for $CO_2$ conversion. Most of the early work used liquid electrolytes between the anode and cathode, while later scientific papers discussed using solid electrolytes.

U.S. Pat. Nos. 4,523,981, 4,545,872 and 4,620,906 disclose the use of a solid polymer electrolyte membrane, typically a cation exchange membrane, in which the anode and cathode are separated by the cation exchange membrane. More recent examples of this technique include U.S. Pat. Nos. 7,704,369; 8,277,631; 8,313,634; 8,313,800; 8,357,270; 8,414,758; 8,500,987; 8,524,066; 8,562,811; 8,568,581; 8,592,633; 8,658,016; 8,663,447; 8,721,866; and 8,696,883. In these patents, a liquid electrolyte is used in contact with a cathode.

Prakash, G., et al. "Electrochemical reduction of $CO_2$ over Sn-Nafion™ coated electrode for a fuel-cell-like device", *Journal of Power Sources* 223 (2013), pages 68-73 ("PRAKASH"), discusses the advantages of using a liquid free cathode in a cation exchange membrane style $CO_2$ electrolyzer, although it fails to teach a liquid free cathode. Instead, a liquid solution is fed into the cathode in the experiments discussed in PRAKASH.

In a liquid free cathode electrolyzer no bulk liquids are in direct contact with the cathode during electrolysis; however, there can be a thin liquid film on or in the cathode. In addition, the occasional wash or rehydration of the cathode with liquids can occur. Advantages of using a liquid free cathode included better $CO_2$ mass transfer and reduced parasitic resistance.

Dewolf, D., et al., "The electrochemical reduction of $CO_2$ to $CH_4$ and $C_2H_4$ at Cu/Nafion™ electrodes (solid polymer electrolyte structures)" *Catalysis Letters* 1 (1988), pages 73-80 ("DEWOLF"), discloses the use of a liquid free cathode in a cation exchange membrane electrolyzer, namely., an electrolyzer with a cation-conducting polymer electrolyte membrane separating the anode from the cathode. DEWOLF reports an observed maximum Faradaic efficiency (the fraction of the electrons applied to the cell that participate in reactions producing carbon containing products) of 19% for $CO_2$ conversion into useful products, and a small steady state current of 1 $mA/cm^2$.

Various attempts have been made to develop a dry cell to be used in a $CO_2$ conversion system, as indicated in Table 1 below. However, a system in which the Faradaic efficiency in a constant voltage experiment is greater than 32% has not been achieved. Furthermore, the reported rates of $CO_2$ conversion current (calculated as the product of the Faradaic efficiency for $CO_2$ conversion and the current in the cell after 30 minutes of operation) have been less than 5 $mA/cm^2$, which is too small for practical uses.

There are a few reports that claim higher conversion efficiencies. In particular, Shironita, S., et al., "Feasibility investigation of methanol generation by $CO_2$ reduction using Pt/C-based membrane electrode assembly for a reversible fuel cell", *J. Power Sources* 228 (2013), pages 68-74 ("SHIRONITA I"), and Shironita, S., et al., "Methanol generation by $CO_2$ reduction at a Pt—Ru/C electrocatalyst using a membrane electrode assembly", *J. Power Sources* 240 (2013), pages 404-410 ("SHIRONITA II"), reported "coulombic efficiencies" up to 70%. However columbic efficiency is different from Faradaic efficiency. A system can have a high coulombic efficiency for the production of species adsorbed on the electrocatalyst, but may only observe a small Faradaic efficiency (0.03% in SHIRONITA I and SHIRONITA II) for products that leave the catalyst layer. This phenomenon is adequately explained in Rosen, B. A., et al., "In Situ Spectroscopic Examination of a Low Overpotential Pathway for Carbon Dioxide Conversion to Carbon Monoxide", *J. Phys. Chem. C*, 116 (2012), pages 15307-15312, which found that when $CO_2$ is reduced to adsorbed CO during $CO_2$ conversion by cyclic voltammetry, most of the CO does not leave the electrolyzer.

Recently, U.S. patent application publication No. US2012/0171583 (the '583 publication) disclosed a cation exchange membrane design that could be run with a liquid free cathode. The application states that a "system can provide selectivity of methanol as part of the organic product mixture, with a 30% to 95% Faradaic yield for carbon dioxide to methanol, with the remainder evolving hydrogen." However, the application does not provide data demonstrating a 30% to 95% Faradaic yield. Furthermore, in trying to repeat the experiment, a steady state Faradaic efficiency near zero during room temperature electrolysis was observed. These results are further laid out in Comparative Example 1 below.

In conclusion, Faradaic efficiencies of less than 30% are not practical. A process that has a Faradaic efficiency of at least 50%, preferably over 80%, would provide a practical solution. Furthermore, a device with a low $CO_2$ conversion current is impractical. A device with a $CO_2$ conversion current of at least 25 $mA/cm^2$ would also provide a practical solution.

SUMMARY OF THE INVENTION

The low Faradaic efficiencies and conversion currents seen in present $CO_2$ electrolyzers with liquid free cathodes can be overcome utilizing an anion exchange membrane in an electrolyzer design for the production of formic acid. The definition and examples of a suitable anion exchange membrane are provided later in this document.

The present disclosure is directed to a method and system for the electrochemical production of formic acid utilizing a divided electrochemical cell having three electrochemical compartments or regions in which two different polymeric ion exchange membranes form, define, or separate the cell into an anode compartment, a cathode compartment, and a central flow compartment.

An anion exchange membrane can be directly positioned between a gas diffusion electrode (GDE) cathode structure and the central flow compartment. The GDE cathode structure can contain an anion exchange polymer that can work in conjunction with the anion exchange membrane in promoting the cathodic reduction of $CO_2$ to formic acid. $CO_2$ is reduced to formate ions ($HCOO^-$) at the cathode GDE electrocatalyst layer (CL). The utilization of an anion exchange membrane, which does not permit the bulk flow of liquid to the GDE, provides that the gas diffusion electrode (GDE) structure does not flood under the aqueous liquid hydrostatic pressure of the aqueous formic acid solution formed in the central flow compartment. The anion exchange membrane can allow for the transport of the formate ions generated in the GDE catalyst layer through the membrane and into the central flow compartment. The anion membrane also can allow for the transport of water to the GDE catalyst layer through the membrane. The $CO_2$ supplied to the GDE cathode can preferably be suitably humidified with water vapor, such that the membrane in contact with the CL stays sufficiently hydrated during electrochemical operation.

A cation exchange membrane can be positioned between the anode and the central flow compartment. The central flow compartment can preferably contain an ionically conductive ion exchange medium. The anode compartment, consisting of an anode structure containing an anode reaction electrocatalyst and aqueous anolyte solution, can be where an anodic oxidation reaction occurs, such as the oxidation of water, which can produce oxygen as a product in addition to $H^+$ ions.

The central flow compartment can be a region bounded by a cation exchange membrane helping form the anode compartment of the cell on one side and an anion exchange membrane on the other side forming the cathode compartment of the cell. The central flow compartment can be where aqueous formic acid is formed from the ionic combination of the hydrogen ions ($H^+$) generated in the anode compartment, passing through the anode side cation exchange membrane, and the flow of formate ions generated at the cathode and passing through from the cathode side anion exchange membrane to the central flow compartment.

The central flow compartment can be a thin, empty compartment for collecting the formic acid product, or preferably, can contain either an ion conductive fill material such as a weak or strong acid cation exchange material or a strong base anion exchange material. The preferable ion conducting material would help promote the transport of $H^+$ ions as well as the formate ions in the formation of formic acid, as well as providing a suitable ionic conductivity in the central flow compartment to reduce the voltage drop of the compartment.

The anode compartment can consist of an anode current collector and current collector standoffs that can pass the electrical current to the anode, where the cell anode oxidation reaction occurs. The anode structure can consist of various types of structures that can contain an electrocatalyst for promoting the anode reaction. Examples are conductive metal type electrocatalyst coatings applied onto titanium mesh or fiber structures, or can be conductive non-metal forms such as carbon paper having an applied nanoparticle electrocatalyst layer where the anode reactions can occur. The choice of the anode types and electrocatalysts employed depend on the type of anode reaction selected for the electrochemical cell.

The disclosed electrochemical cell method and system can include the use of suitable gas diffusion electrodes (GDE's) for both the anode and/or cathode reactions, for example an electrochemical cell utilizing a hydrogen consuming or hydrogen oxidation anode that reacts with gas phase hydrogen to produce hydrogen ions ($H^+$) or protons in the electrochemical cell anolyte reaction.

In accordance with the foregoing parameters, an improved electrochemical device converts $CO_2$ to a reaction product. The device comprises:
(a) an anode comprising a quantity of anode catalyst, the anode having an anode reactant introduced thereto via at least one anode reactant flow channel;
(b) a cathode comprising a quantity of cathode catalyst, the cathode having a cathode reactant introduced thereto via at least one cathode reactant flow channel;
(c) a central flow compartment, located between the anode and the cathode having an inlet solution feed and an outlet solution product output;
(d) a cation exchange membrane interposed between the anode and the central flow compartment;
(e) an anion exchange membrane interposed between the central flow compartment and the cathode; and
(f) a source of electrical energy that applies a potential difference across the anode and the cathode.

In the foregoing electrochemical device, the cathode is encased in a cathode chamber and at least a portion of the cathode catalyst is directly exposed to gaseous $CO_2$ during electrochemical conversion of the $CO_2$ to the reaction product.

In a preferred embodiment of the foregoing electrochemical device, the central flow compartment comprises an acidic medium. This embodiment satisfies a test comprising:
(1) with the anode open to atmospheric air, introducing a stream of $CO_2$ humidified at 50° C. into the cathode chamber while the device is at room temperature and atmospheric pressure;
(2) applying a potential difference of 3.5 V across a cell via an electrical connection between the anode and the cathode with the device at room temperature;
(3) measuring the current across the cell and the concentration and production rates of formic acid in the central flow compartment and production rate of CO and $H_2$ at the exit of the cathode chamber;
(4) calculating the formate ion selectivity, $Selectivity_{FO}$, as follows:

$$Selectivity_{FO} = \frac{\text{(Formate ion production rate)}}{\text{(CO production rate} + H_2 \text{ production rate} + \text{Formate ion production rate)}}$$

where the CO, $H_2$ and formate ion production rates are measured in moles per minute leaving the electrolyzer;
(5) performing steps (1)-(4) with room temperature water being directed to the anode; and (6) determining that the device has satisfied the test if the average current density at the membrane is at least 20 mA/cm$^2$, where the cm$^2$ is measured as the area of the cathode gas diffusion layer on which the catalyst is disposed, and formate ion selectivity is at least 25% at a cell potential difference of 3.5 V.

In a preferred embodiment of the foregoing electrochemical device, at least 50% by mass of the cathode catalyst is directly exposed to gaseous CO$_2$ during electrochemical conversion of the CO$_2$ to the reaction product. In this embodiment, the gaseous CO$_2$ is preferably directed within 2 mm of the cathode catalyst or the gas diffusion layer on which the cathode catalyst is disposed. In this embodiment, at least 90% by mass of the cathode catalyst is preferably directly exposed to gaseous CO$_2$ during electrochemical conversion of the CO$_2$ to the reaction product.

In a preferred embodiment of the foregoing electrochemical device, the central flow compartment contains a structure comprising an ion exchange resin.

In a preferred embodiment of the foregoing electrochemical device, at least a portion of the anion exchange membrane is a Helper Membrane identifiable by applying a test comprising:

(1) preparing a cathode comprising 6 mg/cm$^2$ of silver nanoparticles on a carbon fiber paper gas diffusion layer;

(2) preparing an anode comprising 3 mg/cm$^2$ of RuO$_2$ on a carbon fiber paper gas diffusion paper;

(3) preparing a polymer electrolyte membrane test material;

(4) interposing the membrane test material between the anode and the cathode, the side of cathode having the silver nanoparticles disposed thereon facing one side of the membrane and the side of the anode having RuO$_2$ disposed thereon facing the other side of the membrane, thereby forming a membrane electrode assembly;

(5) mounting the membrane electrode assembly in a fuel cell hardware assembly having cathode reactant flow channels and anode reactant flow channels;

(6) directing a stream of CO$_2$ humidified at 50° C. into the cathode reactant flow channels while the fuel cell hardware assembly is at room temperature and atmospheric pressure, with the anode reactant flow channels left open to the atmosphere at room temperature and pressure;

(7) applying a potential difference of 3.0 V across the cell via an electrical connection between the anode and the cathode;

(8) measuring the current across the cell and the concentration of CO and H$_2$ at the exit of the cathode flow channel;

(9) calculating the CO selectivity as follows:

$$\text{Selectivity} = \frac{(\text{CO production rate})}{(\text{CO production rate} + \text{H}_2 \text{ production rate})};$$

and where the CO and H$_2$ production rates are measured in moles per minute leaving the electrolyzer;

(10) identifying the membrane as a Helper Membrane if the average current density at the membrane is at least 20 mA/cm$^2$, where the cm$^2$ is measured as the area of the cathode gas diffusion layer that is covered by catalyst particles, and CO selectivity is at least 50% at a cell potential difference of 3.0 V.

In a preferred embodiment of the foregoing electrochemical device, the anion exchange membrane is entirely a Helper Membrane.

In a preferred embodiment of the foregoing electrochemical device, the anion exchange membrane comprises a polymer comprising at least one of:
(a) a positive charged cyclic amine,
(b) an imidazolium,
(c) a pyridinium,
(d) a guanidinium, and
(e) a phosphonium.

In a preferred embodiment of the foregoing electrochemical device:
(a) the anode catalyst is applied as a coating on the cation exchange membrane, or as a coating on a substrate, in which the anode catalyst is facing the cation exchange membrane, and
(b) the cathode catalyst is applied as a coating on the anion exchange membrane, or as a coating on a substrate, in which the cathode catalyst is facing the anion exchange membrane.

In a preferred embodiment of the foregoing electrochemical device, the potential difference is 5 V or less.

In a preferred embodiment of the foregoing electrochemical device, the reaction product is selected from the group consisting of CO, HCO$^-$, H$_2$CO, (HCO$_2$)$^-$, H$_2$CO$_2$, CH$_3$OH, CH$_4$, C$_2$H$_4$, CH$_3$CH$_2$OH, CH$_3$COO$^-$, CH$_3$COOH, C$_2$H$_6$, (COOH)$_2$, (COO$^-$)$_2$, H$_2$C=CHCOOH, and CF$_3$COOH.

In a preferred embodiment of the foregoing electrochemical device, the cathode catalyst further comprises a Catalytically Active Element. In this embodiment, the Catalytically Active Element is selected from the group: Au, Ag, Cu, Sn, Sb, Bi, Pb, Zn and In.

In a preferred embodiment of the foregoing electrochemical device, the anion exchange membrane comprises a polymer in which at least one constituent monomer is (p-vinylbenzyl)-R, where R is selected from the group consisting of positively charged cyclic amines, imidazoliums, pyridiniums and phosphoniums, and in which the membrane comprises 15%-90% by weight of polymerized (p-vinylbenzyl)-R.

In the foregoing embodiment, the anion exchange membrane comprises a polymer in which at least one constituent monomer is styrene. In this embodiment, the membrane has a thickness of 25-1000 micrometers. In this embodiment, the anion exchange membrane preferably further comprises a copolymer of at least one of methyl methacrylate and butylacrylate. The anion exchange membrane can further comprise at least one of a polyolefin, a chlorinated polyolefin, a fluorinated polyolefin, and a polymer comprising at least one of cyclic amines, phenyls, nitrogen and carboxylate (—COO—) groups in its repeating unit.

In the foregoing embodiment, R is preferably selected from at least one of:
(a) imidazoliums of the formula:

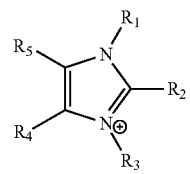

where R$_1$-R$_5$ are each independently selected from the group consisting of hydrogen, halides, linear alkyls, branched alkyls, cyclic alkyls, heteroalkyls, aryls, heteroaryls, alkylaryls, heteroalkylaryls, and polymers thereof;
(b) pyridiniums of the formula:

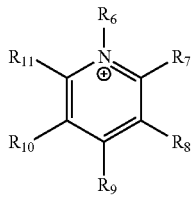

where $R_6$-$R_{11}$ are each independently selected from the group consisting of hydrogen, halides, linear alkyls, branched alkyls, cyclic alkyls, heteroalkyls, aryls, heteroaryls, alkylaryls, heteroalkylaryls, and polymers thereof; and
(c) phosphoniums of the formula:

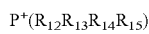

where $R_{12}$-$R_{15}$ are each independently selected from the group consisting of hydrogen, halides, linear alkyls, branched alkyls, cyclic alkyls, heteroalkyls, aryls, heteroaryls, alkylaryls, heteroalkylaryls, and polymers thereof.

In the foregoing embodiment, R is preferably an imidazolium, pyridinium or polymer thereof, in which no aromatic nitrogen is attached to hydrogen.

In accordance with the foregoing parameters, an improved electrochemical device for converts $CO_2$ to a reaction product. The device comprises:
(a) an anode comprising a quantity of anode catalyst, the anode having an anode reactant introduced thereto via at least one anode reactant flow channel;
(b) a cathode comprising a quantity of cathode catalyst, the cathode having a cathode reactant introduced thereto via at least one cathode reactant flow channel;
(c) a central flow compartment, located between the anode and the cathode having an inlet solution feed and an outlet solution product output;
(d) a cation exchange membrane interposed between the anode and the central flow compartment; and
(e) an anion exchange membrane interposed between the central flow compartment and the cathode.

In a preferred embodiment of the foregoing electrochemical device, the cathode is encased in a cathode chamber and at least a portion of the cathode catalyst is directly exposed to gaseous $CO_2$ during conversion of $CO_2$ to a reaction product. The cathode preferably comprises a cathode catalyst layer comprising an anion exchange polymer.

In the foregoing embodiment, the reaction current is preferably higher with the anion exchange polymer in the cathode catalyst layer than without the anion exchange polymer in the cathode catalyst layer.

In the foregoing embodiment, the selectivity to a desired product is preferably higher with the anion exchange polymer in the cathode catalyst layer than without the anion exchange polymer in the cathode catalyst layer.

In the foregoing embodiment, the $CO_2$ reaction product is preferably selected from the group consisting of CO, $HCO^-$, $H_2CO$, $(HCO_2)^-$, $H_2CO_2$, $CH_3OH$, $CH_4$, $C_2H_4$, $CH_3CH_2OH$, $CH_3COO^-$, $CH_3COOH$, $C_2H_6$, $(COOH)_2$, $(COO^-)_2$, $H_2C=CHCOOH$, and $CF_3COOH$. In this embodiment, the $CO_2$ reaction product is the formate ion or formic acid.

In the foregoing embodiment, the anion exchange membrane further comprises a Catalytically Active Element. In this embodiment, the Catalytically Active Element is preferably selected from the group consisting of Au, Ag, Cu, Sn, Sb, Bi, Pb, Zn and In.

In the foregoing embodiment, the anion exchange polymer of the cathode catalyst layer preferably comprises a polymer in which at least one constituent monomer is (p-vinylbenzyl)-R, where R is selected from the group consisting of imidazoliums, pyridiniums and phosphoniums, and in which the membrane comprises 15%-90% by weight of polymerized (p-vinylbenzyl)-R. In this embodiment, the anion exchange polymer preferably comprises a polymer in which at least one constituent monomer is styrene.

In the foregoing embodiment, the anion exchange membrane interposed between the central flow compartment and the cathode preferably has a thickness of 25-1000 micrometers. In this embodiment, the anion exchange polymer of the cathode catalyst layer preferably further comprises a copolymer of at least one of methyl methacrylate and butylacrylate. The anion exchange polymer of the cathode catalyst layer preferably further comprises at least one of a polyolefin, a chlorinated polyolefin, a fluorinated polyolefin, and a polymer comprising at least one of cyclic amines, phenyls, nitrogen and carboxylate (—COO—) groups in its repeating unit. In this embodiment, R is preferably selected from at least one of:
(a) imidazoliums of the formula:

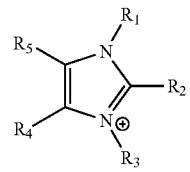

where $R_1$-$R_5$ are each independently selected from the group consisting of hydrogen, halides, linear alkyls, branched alkyls, cyclic alkyls, heteroalkyls, aryls, heteroaryls, alkylaryls, heteroalkylaryls, and polymers thereof;
(b) pyridiniums of the formula:

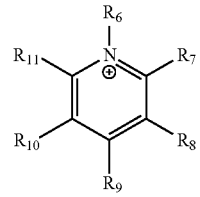

where $R_6$-$R_{11}$ are each independently selected from the group consisting of hydrogen, halides, linear alkyls, branched alkyls, cyclic alkyls, heteroalkyls, aryls, heteroaryls, alkylaryls, heteroalkylaryls, and polymers thereof; and
(c) phosphoniums of the formula:

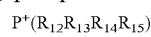

where $R_{12}$-$R_{15}$ are each independently selected from the group consisting of hydrogen, halides, linear alkyls, branched alkyls, cyclic alkyls, heteroalkyls, aryls, heteroaryls, alkylaryls, heteroalkylaryls, and polymers thereof.

In the foregoing embodiment, R is preferably an imidazolium, pyridinium or polymer thereof, in which no aromatic nitrogen is attached to hydrogen.

It is to be understood that both the foregoing general description and the following detailed description are exemplary and explanatory only and are not necessarily restrictive of the present disclosure. The accompanying drawings, which are incorporated in and constitute a part of the specification, illustrate subject matter of the disclosure. Together, the descriptions and the drawings serve to explain the principles of the disclosure.

Anion Helper Membrane

Helper Membranes are related to the Helper Catalysts described in earlier U.S. patent application Ser. Nos. 12/830,338 and 13/174,365, international application No. PCT/US2011/042809, and U.S. Pat. No. 8,956,990. Examples of Helper Membranes are disclosed in co-owned U.S. Pat. No. 9,370,773, which is hereby incorporated by reference. Helper Membranes, like the disclosed Helper Catalysts, can increase the Faradaic efficiency and allow significant currents to be employed at lower voltages.

In at least some embodiments the Helper Membrane can include at least one of a positively charged cyclic amine ligand, an imidazolium, a pyridinium, a guanidinium or a phosphonium ligand.

A membrane can be classified as a Helper Membrane if it meets the following test:

(1) A cathode is prepared as follows:
   (a) A silver ink is made by mixing 30 mg of silver nanoparticles (20-40 nm, stock #45509, Alfa Aesar, Ward Hill, Mass.) with 0.1 ml deionized water (18.2 Mohm, EMD Millipore, Billerica, Mass.) and 0.2 ml isopropanol (stock #3032-16, Macron Fine Chemicals, Avantor Performance Materials, Center Valley, Pa.). The mixture is then sonicated for 1 minute.
   (b) The silver nanoparticle ink is hand painted onto a gas diffusion layer (Sigracet 35 BC GDL, Ion Power Inc., New Castle, Del.) covering an area of 2.5 cm×2.5 cm.

(2) An anode is prepared as follows:
   (a) $RuO_2$ ink is made by mixing 15 mg of $RuO_2$ (stock #11804, Alfa Aesar) with 0.2 ml deionized water (18.2 Mohm Millipore), 0.2 ml isopropanol (stock #3032-16, Macron) and 0.1 ml of 5% Nafion™ solution (1100EW, DuPont, Wilmington, Del.).
   (b) The $RuO_2$ ink is hand-painted onto a gas diffusion layer (Sigracet 35 BC GDL, Ion Power) covering an area of 2.5 cm×2.5 cm.

(3) A 50-300 micrometer thick membrane of a "test" material is made by conventional means such as casting or extrusion.

(4) The membrane is sandwiched between the anode and the cathode with the silver and ruthenium oxide catalysts facing the membrane.

(5) The membrane electrode assembly is mounted in Fuel Cell Technologies, Inc. (Albuquerque, N. Mex.) 5 $cm^2$ fuel cell hardware assembly with serpentine flow fields.

(6) $CO_2$ humidified at 50° C. is fed into the cathode at a rate of 5 standard cubic centimeters per minute (sccm) with the cell at room temperature and pressure, the anode side is left open to the atmosphere at room temperature and pressure, 3.0 V is applied to the cell, and the cathode output composition is analyzed after the cell has been running for 30 minutes at room temperature.

(7) Selectivity is calculated as follows:

$$Selectivity = \frac{(CO\ production\ rate)}{(CO\ production\ rate + H_2\ production\ rate)}$$

where the CO and $H_2$ production rates are measured in moles per minute leaving the electrolyzer.

If the Selectivity is greater than 50%, and the $CO_2$ conversion current at 3.0 V is 20 $mA/cm^2$ or more, where the $cm^2$ is measured as the area of the cathode gas diffusion layer that is covered by catalyst particles, the membrane containing the material is a Helper Membrane, for which:

($CO_2$ conversion current)=(Total cell current)*(Selectivity)

In a related system, an electrochemical device converts $CO_2$ to a reaction product. The device comprises:
(a) an anode comprising a quantity of anode catalyst, said anode having an anode reactant introduced thereto via at least one anode reactant flow channel;
(b) a cathode comprising a quantity of cathode catalyst, the cathode having a cathode reactant introduced thereto via at least one cathode reactant flow channel; and
(c) a polymer electrolyte membrane interposed between the anode and the cathode.

At least a portion of the cathode catalyst is directly exposed to gaseous $CO_2$ during electrolysis. The device satisfies a test comprising:
(1) with the anode reactant flow channels open to atmospheric air, directing a stream of $CO_2$ humidified at 50° C. into the cathode reactant flow channels facing the polymer electrolyte membrane while the fuel cell hardware assembly is at room temperature and atmospheric pressure;
(2) applying a cell potential of 3.0 V via an electrical connection between the anode and the cathode with the device at room temperature;
(3) measuring the current across the cell and concentration of CO and $H_2$ at the exit of the cathode flow channel;
(4) calculating the CO selectivity as follows:

$$Selectivity = \frac{(CO\ production\ rate)}{(CO\ production\ rate + H_2\ production\ rate)}$$

(5) performing steps (1)-(4) with room temperature water being directed through the anode reactant flow channels; and
(6) determining that the device has satisfied the test if the average current density at the membrane is at least 20 $mA/cm^2$, where the $cm^2$ is measured as the area of the cathode gas diffusion layer that is covered by catalyst particles, and CO selectivity is at least 50% at a cell potential of 3.0 V in either case.

In a preferred embodiment of the device, at least 50% by mass of the cathode catalyst is directly exposed to gaseous $CO_2$ during electrolysis. More preferably, at least 90% by mass of the cathode catalyst is directly exposed to gaseous $CO_2$ during electrolysis.

In a preferred embodiment of the device, the membrane is an anion exchange membrane.

In a more preferred embodiment, at least a portion of the membrane can be a Helper Membrane identifiable by applying a test comprising:
(1) preparing a cathode comprising 6 mg/cm² of silver nanoparticles on a carbon fiber paper gas diffusion layer;
(2) preparing an anode comprising 3 mg/cm² of RuO₂ on a carbon fiber paper gas diffusion paper;
(3) preparing a polymer electrolyte membrane test material;
(4) interposing the membrane test material between the anode and the cathode, the side of cathode having the silver nanoparticles disposed thereon facing one side of the membrane and the side of the anode having RuO₂ disposed thereon facing the other side of the membrane, thereby forming a membrane electrode assembly;
(5) mounting the membrane electrode assembly in a fuel cell hardware assembly;
(6) directing a stream of CO₂ humidified at 50° C. into the cathode reactant flow channels while the fuel cell hardware assembly is at room temperature and atmospheric pressure, with the anode reactant flow channels left open to the atmosphere at room temperature and pressure;
(7) applying a cell potential of 3.0 V via an electrical connection between the anode and the cathode;
(8) measuring the current across the cell and the concentration of CO and H₂ at the exit of the cathode flow channel;
(9) calculating the CO selectivity as follows: and $$\text{Selectivity} = \frac{(\text{CO production rate})}{(\text{CO production rate} + \text{H}_2 \text{ production rate})};$$

(10) identifying the membrane as a Helper Membrane if the average current density at the membrane is at least 20 mA/cm², where the cm² is measured as the area of the cathode gas diffusion layer that is covered by catalyst particles, and CO selectivity is at least 50% at a cell potential of 3.0 V.

The polymer electrolyte membrane can be entirely a Helper Membrane. The Helper Membrane preferably comprises a polymer containing at least one of a positively charged cyclic amine, an imidazolium ligand, a pyridinium ligand, a guanidinium and a phosphonium ligand.

In a preferred embodiment of the device, the anode and cathode catalysts can be each applied as a coating on one or both faces of the membrane.

In a preferred embodiment of the device, the polymer electrolyte membrane is essentially immiscible in water.

In a preferred embodiment of the device, the reaction product is selected from the group consisting of CO, HCO⁻, H₂CO, (HCO₂)⁻, H₂CO₂, CH₃OH, CH₄, C₂H₄, CH₃CH₂OH, CH₃COO⁻, CH₃COOH, C₂H₆, (COOH)₂, (COO⁻)₂, H₂C=CHCOOH, and CF₃COOH.

The device can further comprise a Catalytically Active Element. The Catalytically Active Element is preferably selected from the group consisting of Au, Ag, Cu, Sn, Sb, Bi, W, Zn and In.

A preferred polymer electrolyte membrane comprises a polymer in which at least one constituent monomer is (p-vinylbenzyl)-R, where R is selected from the group consisting of positively charged cyclic amines, imidazoliums, pyridiniums, guanidiniums and phosphoniums, and in which the membrane comprises 15%-90% by weight of polymerized (p-vinylbenzyl)-R.

In a preferred embodiment, the membrane comprises polystyrene. The membrane preferably has a thickness of 25-1000 micrometers. The membrane can further comprise a copolymer of at least one of methyl methacrylate and butylacrylate. The membrane can further comprise at least one of a polyolefin, a chlorinated polyolefin, a fluorinated polyolefin, and a polymer comprising at least one of cyclic amines, phenyls, nitrogen or carboxylate (—COO—) groups in its repeating unit.

In a preferred embodiment of the membrane, R is selected from at least one of:
(a) imidazoliums of the formula:

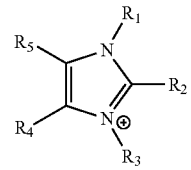

where R₁-R₅ are each independently selected from the group consisting of hydrogen, halides, linear alkyls, branched alkyls, cyclic alkyls, heteroalkyls, aryls, heteroaryls, alkylaryls, heteroalkylaryls, and polymers thereof;
(b) pyridiniums of the formula:

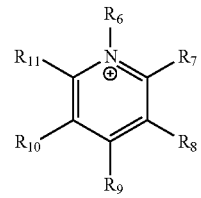

where R₆-R₁₁ are each independently selected from the group consisting of hydrogen, halides, linear alkyls, branched alkyls, cyclic alkyls, heteroalkyls, aryls, heteroaryls, alkylaryls, heteroalkylaryls, and polymers thereof; and
(c) phosphoniums of the formula:

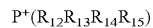

P⁺(R₁₂R₁₃R₁₄R₁₅)

where R₁₂-R₁₅ are each independently selected from the group consisting of hydrogen, halides, linear alkyls, branched alkyls, cyclic alkyls, heteroalkyls, aryls, heteroaryls, alkylaryls, heteroalkylaryls, and polymers thereof.

In a preferred embodiment of the membrane, R is imidazolium, pyridinium or a polymer thereof, in which no aromatic nitrogen is attached to hydrogen.

BRIEF DESCRIPTION OF THE DRAWINGS

FIG. 1 is an exploded side view of a fuel cell hardware assembly including a membrane electrode assembly interposed between two fluid flow field plates having reactant flow channels formed in the major surfaces of the plates facing the electrodes.

FIG. 2 is an exploded side view of a fuel cell hardware assembly including a membrane electrode assembly having integral reactant flow channels interposed between two separator layers.

FIG. 3 shows the synthetic route for imidazolium based polymers. Imidazolium refers to positively charged imidazole ligands.

DETAILED DESCRIPTION OF ILLUSTRATIVE EMBODIMENT(S)

Figure 4:
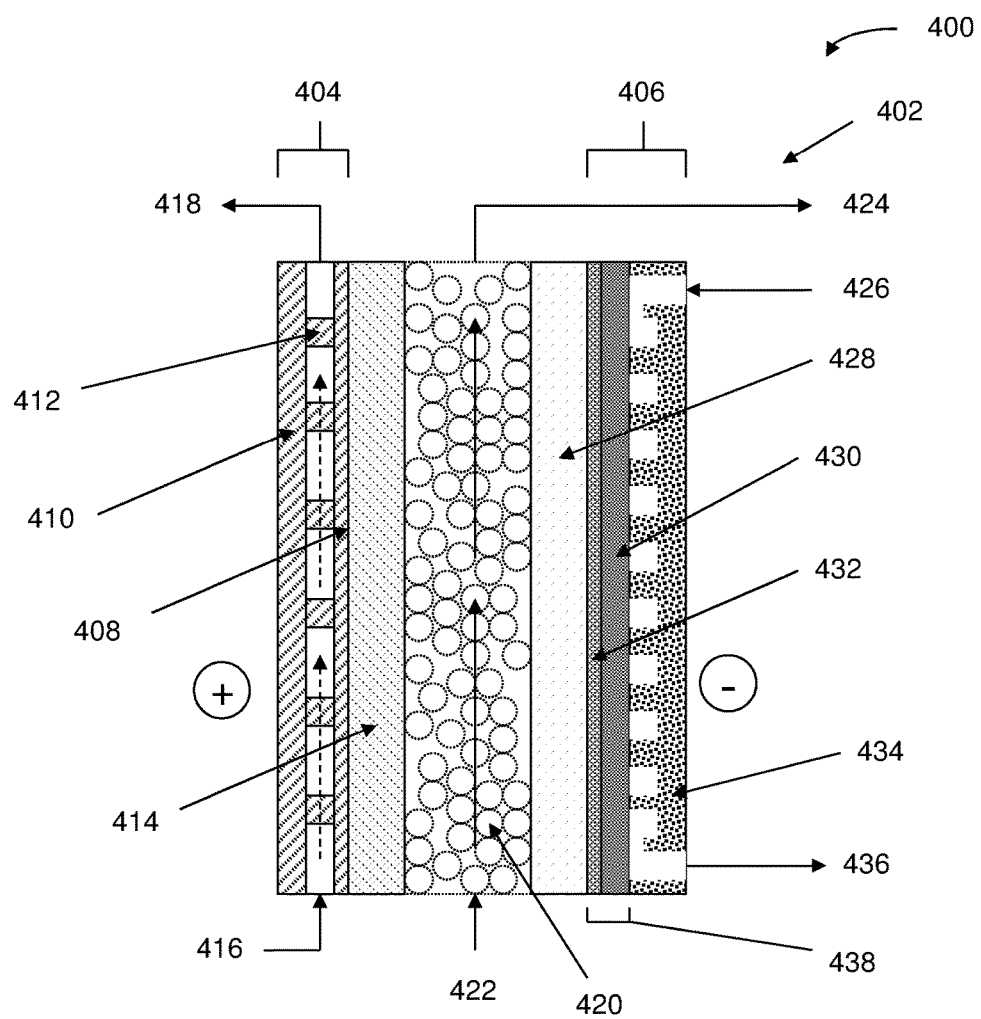
FIG. 4 is a schematic illustrating a system for the electrochemical reduction of carbon dioxide to formic acid.

It is understood that the process is not limited to the particular methodology, protocols and reagents described herein, as these can vary as persons familiar with the technology involved here will recognize. It is also to be understood that the terminology used herein is used for the purpose of describing particular embodiments only, and is not intended to limit the scope of the process. It also is to be noted that as used herein and in the appended claims, the singular forms "a," "an," and "the" include the plural reference unless the context clearly dictates otherwise. Thus, for example, a reference to "a linker" is a reference to one or more linkers and equivalents thereof known to those skilled in the art. Similarly, the phrase "and/or" is used to indicate one or both stated cases can occur, for example, A and/or B includes (A and B) and (A or B).

Unless defined otherwise, technical and scientific terms used herein have the same meanings as commonly understood by one of ordinary skill in the art to which the process pertains. The embodiments of the process and the various features and advantageous details thereof are explained more fully with reference to the non-limiting embodiments and/or illustrated in the accompanying drawings and detailed in the following description. It should be noted that the features illustrated in the drawings are not necessarily drawn to scale, and features of one embodiment can be employed with other embodiments as the skilled artisan would recognize, even if not explicitly stated herein.

Any numerical value ranges recited herein include all values from the lower value to the upper value in increments of one unit, provided that there is a separation of at least two units between any lower value and any higher value. As an example, if it is stated that the concentration of a component or value of a process variable such as, for example, size, angle size, pressure, time and the like, is, for example, from 1 to 98, specifically from 20 to 80, more specifically from 30 to 70, it is intended that values such as 15 to 85, 22 to 68, 43 to 51, 30 to 32, and the like, are expressly enumerated in this specification. For values which are less than one, one unit is considered to be 0.0001, 0.001, 0.01 or 0.1 as appropriate. These are only examples of what is specifically intended and all possible combinations of numerical values between the lowest value and the highest value are to be treated in a similar manner.

Moreover, provided immediately below is a "Definitions" section, where certain terms related to the process are defined specifically. Particular methods, devices, and materials are described, although any methods and materials similar or equivalent to those described herein can be used in the practice or testing of the process.

Definitions

The term "electrochemical conversion of $CO_2$" as used here refers to any electrochemical process where carbon dioxide, carbonate, or bicarbonate is converted into another chemical substance in any step of the process.

The term polymer electrolyte membrane refers to both cation exchange membranes, which generally comprise polymers having multiple covalently attached negatively charged groups, and anion exchange membranes, which generally comprise polymers having multiple covalently attached positively charged groups. Typical cation exchange membranes include proton conducting membranes, such as the perfluorosulfonic acid polymer available under the trade designation Nafion from E. I. du Pont de Nemours and Company (DuPont) of Wilmington, Del.

The term "anion conducting polymer" comprise polymers having multiple covalently attached positively charged groups such that anions can diffuse through a membrane comprised of the polymer.

The term "anion exchange membrane" as used here refers to a membrane containing an anion-conducting polymer The term "anion exchange membrane electrolyzer" as used here refers to an electrolyzer with an anion-conducting polymer electrolyte membrane separating the anode from the cathode.

The term "liquid free cathode" refers to an electrolyzer where there are no bulk liquids in direct contact with the cathode during electrolysis. There can be a thin liquid film on or in the cathode, however, and occasional wash, or rehydration, of the cathode with liquids could occur.

The term "Faradaic efficiency" as used here refers to the fraction of the electrons applied to the cell that participate in reactions producing carbon containing products.

The term "EMIM" as used here refers to 1-ethyl-3-methylimidazolium cations.

The term "Hydrogen Evolution Reaction" also called "HER" as used here refers to the electrochemical reaction $2H^+ + 2e^- \rightarrow H_2$.

The term "MEA" as used here refers to a membrane electrode assembly.

The Term "CV" refers to cyclic voltammetry.

The term "Millipore water" is water that is produced by a Millipore filtration system with a resistivity of at least 18.2 megohm-cm.

The term "SPEEK" as used here refers to sulfonated poly(ether ketone).

The term "PVA" as used here refers to polyvinyl alcohol.

The term "GDE" as used refers to a gas diffusion electrode.

The term "GDL" refers to a gas diffusion layer.

The term "CL" refers to a catalyst layer.

The term "PEI" as used here refers to polyethylenimine.

The term "GC" as used here refers to a gas chromatograph.

The term "GC-MS" as used here refers to a gas chromatograph having a mass spectrometer detector.

The term "DI" water as used here refers to deionized water, water that contains few or no anions and cations present in the solution.

The term "imidazolium" as used here refers to a positively charged ligand containing an imidazole group. This includes a bare imidazole or a substituted imidazole. Ligands of the form:

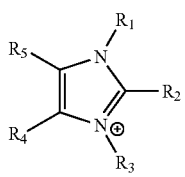

where $R_1$-$R_5$ are each independently selected from hydrogen, halides, linear alkyls, branched alkyls, cyclic alkyls, heteroalkyls, aryls, heteroaryls, alkylaryls, heteroalkylaryls, and polymers thereof are specifically included.

The term "pyridinium" as used here refers to a positively charged ligand containing a pyridine group. This includes a bare pyridine or a substituted pyridine. Ligands of the form:

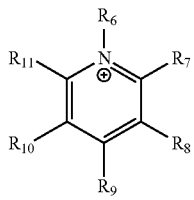

where $R_6$-$R_{11}$ are each independently selected from hydrogen, halides, linear alkyls, branched alkyls, cyclic alkyls, heteroalkyls, aryls, heteroaryls, alkylaryls, heteroalkylaryls, and polymers thereof are specifically included.

The term "phosphonium" as used here refers to a positively charged ligand containing phosphorous. This includes substituted phosphorous. Ligands of the form:

$P^+(R_{12}R_{13}R_{14}R_{15})$ where $R_{12}$-$R_{15}$ are each independently selected from hydrogen, halides, linear alkyls, branched alkyls, cyclic alkyls, heteroalkyls, aryls, heteroaryls, alkylaryls, heteroalkylaryls, and polymers thereof are specifically included.

The term "positively charged cyclic amine" as used here refers to a positively charged ligand containing a cyclic amine. This specifically includes imidazoliums, pyridiniums, pyrazoliums, pyrrolidiniums, pyrroliums, pyrimidiums, piperidiniums, indoliums, triaziniums, and polymers thereof, such as the vinyl benzyl copolymers described herein.

The term "guanidinium" as used here refers to a positively charged ligand containing a guanidinium group. This includes a protonated bare guanidine or a substituted guanidine or guanidinium ligand of the form:

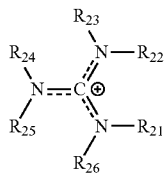

where $R_{21}$-$R_{26}$ are each independently selected from hydrogen, halogens, linear alkyls, branched alkyls, cyclic alkyls, heteroalkyls, aryls, cyclic aryls, heteroaryls, alkylaryls, heteroalkylaryls, and polymers thereof, such as the vinyl benzyl copolymers described herein. Such copolymers are specifically included.

The term "catalyst is directly exposed to gaseous $CO_2$" as used here refers to the case where $CO_2$ gas is within 2 mm of the catalyst or the gas diffusion layer supporting the catalyst, preferably within 0.2 mm.

Specific Description

FIG. 1 illustrates a fuel cell hardware assembly 30, which includes a membrane electrode assembly 32 interposed between rigid flow field plates 34 and 36, typically formed of graphite or a graphite composite material. Membrane electrode assembly 32 consists of a polymer electrolyte (ion exchange) membrane 42 interposed between two electrodes, namely, anode 44 and cathode 46. Anode 44 and cathode 46 are typically formed of porous electrically conductive sheet material, preferably carbon fiber paper, and have planar major surfaces. However, for certain high potential electrode half-cell reactions, such as the oxygen evolution reaction (OER), it can be desirable to substitute a more corrosion resistant material for the porous, electrically conductive carbon fiber paper. Electrodes 44 and 46 have a thin layer of catalyst material disposed on their major surfaces at the interface with membrane 42 to render them electrochemically active.

As shown in FIG. 1, anode flow field plate 34 has at least one open faced channel 34a engraved, milled or molded in its major surface facing membrane 42. Similarly, cathode flow field plate 36 has at least one open faced channel 36a engraved, milled or molded in its major surface facing membrane 42. When assembled against the cooperating surfaces of electrodes 44 and 46, channels 34a and 36a form the reactant flow field passages for the anode reactant stream and cathode reactant stream, respectively.

Turning to FIG. 2, a fuel cell hardware assembly 50 employs a membrane electrode assembly 52 having integral reactant fluid flow channels. Fuel cell hardware assembly 50 includes membrane electrode assembly 52 interposed between lightweight separator layers 54 and 56, which are substantially impermeable to the flow of reactant fluid therethrough. Membrane electrode assembly 52 consists of a polymer electrolyte (ion exchange) membrane 62 interposed between two electrodes, namely, anode 64 and cathode 66. Anode 64 and cathode 66 are formed of porous electrically conductive sheet material, preferably carbon fiber paper. Electrodes 64 and 66 have a thin layer of catalyst material disposed on their major surfaces at the interface with membrane 62 to render them electrochemically active.

As shown in FIG. 2, anode 64 has at least one open faced channel 64a formed in its surface facing away from membrane 62. Similarly, cathode 66 has at least one open faced channel 66a formed in its surface facing away from membrane 62. When assembled against the cooperating surfaces of separator layers 54 and 56, channels 64a and 66a form the reactant flow field passages for the anode and cathode reactant streams, respectively.

During operation as an electrolyzer or a charging redox flow battery, reactants or a solution containing reactants are fed into the cell. Then a voltage is applied between the anode and the cathode, to promote an electrochemical reaction.

Alternately, when the device is used as a fuel cell power generator or a discharging flow battery, reactants or a solution containing reactants are fed into the cell, and a voltage develops between the anode and cathode. This voltage can produce a current through an external circuit connecting the anode and cathode.

When an electrochemical cell is used as a $CO_2$ conversion system, a reactant comprising $CO_2$, carbonate or bicarbonate is fed into the cell. A voltage is applied to the cell, and the $CO_2$ reacts to form new chemical compounds.

The present electrochemical device for the electrochemical conversion of $CO_2$, water, carbonate, and/or bicarbonate into another chemical substance has an anode, a cathode, and a Helper Membrane.

In some embodiments there are no, or substantially no, bulk liquids in contact with the cathode during cell operation, and the Faradaic efficiency for $CO_2$ conversion is at least 33%, more preferably at least 50%, or most preferably at least 80%.

The device can also include at least one Catalytically Active Element. "Catalytically Active Element" as used here refers to a chemical element that can serve as a catalyst for the electrochemical conversion of $CO_2$ or another species of interest in a desired reaction. In particular, the device can include one or more of the following Catalytically Active Elements: V, Cr, Mn, Fe, Co, Ni, Cu, Sn, Zr, Nb, Mo, Ru, Rh, Pd, Ag, Cd, Hf, Ta, W, Re, Ir, Pt, Au, Hg, Al, Si, In, Tl, Pb, Bi, Sb, Te, U, Sm, Tb, La, Ce, and Nd. Research has established that Pt, Pd, Au, Ag, Cu, Ni, Fe, Sn, Bi, Co, In, Ru and Rh work well with Au, Ag, Cu, Sn, Sb, Bi, and In working especially well. The products of the reaction can include, among other things: CO, $HCO^-$, $H_2CO$, $(HCO_2)^-$, $H_2CO_2$, $CH_3OH$, $CH_4$, $C_2H_4$, $CH_3CH_2OH$, $CH_3COO^-$, $CH_3COOH$, $C_2H_6$, $(COOH)_2$, $(COO^-)_2$, $H_2C=CHCOOH$, $CF_3COOH$, other organic acids, and covalently-bound organic carbonates such as di-phenyl carbonate and polycarbonates.

Formic acid, as one $CO_2$ reduction product, has a number of industrial uses and can advantageously be used as an intermediate for the production of a large variety of chemical compounds such as methyl formate, alkali metal and alkaline earth metal formates, formamide, and the like. An economical process for directly producing a formic acid product in the acid form from $CO_2$ rather than a formate salt that would need to be further converted to an acid form is advantageous. In another embodiment, acetic acid and other carboxylic acids can be produced at the cathode, depending on the selection of cathode electrocatalysts.

The anode process for the disclosed electrochemical formic acid cell can utilize a variety of chemical reactions that generate $H^+$ ions, depending on suitable and available feedstock materials, suitable handling of the anode product(s), and any required modifications of the electrochemical cell configuration. One of the preferred anode reactions can be the generation of oxygen and $H^+$ ions from the anodic oxidation of water. Oxygen has economic value, but other anode reaction products can have a greater significant economic value for the electrochemical process. Halogens, such as $Cl_2$ and $Br_2$, can be produced in an anode reaction using, for example, hydrogen halides such as HCl or HBr. Alternatively, the anode reaction can also include a method and system for the production of formic acid that advantageously utilizes hydrogen gas as the anode reactant, producing water and $H^+$ ions as the products, in addition to providing an electrochemical cell that operates at a significantly lower voltage and anode operating potential than a cell utilizing an anodic oxygen evolution reaction. In other anode reaction embodiments, other gaseous and liquid reactants, including various inorganics and organics may be oxidized at the anode, producing various anode products, such as ethylene from ethane, and thereby producing alternative valuable anodic co-products with the formic acid.

FIG. 4 is a schematic illustrating a system 400 for the electrochemical reduction of carbon dioxide to a formic product. System 400 can be configured for production of formic acid in accordance with an embodiment of the present disclosure.

It is contemplated that system 400 operates according to the overall chemical equations:

$$\text{Anode Reaction: } 2H_2O \rightarrow 4H^+ + 4e^- + O_2 \quad (1)$$

$$\text{Cathode Reaction: } CO_2 + H^+ + 2e^- \rightarrow HCOO^- \quad (2)$$

$$\text{Overall Reaction: } 2CO_2 + 2H_2O \rightarrow 2HCOOH + O_2 \quad (3)$$

The potential side reactions that can occur at the cathode are as follows:

Competing Cathode Reactions:

$$CO_2 + 2H^+ + 2e^- \rightarrow CO + H_2O \quad (4)$$

$$2H_2O + 2e^- \rightarrow 2OH^- + H_2 \quad (5)$$

Another reaction is the combination of generated $H^+$ ions or protons with formed hydroxide ions and forming water as the product as follows:

$$\text{Water Forming Reaction: } H^+ + OH^- \rightarrow H_2O \quad (6)$$

Central flow compartment Reaction:

$$H^+ + HCOO^- \rightarrow HCOOH \quad (7)$$

In FIG. 4, system 400 can include electrochemical cell 402. Electrochemical cell 402 can be implemented as a divided electrochemical cell having three electrochemical compartments or regions where a cation exchange membrane 414 and an anion exchange membrane 428 form, define, or separate the cell compartments into anode compartment 404, cathode compartment 406, and central flow compartment 420. Electrochemical cell 402, and the electrochemical cells described herein, utilize an energy source, not shown, which can generate an electrical potential between the positive, connected anode 408, and the negative, connected to GDE cathode structure 438. The electrical energy source can provide a DC voltage with the positive terminal on the anode and the negative on the cathode. The energy source can be configured to supply a variable voltage or constant current to electrochemical cell 402 or other electrochemical system described herein.

In system 400, anode compartment 404 comprises anode 408, positioned immediately adjacent to cation exchange membrane 414, anode base current collector 410 used for conducting the current to anode 408, anode collector stand-offs 412, which are used to conduct the current directly from anode base current collector 410 to anode 408. Cation exchange membrane 414 can selectively control a flow of cations between anode compartment 404 and central flow compartment 420, such as $H^+$ ions. Cation exchange membrane 414 can include a polymer type cation exchange membrane. Preferably, cation exchange membrane 414 can be a perfluorinated sulfonic acid-based cation exchange membrane, which may be resistant to the oxidation reactions at the anode. In addition, the cation exchange membrane 414 blocks the passage of anions, such as the formate ion, HCOO⁻, from passing into the anode compartment, where it could be oxidized to $CO_2$ or CO.

Anode compartment 404 has an anolyte solution input 416 and an anolyte solution output 418. The anolyte solution can be deionized water, or an aqueous solution containing a conductive non-oxidizable acid such as sulfuric or phosphoric acid. Generated gases, such as oxygen, can exit with anolyte solution output 418.

Electrochemical cell 402 has a central flow compartment or flow channel 420, bounded by cation exchange membrane 414 and anion exchange membrane 428. Central flow compartment 420 can contain a porous media, such as cation exchange resins and the like to enhance the conductivity of the aqueous solution in the channel where formic acid solution product can be formed. In the central flow compartment, $H^+$ ions enter the compartment through the cation exchange membrane and formate ions enter the compartment through the anion exchange membrane. The ionic combination of the $H^+$ ions and formate ions can form formic acid in the compartment. Solution input 422 can pass an aqueous solution into central flow compartment 420 at various flow rates to collect the formic acid product, which can then leave central flow compartment 420 as formic acid product output 424. Solution input 422 can be deionized water or a weak acid solution, or can be a recycle of formic acid output stream 424 in order to form a more concentrated formic acid solution product.

Electrochemical cell 402 has a cathode compartment 406 consisting of gas diffusion electrode (GDE) structure 438 and cathode current collector 434. Cathode current collector 434 can utilize various designs to flow and distribute the carbon dioxide gas into and out of the GDE reaction zone. One such "flow field" is a serpentine design, in which the gas travels into and past the GDE electrode reaction zone following a gas flow plenum pattern etched into the current collector. Cathode compartment 406 can have $CO_2$ gas input 426, which can be a suitably humidified with water, and depleted $CO_2$ gas outlet stream 438, in which the depleted gas and collected fluid or liquid in the GDE can pass out of cathode compartment 406. Gas diffusion electrode 438 can consist of a GDE gas diffusion layer 430 and GDE electrocatalyst layer 432. Gas diffusion layer 430 can provide the distribution of the $CO_2$ reactant into GDE electrocatalyst layer 432. GDE electrocatalyst layer 432 can consist of a deposit of high surface area fine particles or nanoparticles of metals and/or metal oxides as well as various non-metals and non-metal compounds that have been deposited on GDE gas diffusion layer 430 as GDE electrolyzer layer 432 and that provide the region where $CO_2$ can be electrochemically reduced to formate ions or formic acid. The electrocatalyst can be admixed with or already bonded onto high surface area conductive substrate materials such as powdered carbon and the like. Various bonding agents in certain weight percentages can also be applied to help GDE electrocatalyst layer 432 adhere to the GDE gas diffusion layer 432, such as polytetrafluoroethylene (PTFE) or polymeric functionalized ion exchange monomers of the same composition as the anion exchange membrane, such as imidazoliums. The GDE electrocatalyst layer 423 can be modified to provide a balance of hydrophobic and hydrophilic properties to obtain the desired $CO_2$ reduction reaction chemistry and mass transfer. The GDE electrocatalysts should be chemically stable to the potential acidic, neutral, or basic conditions that may be present in the reduction of $CO_2$ to a formate ion or formic acid in the cathode.

In an alternative embodiment, small amounts of organic "room temperature ionic liquids" (RTILs) such as imidazolium salts can be added to the catalyst layer to enhance the desired cathode reduction reaction. These "ionic liquids" can be partially polymerized or thickened to enable them to stay within the catalyst layer(s), or can be adsorbed onto or into the pores of the components added to the catalyst layer, such as carbon black and the like. These "ionic liquids" can also be periodically added or recycled to the GDE cathode in order to renew or replace ionic liquid that may have exited with the liquid effluent from the GDE. The ionic liquid added can contain some of the various imidazolium, pyridinium, or phosphonium ionic liquid derivatives or their mixtures, which can be water soluble or water insoluble. These "helper" ionic liquids would function with the metal and/or metal oxide electrocatalysts in promoting the reduction reaction of carbon dioxide to the various selected reduction products, including formic and acetic acid and the like.

Figure 5:
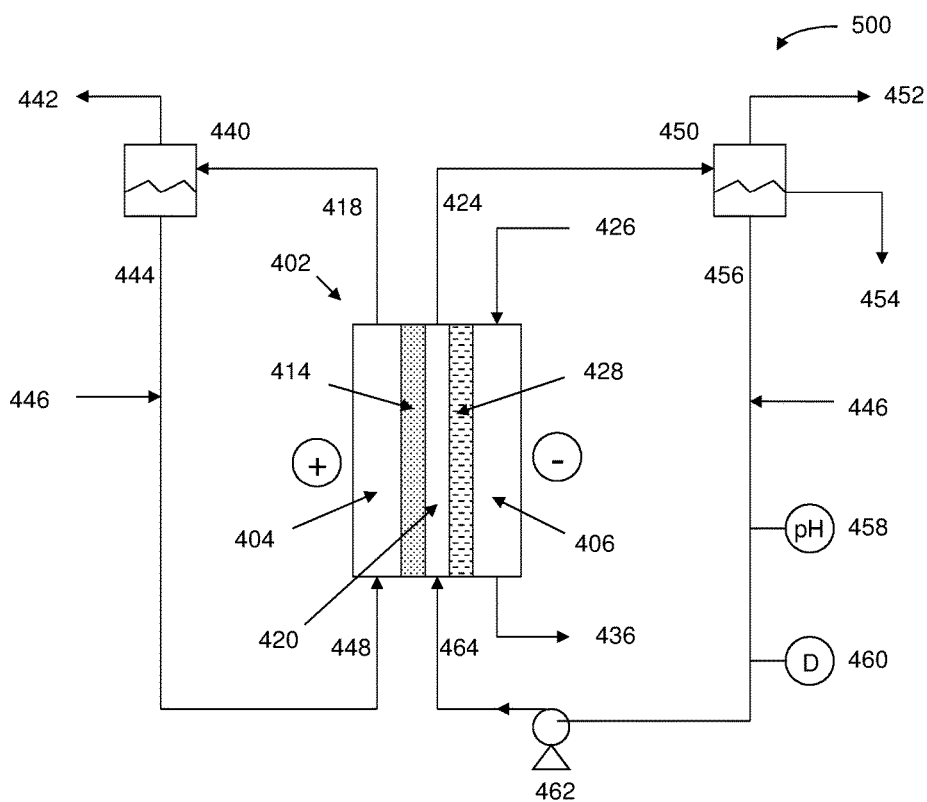
FIG. 5 is a schematic illustrating one embodiment of a system for the electrochemical reduction of carbon dioxide to formic acid employing only $CO_2$ and deionized (DI) water feed inputs.

FIG. 5 shows system 500, illustrating an embodiment of operating electrochemical cell 402 producing formic acid product 454 from the electrochemical reduction of $CO_2$ and producing oxygen product 442 from the anode reaction. Anode compartment 404 has a feed line 448 consisting of DI water 446 added to the anolyte loop. A mixture of water and oxygen can exit anolyte compartment 404 with anolyte output 418 into anolyte disengager 440, where oxygen gas 442 can be separated and anolyte loop aqueous solution 444 can be recycled through line 448 into anolyte compartment 404. The anolyte loop of electrochemical cell 402 can be operated on level control in anolyte disengager 440, with the addition of DI water 446 to maintain the liquid level in anolyte disengager 440. The anolyte can be operated using a gas lift effect to produce the circulation though lines 444 and into 448, or a pump (not shown) can be used to provide the circulation flow in the anolyte loop. A heat exchanger (not shown) can also be provided in the anolyte loop to provide cooling as needed or desired to control the anolyte loop solution temperature in a specified range.

Product stream 424 leaving central flow compartment 420 can contain formic acid and potential gases formed and can enter formic acid disengager 450, where byproduct gases 452 can be separated from formic acid product output line 454. The formic acid product can be recycled through line 456 back into central flow compartment 420 via circulation pump 462 and line 464. DI water 446 can be added to control the concentration of the formic acid in the circulation loop, and the overflow can be formic acid product 454. Instrumentation such as pH sensor 458 and density sensor 460 can be used to control the desired formic acid product concentration. Other instrumentation, such as refractive index and the like that can also be used to monitor and help control the formic acid concentration can also be employed.

In system 500 (and in system 400 of FIG. 4), $CO_2$ gas input 426 can enter the cathode compartment and can exit as depleted $CO_2$ gas stream 436. Excess $CO_2$ in a range of about 5% to about 500% of the stoichiometric amount can be employed. Preferably, the $CO_2$ can be properly humidified with water vapor to maintain the desired hydration for the anion exchange membrane to operate efficiently, and may not cause a large amount of excess water to form in the GDE structure. Selection of proper temperatures for the suitable operation of the central flow compartment, the cell cathode compartment, as well as the $CO_2$ gas flow can be employed.

Figure 6:
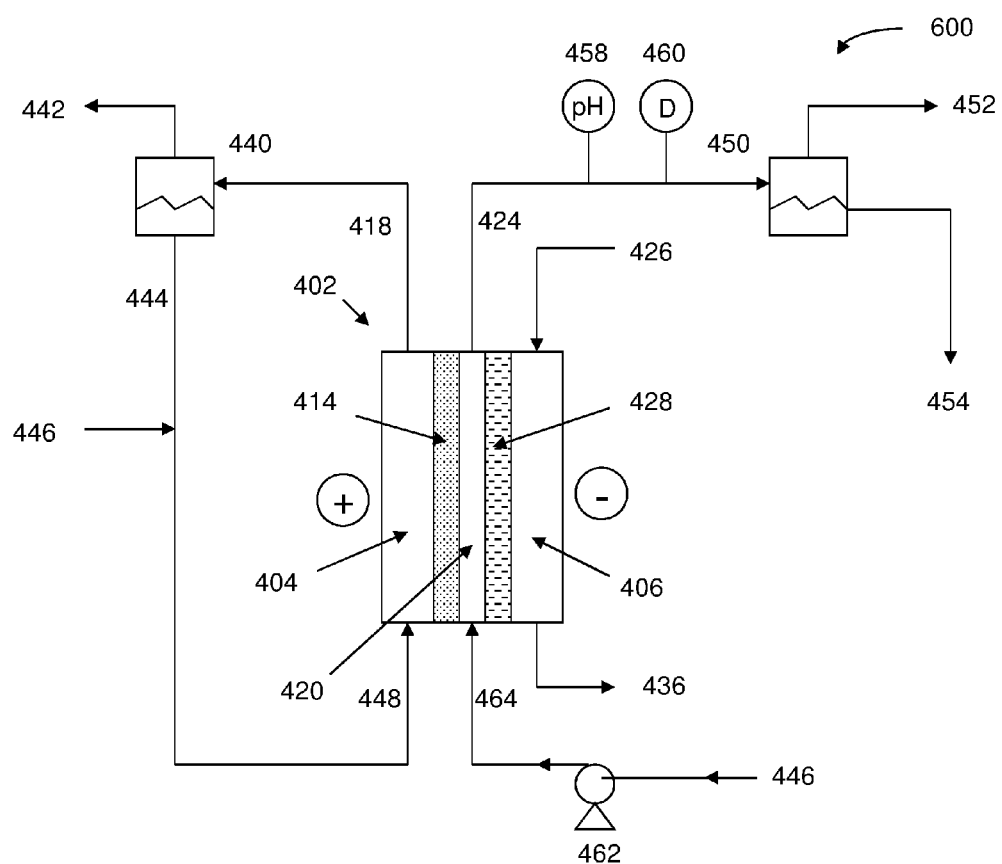
FIG. 6 is a schematic illustrating another embodiment of a system for the electrochemical reduction of carbon dioxide to formic acid employing only $CO_2$ and water feed inputs and operating the system in a single pass mode.

FIG. 6 shows system 600, another embodiment illustrating the operation of electrochemical cell 402 in producing a formic acid product 454 using a single pass flow through central flow compartment 420. In this system, DI water 446 can be metered into line 464 into central flow compartment 420 using metering pump 462. The concentration of formic acid formed in central flow compartment 420 can be controlled with the precise flow of water input line 464. The formic acid product exiting through line 424 can then be passed through control instrumentation such as pH sensor 458 and density sensor 460 to monitor and control the concentration of formic acid product 424, and can then enter formic acid disengager 450 to disengage gases from the formic acid through line 452, and producing a final formic acid product 454.

Figure 7:
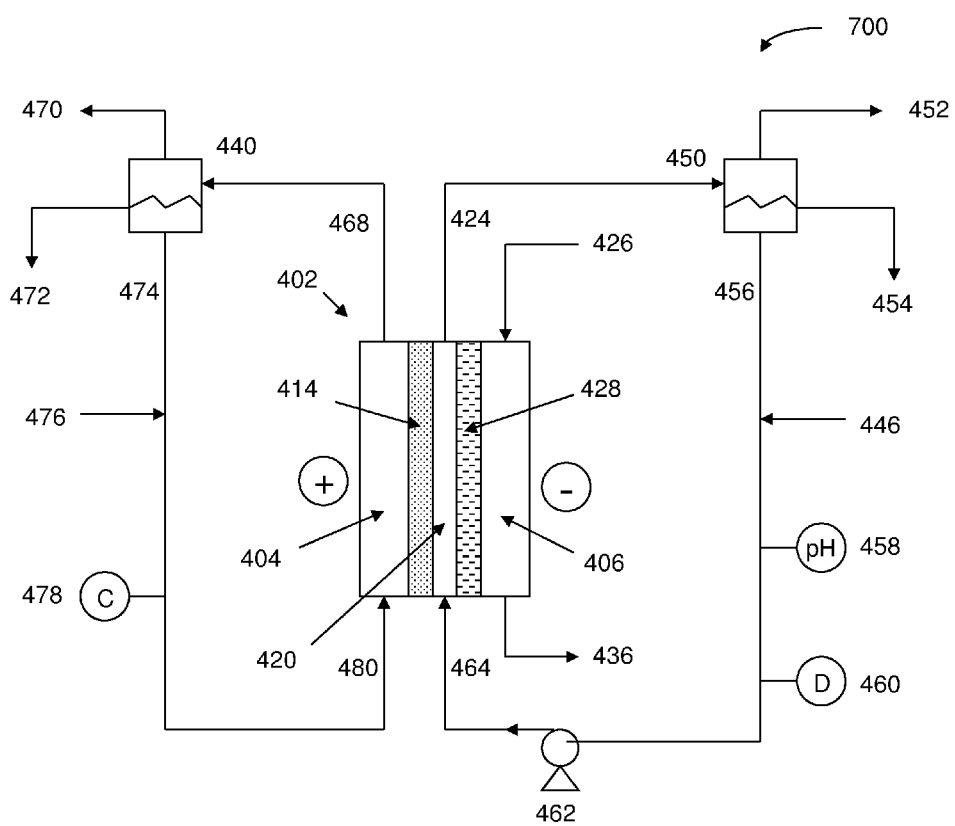
FIG. 7 is a schematic illustrating a system for the electrochemical reduction of carbon dioxide to formic acid utilizing an alternative anode reaction chemistry and product.

FIG. 7 shows system 700, illustrating another embodiment where the electrochemical cell 402 anode reaction produces chlorine product 470 instead of oxygen. The anticipated anode reaction is shown in reaction 8 below. In this system, HCl solution 476 can be added as a feed into the anolyte loop and enters anolyte compartment 404 via line 480. Anode generated chlorine and unreacted HCl can leave the anolyte compartment 404 though line 468 and enter anolyte disengager 440, where the stream can be separated into chlorine gas 470 and depleted HCl solution stream 474, which can be recycled to the anolyte compartment via stream 480. Depending on operation and concentration of the HCl, there can be a depleted HCl overflow stream 472 which can be recycled and then re-saturated with HCl. The anode employed for this embodiment can use selected electrocatalysts and anode structures, such as titanium, that are suitable for chlorine evolution.

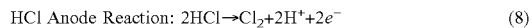

HCl Anode Reaction: $2HCl \rightarrow Cl_2 + 2H^+ + 2e^-$     (8)

Figure 8:
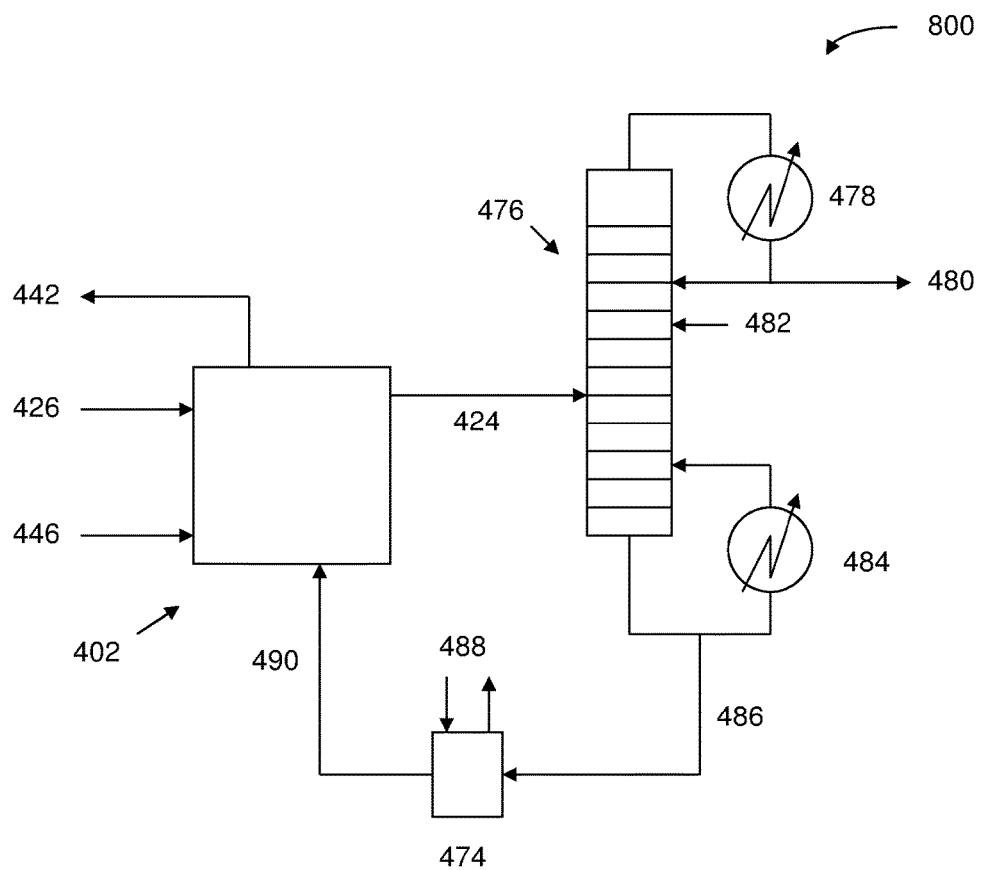
FIG. 8 is a schematic illustrating a system for the electrochemical reduction of carbon dioxide to formic acid utilizing a reaction/distillation column for the continuous removal of formic acid and converting it to methyl formate.

FIG. 8 shows system 800, in another embodiment where formic acid product 424 of electrochemical cell 402 can be passed to reactive distillation column 476, where formic acid ester product 480, such as methyl formate, can be recovered as a product. Electrochemical cell 402 has $CO_2$ feed 426 and DI water feed 446. Oxygen 442 can exit as a product from the anolyte compartment of electrochemical cell 402. Reactive distillation column 476 has a condenser 478, reboiler 484, and methanol feed 482. Reactive distillation column 476 can employ a reaction section containing a reaction bed (not shown) containing a strong acid ion exchange resin to help promote the esterification reaction. The bottoms from the reactive distillation column 476 via line 486 can be mainly water with a small amount of formic acid that can be recycled back via line 490 to the central flow compartment of electrochemical cell 402. Bottoms product 486 can be cooled in heat exchanger 474 which can have a cooling water inlet/outlet 488. Additionally, alternate embodiments can utilize the use of liquid extraction agents that can complex with the formic acid that can be externally added and conducted in an external vessel, or can be added to the formic acid recycle stream to modify the available concentration of formic acid in the central flow compartment to help improve on the cell operating Faradaic formic acid current efficiency. Other formate esters can be produced in reactive distillation column 476 using other alcohols, such as ethanol and butanol.

Electrochemical Cell Operating Conditions

Electrochemical cell 402 catholyte operating temperature can be in a range of 0° C. to 95° C., and more preferably 5° C. to 60° C. The lower temperature can be limited by the electrolytes used and their freezing points and the choice of membranes used in the electrochemical cell. In general, the lower the temperature, the higher the solubility of $CO_2$ in the solution phase of the electrolyte. Higher carbon dioxide concentrations can help in obtaining higher conversion and current efficiencies. The drawback of operating at very low temperatures can be that the operating electrolyzer cell voltages can be higher, so an optimization can be performed to produce the chemicals at the lowest operating cost. Anolyte operating temperature operating temperature can be in a range of 0° C. to 95° C., more preferably in a range of 5° C. to 80° C. Heat exchangers can be used to cool the anode compartment, central flow compartment, and the cathode compartment and their associated streams to the desired operating temperatures.

Preferably, electrochemical cell 402 can be operated under ambient pressures, but can also be operated at higher pressures. Operating the electrochemical cell catholyte at a higher operating pressure can allow a higher concentration of $CO_2$ to dissolve and react at the cathode GDE structure. Typically, electrochemical cells can operate at pressures up to about 20 to 30 psig in multi-cell stack designs, although with modifications, they could operate at up to 100 psig. The pressure operating range of the electrochemical cell can be between 0.1 psig and 1400 psig.

The operating cell voltages for electrochemical cell 402 disclosed in the embodiments in this disclosure can range from about 0.5 to about 20 volts depending on the anode and cathode chemistry employed in addition to the cell operating current density. Preferably, the operating cell voltage can range from about 1 to about 10 volts, more preferably from about 2 to about 8 volts, even more preferably less than 5 V most preferably between 2 and 4 volts. The operating current density of the electrochemical cells can range from about 5 mA/cm² to as high as 1,500 mA/cm² or more.

GDE Cathode and Electrocatalyst Materials

The GDE cathode electrocatalyst layer in electrochemical cell 402 can include compositions containing Au, Ag, Bi, Cu, Ga, Pb, Pd, In, Sb, Sn, Zn, W, as well as transition metals, their oxides, and their metal alloys including binary, ternary, and quaternary alloys and higher and the like. The electrocatalysts can be a mixture of metals, and combination of metals and oxides deposited on a conductive substrate carrier such as carbon or graphite. The deposited electrocatalysts can be sized in the nanoparticle size range or larger, in a range of 0.5 to 100 nm, and can also be in a larger range of 100 nm to 1000 nm or greater. The deposited electrocatalysts can also be applied in multiple coatings or layers of these metals, metal oxides, and metal alloys onto the selected conductive carrier. The deposited electrocatalysts can then be further heat treated using various atmospheric gases such as oxygen, nitrogen, hydrogen, and the like or under a vacuum to convert the electrocatalysts into intermetallic compounds and/or oxides. The preferred electrocatalysts can have a high hydrogen overvoltage in order to reduce the potential side reactions that may occur at the cathode that can form hydrogen from the reduction of water. If the cathode product is formic acid, the electrocatalysts may need to be resistant to alkaline or acidic conditions at the cathode reaction conditions. The selected catalysts can be selective in producing selected $CO_2$ reduction products other than formate, such as acetate, acetic acid and the like.

Conductive electrocatalyst support materials can include carbon, graphite, titanium suboxides such as $Ti_4O_7$ and $Ti_5O_9$, metal and metal oxide particles, conductive nitride compounds, doped semiconductors made from silicon and germanium, and others that are commercially used in fuel cells in the form of high surface area powders, fibers, and other physically obtainable forms. The electrocatalyst on the support material can then be applied to a GDL conductive cathode substrate for forming the electrocatalyst layer on the GDE structure. The electrocatalyst on the GDL conductive support can be applied by many available methods, including spray deposition when the catalyst mix is placed into a solvent or liquid carrier, as well as by deposition by ink jet and air-brush methods and the like. Other methods can be the preparation and application of wet pastes that can then be dried, condensed, and bonded under heat and pressure onto the GDL substrate. The GDL substrate, which allows the $CO_2$ gas to pass to the electrocatalyst layer, can be constructed of various materials such as conductive carbon or graphite in the form of planar fibers and papers, felts and the like. The GDL can also incorporate additional materials such as a layer of metal screen or metal particles to provide good electrical conductivity within the GDE structure and to the cathode current collector.

Anode Materials

The selection of the anode materials and anode electrocatalysts for electrochemical cell 402 depends on the selected anode reaction for the electrochemical cell and process. For oxygen evolution, titanium can be the preferred current collector substrate as well as the substrate for the electrocatalyst material. The electrocatalyst material can consist of precious metals such as Au, Ir, Ru, Rh, and Pt as metals, as well as a combination of these metals as alloys, or as a combination of their oxides and oxide mixtures with each other and with other metal and metal oxides as is well known in the industry as dimensionally stable anodes or mixed metal oxides (MMO's). Other metal oxides in the mixtures can include the oxides of titanium, tantalum, and tin and the like. The electrocatalyst can be applied by various deposition methods such as CVD (chemical vapor deposition), electroplating, and the application of dissolved metal salts in a solvent on the substrate followed by thermally converted to the corresponding oxides, in order to form MMO coatings. Additionally, nanoparticles of the metals and oxides of these materials can also be applied to the anode surface to form high surface area electrode coatings, and can incorporate a small amount of a binder material, such as Nafion™, to bind the catalysts to the surface. The selected binder material may preferably be oxidation resistant. Alternatively, the nanoparticles can also be applied to the cation exchange membrane surface, as is well known in the art of the fabrication of fuel cells in utilizing an MEA (membrane electrode assembly) type material. Other binders can include polymers and plastics, such as PVDF (polyvinylidene difluoride), PVC (polyvinyl chloride), PTFE and the like.

For bromine and iodine anode oxidation chemistry in electrochemical cell 402, carbon and graphite can be particularly suitable for use as anodes. The anode can include electrocatalytic coatings applied to the surfaces of the base electrically conductive anode structure. For the oxidation of HBr, the use of acid anolytes, and the generation of oxygen from oxidizing water, the preferred electrocatalytic coatings can include precious metal oxides such as ruthenium and iridium oxides, as well as platinum and gold and their combinations as metals and oxides on valve metal substrates including titanium, tantalum, zirconium, or niobium. For bromine and iodine anode chemistry, carbon and graphite are particularly suitable for use as anodes. Polymeric bonded carbon material can also be used. High surface area anode structures that can be used, which would help promote the reactions at the anode surfaces. The high surface area anode base material can be in a reticulated form composed of fibers, sintered metal powder, sintered screens, and the like, and can be sintered, welded, or mechanically connected to a current distributor back plate that is commonly used in bipolar electrochemical cell assemblies. In addition, the high surface area reticulated anode structure can also contain areas having additional applied catalysts on and near the electrocatalytic active surfaces of the anode surface structure to enhance and promote reactions that can occur in the bulk solution away from the anode surface, such as the reaction between bromine and the carbon based reactant being introduced into the anolyte. The anode structure can be gradated, such that the density of the anode varies in the vertical or horizontal direction to allow the easier escape of gases from the anode structure. In this gradation, there can be a distribution of particles of materials mixed in the anode structure that can contain catalysts, for example, precious metals such as platinum and precious metal oxides such as ruthenium oxide, in addition to other catalysts such as transition metal oxide catalysts.

The electrochemical cell 402 anode can also comprise flat carbon/graphite plates, RVC (reticulated vitreous carbon) foams, carbon cloth, or carbon felts/tissue. Carbon cloth can be used as an electrically conductive material to provide good electrical contact with the anode back plate current collector.

Suitable anode structures can include: plates made from carbon or graphite, RVC, carbon cloth woven with or without an activated carbon layer, various loadings of PTFE, carbon paper and tissue, carbon felts, woven and non-woven carbon fibers, conductive diamond films, iridium, platinum, and ruthenium oxide coatings on titanium materials such as expanded metal or screens, ruthenium and iridium oxide plated or deposited onto a carbon felt or carbon cloth as an electrocatalyst, electrocatalyst coated graphene, and other suitable commercial anode materials used in electrochemical processes and fuel cells.

Cation Exchange Membranes

Membranes especially preferred as the separators for cation exchange membrane separator 414 in embodiments for electrochemical cell 402 include those that have a high rejection efficiency to anions and that readily allow cations to pass through the membrane. In addition, the cation exchange membrane may need to be resistant to oxidation. Examples of these membrane types having a fluorinated hydrocarbon backbone can be perfluorinated sulfonic acid based cation exchange membranes such as DuPont Nafion™ brand unreinforced types N117 and N120 series, and PTFE fiber reinforced N324 and N424 types, and similar related membranes manufactured by Japanese companies under the supplier trade names such as Flemion.

Hydrocarbon based membranes, which are made from various cation exchange materials, can also be used if the anion rejection is not as important, such as those sold by Sybron under their trade name Ionac, by AGC Engineering (Asahi Glass) under their Selemion trade name, and by Tokuyama Soda, among others on the market. These hydrocarbon-based membranes can be specially prepared from ion exchange materials that are bonded together in a suitable bonding matrix such as polyethylene, polypropylene, and polyvinylchloride (PVC) as examples. Other membrane types can use a microporous separator and have an impregnated ion exchange material that can be chemically bonded or adhered to the separator, such as Nafion™ infused or bonded to a PVDF or PTFE separator, or other ionic materials, such as ionic liquids that can be used to prepare solid gel-type membranes and the like, as long as they are chemically suitable for the liquid phase solutions contemplated in electrochemical cell 402. The membrane and separator materials suggested or described herein can also be employed in the various other electrochemical cells designs and methods disclosed in this application that are non-aqueous or aqueous based.

For the anode reaction with the generation of oxygen, electrocatalytic coatings of precious metals, such as platinum, and precious metal oxides such as ruthenium and iridium oxides and their combinations as metals and oxides on valve metal substrates such as titanium, tantalum, or niobium are suitable. As described herein, high surface area anode structures can also be used.

Dilute inorganic acids can be used as the anolyte, such as hydrogen halides, sulfuric acid, or phosphoric acid, with the addition of water into the anolyte compartment to compensate for water losses as needed or desired.

Without further elaboration, it is believed that persons familiar with the technology involved here using the preceding description can utilize the invention to the fullest extent. The following examples are illustrative only, and are not meant to be an exhaustive list of all possible embodiments, applications or modifications of the invention.

SPECIFIC EXAMPLE 1

Specific Example 1 illustrates a procedure to create an electrolyzer with a Helper Membrane. The embodiment of Specific Example 1 demonstrates improved performance over earlier electrochemical cells used for $CO_2$ conversion.

Measurements were conducted in an electrolysis cell with an anode, cathode, and anion-conducting polymer electrolyte membrane held in Fuel Cell Technologies 5 cm² fuel cell hardware assembly with serpentine flow fields.

The cathode in Specific Example 1 was prepared as follows. Silver ink was made by mixing 30 mg of silver nanoparticles (20-40 nm, 45509, Alfa Aesar, Ward Hill, Mass.) with 0.1 ml deionized water (18.2 Mohm, EMD Millipore, Billerica, Mass.) and 0.2 ml isopropanol (3032-16, Macron Fine Chemicals, Avantor Performance Materials, Center Valley, Pa.). The mixture was then sonicated for 1 minute. The silver ink was then hand-painted onto a gas diffusion layer (Signet 35 BC GDL, Ion Power Inc., New Castle, Del.) covering an area of 2.5 cm×2.5 cm.

The anode in Specific Example 1 was prepared as follows. $RuO_2$ ink was made by mixing 15 mg of $RuO_2$ (11804, Alfa Aesar) with 0.2 ml deionized water (18.2 Mohm Millipore), 0.2 ml isopropanol (3032-16, Macron) and 0.1 ml of 5% Nafion™ solution (1100EW, DuPont, Wilmington, Del.). The $RuO_2$ ink was then hand-painted onto a gas diffusion layer (Sigracet 35 BC GDL, Ion Power, Inc.) covering an area of 2.5 cm×2.5 cm.

The PSMMIM membrane was prepared following the synthetic route in FIG. 3. "PSMMIM" refers to a co-polymer of polystyrene and poly 1-(p-vinylbenzyl)-3-methyl-imidazolium:

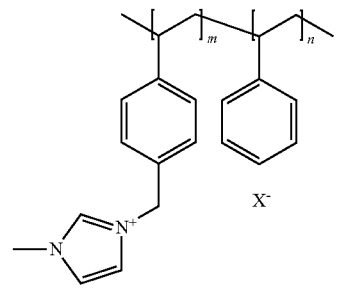

where $X^-$ is an anion and m>0 and n>0.

The first inhibitor free styrene was prepared by washing styrene (Sigma Aldrich, Saint Louis, Mo.) with two equal volumes of 7.5% aqueous sodium hydroxide. The inhibitor free styrene was then washed with four equal volumes of water to make sure it was neutralized, and was then dried over anhydrous magnesium sulfate. Inhibitor TBC in 4-vinylbenzyl chloride (4-VBC) was removed by extraction with 0.5% potassium hydroxide solution until a colorless extract was obtained. This extract was washed with water until neutral and then was dried over anhydrous magnesium sulfate.

Poly(4-vinylbenzyl chloride-co-styrene) was then synthesized by heating a solution of inhibitor free styrene (Sigma-Aldrich) (10.0581 g, 96.57 mmol) and 4-vinylbenzyl chloride (Sigma-Aldrich) (6.2323 g, 40.84 mmol) in chlorobenzene (Sigma-Aldrich (15 ml) at 60-65° C. in an oil bath for 12-18 hours under argon gas with AIBN (α,α'-Azoisobutyronitrile, Sigma-Aldrich) (0.1613 g, 0.99 wt % based on the total monomers weight) as initiator. The copolymer was precipitated in $CH_3OH$/THF (methanol/tetrahydrofuran) and dried under vacuum.

Polystyrene methyl-methyimidazolium chloride (PSMMIM 2.3:1) was synthesized by adding 1-methylimidazole (Sigma-Aldrich) (2.8650 g, 0.0349 mol) to the solution of the poly(4-VBC-co-St) (5.0034 g) in anhydrous N,N-Dimethylformamide (DMF) (Sigma-Aldrich) (30 ml). The mixture was then stirred at room temperature for 0.5-1 hour, and then heated at 110-120° C. for 50.3 hours to form a PSMMIM 2.3:1 solution.

"4-VBC-co-St" or "poly(4-vinylbenzyl chloride-co-styrene)" as used here refers to a co-polymer of styrene and 4-vinylbenzyl chloride:

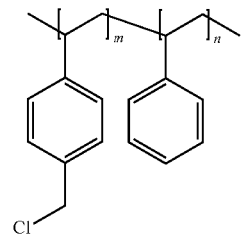

The membranes were prepared by casting the PSMMIM solution prepared above directly onto a flat glass surface. The thickness of the solution on the glass was controlled by a film applicator (MTI Corporation, Richmond, Calif.) with an adjustable doctor blade. The membranes were then dried in a vacuum oven at 80° C. for 300 minutes, and then 120° C. for 200 minutes. Chloride ion in the membranes was removed by soaking the membranes in 1 M KOH solution for 24 hours.

The resultant membrane was tested and determined to meet the classification as a Helper Membrane according to the test set forth in the Summary of the Invention section of the present application. The membrane was sandwiched between the anode and the cathode with the metal layers on the anode and cathode facing the membrane, and the whole assembly was mounted in a Fuel Cell Technologies 5 cm² fuel cell hardware assembly with serpentine flow fields.

$CO_2$ humidified at 50° C. was fed into the cathode at a rate of 5 sccm, the cell was operated at atmospheric pressure with the anode inlet and outlet left open to the atmosphere, 3.0 V were applied to the cell, and the cathode output composition was analyzed with an Agilent 6890 gas chromatograph (GC)/TCD (Agilent Technologies, Santa Clara, Calif.) equipped with a Carboxen 1010 PLOT GC column (30 m×320 um) (Sigma Aldrich). No heating was applied to the cell.

Initially the cell produced 100 mA/cm², but the current dropped and held steady at 80 mA/cm² after a few minutes of operation. GC analysis after 30 minutes of operation showed that the output of the cell contained $CO_2$, CO and a small amount of hydrogen. Selectivity was calculated at 94% where:

$$\text{Selectivity} = \frac{(\text{CO production rate})}{(\text{CO production rate} + H_2 \text{ production rate})}$$

Therefore, PSMMIM is properly classified as a Helper Membrane.

In a second trial, water was fed into the anode of the cell to keep the PSMMIM hydrated. In that case the membrane was able to maintain over 90% selectivity for 200 hours.

During both runs the leakage current was checked and was negligible. Furthermore, there were no other products on the cathode. As such, the Faradaic efficiency was equal to the Selectivity.

COMPARATIVE EXAMPLE 1

Comparative Example 1 measured the steady state current and Faradaic efficiency of an electrolyzer constructed following the teachings of the '583 publication that claimed to disclose a system that "may provide selectivity of methanol as part of the organic product mixture, with a 30% to 95% Faradaic yield for carbon dioxide to methanol, with the remainder evolving hydrogen." However, the '583 publication fails to provide data demonstrating a 30% to 95% Faradaic yield when the cathode is liquid free. In Comparative Example 1 a cell was built following the teachings in the '583 publication and the Faradaic efficiency was measured at room temperature with a liquid free cathode.

Following the teachings in the '583 publication, the cathode was prepared as follows. First a platinum nanoparticle ink was made by mixing 10 mg of platinum black (12755, Alfa Aesar) with 0.2 ml deionized water (18.2 Mega-ohm Millipore) and 0.2 ml isopropanol (3032-16, Macron). The mixture was then sonicated for 1 minute. The platinum nanoparticle ink was then hand-painted onto a gas diffusion layer (Sigracet 35 BC GDL, Ion Power) covering an area of 2.5 cm×2.5 cm.

The platinum catalyst layer was then coated with a thin layer of poly(4-vinylpyridine) (P4VP, average MW: -~60,000, Sigma Aldrich) by brushing 0.2 ml of 1% P4VP ethanol solution. Then the platinum catalyst layer was immersed in 1 M $H_2SO_4$ solution (A300C-212, Fisher Chemical, Pittsburgh, Pa.) to protonate pyridine.

The anode was prepared as in Specific Example 1. Specifically, $RuO_2$ ink was made by mixing 15 mg of $RuO_2$ (11804, Alfa Aesar) with 0.2 ml deionized water (18.2 Mega-ohm Millipore), 0.2 ml isopropanol (3032-16, Macron) and 0.1 ml of 5% Nafion™ solution (1100EW, DuPont). The $RuO_2$ ink was then hand-painted onto a gas diffusion layer (Sigracet 35 BC GDL, Ion Power) covering an area of 2.5 cm×2.5 cm.

Next a proton exchange membrane (Nafion 117, DuPont) was sandwiched between the anode and cathode with the metal coatings facing the membrane, and the whole assembly was mounted in Fuel Cell Technologies 5 cm² fuel cell hardware assembly with serpentine flow fields.

The cell was tested using the procedures in Specific Example 1. Specifically, $CO_2$ humidified at 50° C. was fed into the cathode at a rate of 5 sccm, the cell was at room temperature and atmospheric pressure, the anode inlet and outlet were left open to the atmosphere, 3.0 V were applied to the cell, and the cathode output composition was analyzed with an Agilent 6890 gas chromatograph (GC)/TCD equipped with a Carboxen 1010 PLOT GC column (30 m×320 um). No heating was applied to the cell.

The total cell current was found to be 80 mA/cm² but no methanol or other $CO_2$ reduction products could be detected. Instead hydrogen was the only product detected by GC. There was no evidence for methanol condensation in the tubing. Based on the measurements, the selectivity and Faradaic efficiency of a cell constructed following the teachings of the '583 publication with a liquid free cathode is near zero. The $CO_2$ current is also near zero at room temperature.

Note that the GC results show that the methanol concentration in the gas phase is negligible, and methanol cannot condense at room temperature until the partial pressure of methanol in the gas phase reaches about 13 kPa, where 13 kPa is the vapor pressure of methanol at room temperature.

SHIRONITA I also was unable to detect $CO_2$ reduction products in a similar experiment, but was able to detect products when heating the cell to 90° C. However, the Faradaic efficiency was still low.

Table 1 lists the observed Faradaic efficiencies and $CO_2$ conversion currents at room temperature for various membranes and catalyst(s) combinations for various cells disclosed in prior research as well as the results from Specific Example 1 and Comparative Example 1. The Faradaic efficiencies were calculated after 1 hour in a steady state, constant voltage experiment. In some cases, higher efficiencies are reported by cycling the potential. As can be seen, the use of the Helper Membrane raised the Faradaic efficiency by roughly a factor of 3 and the product current by a factor of 16.

TABLE 1

| Reference | Faradaic efficiency % | Membrane | Catalyst | Total Current at cell potential 3 V (mA/cm²) | Maximum $CO_2$ Conversion Current at ≤3 V (mA/cm²) |
|---|---|---|---|---|---|
| Delacourt, C., et al., "Design of an Electrochemical Cell Making Syngas (CO + $H_2$) from $CO_2$ and $H_2O$ Reduction at Room Temperature", *J. Electrochem. Soc.* 155 (2008), pages B42-B49. | 0 | Nafion | Ag | Not reported | 0 |
| Dewolf, D., et al. "The electrochemical reduction of $CO_2$ to $CH_4$ and $C_2H_4$ at Cu/Nafion electrodes (solid polymer electrolyte structures)" *Catalysis Letters* 1 (1988), pages 73-80. | 19 | Nafion | Cu | 1 | 0.2 |
| Aeshala, L., et al., "Effect of solid polymer electrolyte on electrochemical reduction of $CO_2$", *Separation and Purification Technology* 94 (2012), pages 131-137. | 15 | Nafion SPEEK Alkali doped PVA | Cu | 5.6 | 0.8 |
| Aeshala, L., et al., "Effect of cationic and anionic solid polymer electrolyte on direct electrochemical reduction of gaseous $CO_2$ to fuel", *Journal of $CO_2$ Utilization* 3 (2013), pages 49-55. | 32 | Acid doped CMI-7000 Alkali doped AMI-7001 | Cu | 6 | 1.7 |
| Genovese, C., et al., "A Gas-phase Electrochemical Reactor for Carbon Dioxide Reduction Back to Liquid Fuels", *AIDIC Conference Series* 11 (2013), pages 151-160. | 12 | Nafion | Pt/Fe | 20 | 2.4 |
| Aeshala, L., et al., "Electrochemical conversion of $CO_2$ to fuels: tuning of the reaction zone using suitable functional groups in a solid polymer electrolyte", *Phys. Chem. Chem. Phys.* 16 (2014), pages 17588-17594. | 20 | Alkali doped PVA/PEI | Cu | 20 | 4 |
| Specific Example 1 | 94 | PSMMIM | Ag | 80 | 75 |
| Comparative Example 1 | ~0 | Nafion | Pt | 80 | 0 |

COMPARATIVE EXAMPLE 2

Comparative Example 2 was conducted to determine whether Nafion™, sulfonated Poly(Ether Ether Ketone) "SPEEK", polyvinyl alcohol (PVA), polyethylenimine (PEI), CMI-7000, AMI 7001, phosphoric acid doped PBI or Neosepta membranes act as Helper Membranes when pretreated as described in the earlier literature as described in Table 1.

Nafion 117 was purchased from Ion Power Technologies, Inc., of Wilmington, Del. It was boiled in 5% $H_2O_2$ for 1 hour and it was then boiled in Millipore water for 1 hour. The Nafion 117 was then boiled in 0.5 M sulfuric acid for an hour, and then boiled again in Millipore water for 1 hour.

Neosepta BP-1E was purchased from Ameridia Division of Eurodia Industrie S.A. in Somerset, N.J. It was pretreated by dipping it in water as recommended by the manufacturer. It was then tested to determine whether it met the classification as a Helper Membrane according to the test set forth in the Summary of the Invention section of the present application. The selectivity was 34%, below the 50% require to be classified as a Helper Membrane.

CMI-7000 and AMI-7001 were purchased from Membranes International Inc. of Ringwood, N.J. An alkali doped AMI-7001 was prepared following the procedure outlined in Aeshala, L., et al., "Effect of cationic and anionic solid polymer electrolyte on direct electrochemical reduction of gaseous $CO_2$ to fuel", *Journal of $CO_2$ Utilization* 3 (2013), pages 49-55 ("AESHALA I"). First the AMI-7001 was soaked in a 0.5 molar potassium hydroxide (KOH) solution overnight to create basic sites in the membrane. Excess KOH was then washed off by soaking the membrane in water for 6 hours. The membrane was then tested to determine whether it met the classification as a Helper Membrane according to the test set forth in the Summary of the Invention section of the present application. Both the selectivity (25%) and product current (2.5 mA/cm²) were low, as reported in Table 2 below, indicating that an alkali doped AMI-7001 membrane as pretreated according to AESHALA I is not a Helper Membrane.

Similarly, the acid doped CMI-7000 was pretreated following the procedure outlined in AESHALA I. First the membrane was soaked in 0.5 M $H_2SO_4$ overnight, then it was soaked in water for 6 hours. The membrane was then tested to determine whether it met the classification as a Helper Membrane according to the test set forth in the Summary of the Invention section of the present application. GC analysis showed only traces of CO formation, indicating that this membrane is not a Helper Membrane.

Alkali doped PVA was synthesized following the procedure outlined in Aeshala, L., et al., "Effect of solid polymer electrolyte on electrochemical reduction of $CO_2$", *Separation and Purification Technology* 94 (2012), pages 131-137 ("AESHALA II"). PVA (stock #363081) was purchased from Sigma-Aldrich Corporation. 9 grams of PVA were dissolved in 90 ml of water at 90° C. The solution was cast onto a petri dish. After the cast films had dried, they were immersed in glutaraldehyde (10% in acetone solutions) mixed with small quantities of catalytic HCl for one hour to encourage cross-linking. The films were then rinsed several times with Millipore water, activated by immersion in 0.5 M NaOH for 24 hours, and then rinsed before use. The membrane was then tested to determine whether it met the classification as a Helper Membrane according to the test set forth in the Summary of the Invention section of the present application. While the selectivity (52%) was relatively high, the product current (7.5 mA/cm$^2$) was low, as reported in Table 2 below, indicating that an alkali doped PVA membrane as pretreated according to AESHALA II is not a Helper Membrane.

An alkali doped PVA/PEI composite was synthesized following the procedure outlined in Aeshala, L., et al., "Electrochemical conversion of $CO_2$ to fuels: tuning of the reaction zone using suitable functional groups in a solid polymer electrolyte", Phys. Chem. Chem. Phys. 16 (2014), pages 17588-17594 (AESHALA III). A PEI (item number 408727) was purchased from Sigma-Aldrich Corporation. 6 grams of PVA and 3 grams of PEI were dissolved in 90 ml of water at 90° C. The solution was cast onto a petri dish. After the cast films had dried, they were immersed in glutaraldehyde (10% in acetone solutions) mixed with small quantities of catalytic HCl for one hour to encourage cross-linking. The films were then rinsed several times with Millipore water. They were then activated by immersion in 0.5 M NaOH for 24 hours and then rinsed before use.

The membrane was then tested to determine whether it met the classification as a Helper Membrane according to the test set forth in the Summary of the Invention section of the present application. Both the selectivity (16%) and the product current (1.6 mA/cm$^2$) were low, as reported in Table 2 below, indicating that an alkali doped PEI/PVA membrane as pretreated according to AESHALA III is not a Helper Membrane.

SPEEK was prepared following the procedure in the procedure outlined in AESHALA II. A PEEK film was purchased from CS Hyde Company (Lake Villa, Ill.). 1 g of the PEEK was exposed to 50 ml of concentrated sulfuric acid for 50 hours under constant agitation. All of the PEEK had dissolved at the end of the 50 hours and had converted to SPEEK. 200 ml of Millipore water was placed in an ice bath and allowed to cool to near 0° C. The SPEEK solution was then slowly poured into the Millipore water under constant agitation. The SPEEK precipitated out of the water solution, was filtered, and was then washed multiple times to remove excess sulfuric acid. The SPEEK was then dried at 100° C. for 8 hours in a vacuum oven. Next the SPEEK was dissolved in dimethylacetamide. The resultant solution was cast on a glass slide. The membrane was then tested to determine whether it met the classification as a Helper Membrane according to the test set forth in the Summary of the Invention section of the present application. Both the selectivity (2.5%) and the product current (0.13 mA/cm$^2$) were low, as reported in Table 2 below, indicating that a SPEEK membrane as pretreated according to AESHALA II is not a Helper Membrane.

Phosphoric Acid doped PBI was prepared as follows. PBI was purchased from PBI Performance Products, Inc. (Rock Hill, S.C.) and acid doped by immersing it in 0.5 M $H_3PO_4$ for 24 hours. It was then soaked in water for 1 hour to remove excess acid. The membrane was then tested to determine whether it met the classification as a Helper Membrane according to the test set forth in the Summary of the Invention section of the present application. Again the current and selectivity were low.

Notice that Nafion™, SPEEK, alkali doped PVA, alkali doped PVA/PEI, Acid doped CMI-7000, Alkali doped AMI-7001 Neosepta, and P—PBI are not Helper Membranes.

SPECIFIC EXAMPLE 2

The object of this example was to determine whether changes in the membrane doping could activate a membrane for $CO_2$ conversion. AMI-7001 and CMI-7000 were chosen as test examples since they have the same polystyrene backbone as in PSMMIM and PSDMIM, but different amine groups, so they might be able to be activated.

The AMI-7001 was pretreated by soaking the membrane in a 1 M NaCl solution for one hour, followed by soaking in water for about 3 hours.

The selectivity rose to 70%. The current density was still low (3.5 mA/cm$^2$). So this membrane is still not a Helper Membrane but its performance is much better.

The CMI-7000 was pretreated using the same procedure. Again, the selectivity rose to 72%. The current density was still low (15 mA/cm$^2$).

Still, it is possible that the current could be raised if thinner membranes were made with the same bulk composition as AMI-7001 and CMI-7000, and then the membranes were doped with NaCl. Such a membrane could be a Helper Membrane.

SPECIFIC EXAMPLE 3

The objective of Specific Example 3 is to provide another example of a Helper Membrane.

Preparation of PSDMIM: Poly(4-vinylbenzyl chloride-co-styrene) was prepared as in Specific Example 2. 1,2-dimethylimiazole (Sigma-Aldrich) (2.8455 g, 0.0296 mol) is added to the solution of the poly(4-VBC-co-St) (5.0907 g) in anhydrous N,N-Dimethylformamide (DMF) (Sigma-Aldrich) (30 ml). The mixture was stirred at room temperature for 0.5-1 hour, and then heated at 110-120° C. for 66.92 hours. PSDMIM was obtained as a yellowish solid after purification by precipitation into diethyl ether.

A PSDMIM membrane was formed as in Specific Example 2. Then the membrane was tested as in Specific Example 1. The results are given in Table 2 below. PSDMIM refers to a co-polymer of styrene and 1-(p-vinylbenzyl)-2,3-dimethyl-imidazolium:

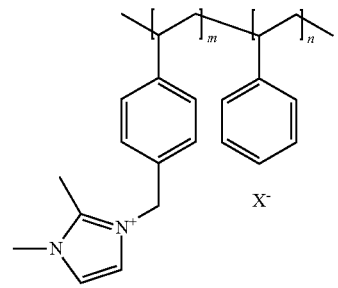

where X$^-$ is an anion and m>0 and n>0.

SPECIFIC EXAMPLE 4

The objective of Specific Example 4 is to provide an example of a Helper Membrane with a pyridinium group.

Preparation of PSMP: poly(4-vinylbenzyl chloride-co-styrene) was prepared as in Specific Example 2. Pyridine (Sigma-Aldrich) is added to the solution of the poly(4-VBC-co-St) (5.0907 g) in anhydrous N,N-Dimethylformamide (DMF) (Sigma-Aldrich) (30 ml). The mixture was stirred at room temperature for 0.5-1 hour, and then heated at 110-

120° C. for 66.92 hours. PSMP was obtained as a brownish solid after purification by precipitation into diethyl ether. PSMP refers to a material that contains a co-polymer of styrene and 1-(p-vinylbenzyl)-pyridinium.

A PSMP membrane was formed as in Specific Example 2. The resultant membrane did not have a uniform thickness, but the membrane was still suitable to test. The film was tested as in Specific Example 1 and qualified as a Helper Membrane.

Table 2 shows the Faradaic efficacies and currents observed for the Helper Membranes disclosed in this application along with those of the membranes discussed in earlier studies. In each case the membranes were tested and determined to meet the classification as a Helper Membrane according to the test set forth in the Summary of the Invention section of the present application.

TABLE 2

|  | Membrane | Selectivity | Current at 3 V (mA/cm$^2$) | Current for carbon containing products (mA/cm$^2$) |
|---|---|---|---|---|
| Membranes from the previous literature | Nafion 117 | 0% | 72 | 0 |
|  | Neosepta | 34% | 24 | 8 |
|  | Acid doped[1] CMI-7000 | 0.02% | 35 | 0.007 |
|  | Alkali doped[1] AMI-7001 | 25% | 10 | 2.5 |
|  | SPEEK[2] | 2.5% | 5 | 0.13 |
|  | Alkali doped PVA[2] | 52% | 15 | 7.5 |
|  | Alkali doped PEI/PVA[3] | 16% | 10 | 1.6 |
|  | H$_3$PO$_4$ doped PBI | 14.7% | 8 | 1.2 |
| Membranes disclosed here | NaCl doped[4] CMI-7000 | 73% | 21 | 15 |
|  | NaCl doped[4] AMI-7001 | 70% | 5 | 3.5 |
|  | PSMMIM[4] | 95% | 80 | 75 |
|  | PSDMIM[4] | 93% | 80 | 72 |
|  | PSMP[4] | 83% | 25 | 20.8 |

[1]Doped following the procedure in AESHALA I.
[2]Doped by the procedure in AESHALA II
[3]Doped by the procedure in AESHALA III
[4]Doped by a procedure disclosed here

SPECIFIC EXAMPLE 5

The objective of this example was to examine the effects of the fraction of the amine in the polymer on the performance. The Helper Membrane was made from methylimidazolium-poly(4-vinylbenzylchloride-co-styrene) chloride (PSMIM-Cl) polymer solution of various compositions.

PSMIM-Cl solution (in anhydrous dimethylformamide) was prepared by a two-step reaction process: (1) Poly(4-VBC-co-St) synthesis from the reaction of styrene (St) with 4-vinylbenzyl chloride (4-VBC) in chlorobenzene under argon gas (S.J. Smith, Urbana, Ill.) protection with 2,2'-Azobis(2-methylpropionitrile) (AIBN) as initiator. (2) Poly (4-VBC-co-St) was reacted with 1-methylimidazole at 50-120° C. for more than 48 hours to obtained PSMIM-Cl polymer solution.

Synthesis of poly(4-vinylbenzyl chloride-co-styrene): A solution of inhibitor free styrene (Sigma-Aldrich) (10.0581 g, 96.57 mmol) and 4-vinylbenzyl chloride (Sigma-Aldrich) (6.2323 g, 40.84 mmol) in chlorobenzene (Sigma-Aldrich) (15 ml) was heated at 60-65□ in an oil bath for 12-18 hours under argon gas with AIBN (Sigma-Aldrich) (0.1613 g, 0.99 wt % based on the total monomers weight) as initiator. The copolymer was precipitated in CH3OH/THF and dried under vacuum. VBC content in the copolymer was 38.26 wt %.

Synthesis of methylimidazolium-poly(4-VBC-co-St) chloride (MIM-poly(4-VBC-co-St)-Cl): 1-methylimiazole (Sigma-Aldrich) (2.8650 g, 0.0349 mol) was added to the solution of the poly(4-VBC-co-St) (5.0034 g) in anhydrous N,N-Dimethylformamide (DMF) (Sigma-Aldrich) (30 ml). The mixture was stirred at room temperature for 0.5-1 hour, and then heated at 110-120° C. for 50.3 hours.

Membranes preparation: The membrane preparation steps were: (1) Cast PSMIM-Cl polymer solution prepared above onto a flat glass (8 cm×10 cm) with a 0.1 to 1 ml pipette. (2) Put the glass plate with membranes in an oven (MTI Corporation); the membranes were then dried at 80° C. for 4 hours and then 120° C. for another 2 hours under the protection of nitrogen. (3) After the oven temperature cooled down to room temperature, the membranes were taken out and soaked in a 1 M KOH (Fisher Scientific, Fair Lawn, N.J.) bath. Membranes were peeled off from the substrates and soaked in 1 M KOH solution for at least 24 hours for complete anion exchange (Cl$^-$→OH$^-$) before testing.

The synthesis procedure for the PSMIM-Cl polymer solution with VBC content of 38.26 wt % and the membrane fabrication procedure were used for the synthesis of PSMIM-Cl with VBC compositions of 46 wt % and 59 wt % respectively. The testing results of these membranes are summarized in Table 3 below. Membrane current density increases with increasing functional group VBC content in the copolymer, while mechanical strength of membranes gets worse. The membrane with 59 wt % VBC is very soft and its mechanical strength is very weak.

TABLE 3

| Membrane # | 1 | 2 | 3 |
|---|---|---|---|
| VBC in copolymer (wt %) | 38 | 46 | 59 |
| Cell potential (V) | 3.0 | 2.8 | 2.8 |
| Current (mA/cm$^2$) | 52 | 60 | 130 |
| CO selectivity (%) | 94.38 | 93.35 | 94.88 |

Fitting the data to an exponential curve, and extrapolating to lower VBC content shows that the current will be above 20 mA/cm$^2$, where the cm$^2$ is measured as the area of the cathode gas diffusion layer that is covered by catalyst particles, when there is at least 15% VBC in the polymer. This corresponds to a styrene to (p-vinylbenzyl)-3-methyl-imidazolium ratio of no more than 7.

SPECIFIC EXAMPLE 6

The objective of this example is to provide examples of reinforced helper membranes. In particular, Helper Membranes will be provided made from blends of methylimidazolium-poly(4-vinylbenzylchloride-co-styrene) chloride (PSMIM-Cl) and polymer matrix such as polybenzimidazole (PBI), poly(2,6-dimethyl-1,2-phenylene oxide) (PPO), Nylon 6/6, or polyethylene (PE).

PSMIM-Cl solution (in anhydrous dimethylformamide) was prepared by a two-step reaction process: (1) poly(4-VBC-co-St) was synthesized from the reaction of styrene (St) with 4-vinylbenzyl chloride (4-VBC) in chlorobenzene under argon gas (S.J. Smith) protection with 2,2'-Azobis(2-methylpropionitrile) (AIBN) as initiator; (2) poly(4-VBC-co-St) was reacted with imidazole at 50-120° C. for more than 48 hours to obtained PSMIM-Cl solution.

PBI polymer solution was prepared by diluting 27.5264 g of about 26.6 wt % PBI solution (PBI Performance Products. Inc., Charlotte, N.C.) with anhydrous dimethylacetamide (DMAc) (Sigma Aldrich) to 78.3578 g. The concentration of the resulting PBI solution was 9.34 wt %.

Nylon 6/6 solution was prepared by adding 4.6065 g of Nylon 6/6 (Sigma Aldrich) into 24.3218 g of about 97% formic acid (Acros Organics, Geel, Belgium) and 2.5625 g anhydrous methanol (Avantor Performance Materials Inc.) mixture. Nylon pellets were allowed to dissolve for several hours at room temperature, then in a Branson 2510 sonication bath (Sonics Online, Richmond, Va.) until a homogeneous white emulsion was obtained. The concentration of the resulting Nylon solution is 14.83 wt %.

10.2 wt % PPO solution was prepared by dissolving 0.5099 g of PPO (Sigma Aldrich) in 5 ml chlorobenzene (Fisher Scientific).

15 wt % PE solution was prepared by dissolving 4.5 g of PE (Sigma Aldrich) in 30 ml xylenes (Fisher Scientific). PE completely dissolved in xylenes at 70-80° C.

Preparation procedure of Helper Membrane #4 from blends of PSMIM-Cl and PBI: (1) Add 0.1 ml PBI polymer solution into 4 ml PSMIM-Cl solution (VBC content in the copolymer was 46 wt %) and light brown precipitate was immediately formed. The solid in the polymer solution was dispersed by ultra-sonication with an ultrasonic probe (tip diameter 3 mm) (Sonic & Materials. Inc., Newtown, Conn.) until a homogeneous brown emulsion was obtained. (2) Cast the resulting polymer solution on a glass plate (8 cm×10 cm) with a 0.1 to 1 ml pipette. (3) Put the glass plate with membranes in an oven (MTI Corporation); the membranes were then dried at 80° C. for 4 hours and then 120° C. for another 3 hours under the protection of nitrogen. (4) After oven temperature cooled down to room temperature, take the membranes out and soaked in a 1M KOH (Fisher Scientific) bath, membranes were peeled off from the substrates and soaked in 1 M KOH solution for at least 24 hours for complete anion exchange (Cl$^-$→OH$^-$) before testing.

The obtained light brown PSMIM-Cl and PBI blend membranes were transparent and homogeneous with very good mechanical strength.

The PSMIM-Cl and PBI blend membrane #4 preparation procedure was used for the preparation of PSMIM-Cl and PBI blend Membranes #5, 6 and 7. The ratio of PSMIM-Cl solution to PBI solution was varied, as shown in Table 4 below.

The membranes were tested and determined to meet the classification as a Helper Membrane according to the test set forth in the Summary of the Invention section of the present application. The testing results are summarized in Table 4 below.

TABLE 4

| Membrane # | 4 | 5 | 6 | 7 |
|---|---|---|---|---|
| VBC in copolymer (wt %) | 46 | 46 | 46 | 59 |
| PSMIM-Cl (ml) | 4 | 2 | 4 | 4 |
| PBI (ml) | 0.1 | 0.25 | 0.5 | 0.5 |
| Functional group in blend membrane (wt %) | 45.29 | 42.67 | 42.67 | 55.04 |
| Cell potential (V) | 3 | 3 | 3 | 3 |
| Current (mA/cm$^2$) | 105 | 70 | 86 | 104 |
| CO selectivity (%) | 88.95 | 88.75 | 92.31 | 93.22 |

Preparation procedure of Helper Membrane from blends of PSMIM-Cl and PPO: (1) Add 0.5 ml of 10.2 wt % PPO polymer solution into 4 ml of PSMIM-Cl solution (VBC content in copolymer was 46 wt %) and white precipitate was immediately formed. The solid in the polymer solution was dispersed by ultra-sonication with an ultrasonic probe (tip diameter 3 mm) (Sonic & Materials. Inc.) until no obvious large particles were observed. (2) The resulting polymer solution was cast on a glass plate (8 cm×10 cm) with a 0.1 to 1 ml pipette. Polymer phase separation was observed. (3) The glass plate with membranes was put in an oven (MTI Corporation); the membranes were then dried at 80° C. for 4 hours and then 120° C. for another 3 hours under the protection of nitrogen. (4) After the oven temperature cooled down to room temperature, the membranes were taken out and soaked in a 1 M KOH (Fisher Scientific) bath, membranes were peeled off from the substrates and soaked in 1 M KOH solution for at least 24 hours for complete anion exchange (Cl$^-$→OH$^-$) before testing.

The dried PSMIM-Cl and PPO blend membrane was transparent, and it turned white in KOH solution. The membrane mechanical strength was good.

The membranes were tested and determined to meet the classification as a Helper Membrane according to the test set forth in the Summary of the Invention section of the present application. The testing results are summarized in Table 5 below.

TABLE 5

| Membrane # | 8 |
|---|---|
| VBC in copolymer (wt %) | 46 |
| PSMIM-Cl (ml) | 4 |
| PPO (ml) | 0.5 |
| Functional group in blend membrane (wt %) | 42.42 |
| Cell potential (V) | 3 |
| Current (mA/cm$^2$) | 105 |
| CO selectivity (%) | 87.17 |

Preparation procedure for Helper Membrane #9 from blends of PSMIM-Cl and Nylon: (1) Added 1 ml 14.83 wt % nylon polymer solution into 4 ml PSMIM-Cl solution (VBC content in copolymer was 38 wt %) and white precipitate was immediately formed. The solid in the polymer solution was dispersed by ultra-sonication with an ultrasonic probe (tip diameter 3 mm) (Sonic & Materials. Inc.) until a homogeneous polymer solution was obtained. (2) The resulting polymer solution was cast on a glass plate (8 cm×10 cm) with a 0.1 to 1 ml pipette. (3) The membrane was air dried in the hood at room temperature overnight. (4) The glass plate with membranes was put in an oven (MTI Corporation); the membranes were then dried at 80° C. for 4 hours and then 120° C. for another 3 hours under nitrogen protection. (5) After the oven temperature cooled down to room temperature, the membranes were taken out and soaked in a 1 M KOH (Fisher Scientific) bath, then the membranes were peeled off from the substrates and soaked in 1 M KOH solution for at least 24 hours for complete anion exchange (Cl$^-$→OH$^-$) before testing.

The obtained PSMIM-Cl and Nylon membrane was off-white and homogenous with decent mechanical strength.

The PSMIM-Cl and Nylon blend membrane #9 preparation procedure was used for the preparation of PSMIM-Cl and Nylon blend membranes #10. The ratio of PSMIM-Cl solution to Nylon solution.

The membranes were tested and determined to meet the classification as a Helper Membrane according to the test set forth in the Summary of the Invention section of the present application. The testing results are summarized in Table 6 below.

TABLE 6

| Membrane # | 9 | 10 |
|---|---|---|
| VBC in copolymer (wt %) | 38 | 46 |
| PSMIM-Cl (ml) | 4 | 4 |

TABLE 6-continued

| Membrane # | 9 | 10 |
|---|---|---|
| Nylon (ml) | 1 | 0.5 |
| Functional group in blend membrane (wt %) | 30.00 | 40.94 |
| Cell potential (V) | 3 | 3 |
| Current (mA/cm$^2$) | 26 | 66 |
| CO selectivity (%) | 56.40 | 84.58 |

Preparation procedure for Helper Membrane #11 from blends of PSMIM-Cl and PE: (1) 1 ml 15 wt % PE hot polymer solution was added into 4 ml of PSMIM-Cl solution (VBC content in copolymer was 46 wt %) and a white precipitate was immediately formed. The solid in the polymer solution was dispersed by ultra-sonication with an ultrasonic probe (tip diameter 3 mm) (Sonic & Materials, Inc.) until a homogeneous polymer solution was obtained. (2) The resulting polymer solution was cast on a glass plate (8 cm×10 cm) with a 0.1 to 1 ml pipette. Polymer phase separation was observed. (3) The glass plate with membranes was put in an oven (MTI Corporation); the membranes were then dried at 80° C. for 4 hours and then 120° C. for another 3 hours under nitrogen protection. (4) After the oven temperature cooled down to room temperature, the membranes were taken out and soaked in a 1M KOH (Fisher Scientific) bath, then the membranes were peeled off from the substrates and soaked in 1 M KOH solution for at least 24 hours for complete anion exchange (Cl$^-$→OH$^-$) before testing.

The obtained PSMIM-Cl and PE membrane was off-white with decent mechanical strength.

The PSMIM-Cl and PE blend membrane #11 preparation procedure was used for the preparation of PSMIM-Cl and PE blend membrane #12. The ratio of PSMIM-Cl solution to PE solution is shown in Table 7 below.

The membranes were tested and determined to meet the classification as a Helper Membrane according to the test set forth in the Summary of the Invention section of the present application. The test results are summarized in Table 7 below.

TABLE 7

| Membrane # | 11 | 12 |
|---|---|---|
| VBC in copolymer (wt %) | 46 | 59 |
| PSMIM-Cl (ml) | 4 | 4 |
| PE (ml) | 0.5 | 0.5 |
| Functional group in blend membrane (wt %) | 40.89 | 52.74 |
| Cell potential (V) | 3 | 3 |
| Current (mA/cm$^2$) | 51.0 | 72 |
| CO selectivity (%) | 73.71 | 92.15 |

Notice that these four polymer mixtures are Helper Membranes, and they are stronger than PSMMIM.

Many polymers related to PBI, PPO, Nylon and PE could also be added to the membrane to improve its strength. PE is a polyolefin. Other polyolefins and chlorinated or fluorinated polyolefins could also be blended with PSMMIM to produce a helper catalyst. PBI contains cyclic amines in its repeat unit. Other polymers containing cyclic amines could also be blended with PSMMIM to produce a Helper Membrane. PPO contains phenylene groups. Other polymers containing phenylene or phenyl groups could also be blended with PSMMIM to produce a Helper Membrane. Nylon contains amine and carboxylate linkages. Other polymers containing amine or carboxylate linkages could also be blended with PSMMIM to produce a Helper Membrane.

SPECIFIC EXAMPLE 7

The objective of this example is to identify a Helper Membrane that does not contain styrene. In particular it will be shown that a terpolymer of methyl methacrylate (MMA), butyl acrylate (BA), and the 1-methyl imidazole adduct of VBC, which will be referred to as methylimidazolium-poly (vinylbenzylchloride-co-methyl methacrylate-co-butylacrylate) chloride (PVMBMIM-Cl) is a Helper Membrane.

PVMBMIM-Cl solution was prepared by a two-step reaction process: (1) poly(VBC-co-MMA-co-BA) synthesis from the reaction of 4-vinylbenzyl chloride (VBC), methyl methacrylate (MMA) and butylacrylate (BA) in toluene under nitrogen gas (S.J. Smith) protection with 2,2'-Azobis (2-methylpropionitrile) (AIBN) as initiator; then (2) reacting poly(VBC-co-MMA-co-BA) with 1-methylimidazole at room temperature for more than 24 hours to obtained PVMBMIM-Cl polymer solution.

Synthesis of poly(4-vinylbenzyl chloride-co-methyl methacrylate-co-butylacrylate): monomers (Sigma-Aldrich) (MMA: 4.511 g, BA: 4.702 g, VBC: 4.701 g) were polymerized in toluene (Sigma-Aldrich) (25 ml) with AIBN (0.0811 g) as initiator. The reaction was kept at 50-55° C. for 41.62 hours under nitrogen protection with vigorous stirring. Terpolymer was precipitated out in methanol (Avantor Performance Materials Inc.) and washed with methanol for several times. The obtained polymer powder was dried in an oven at 80° C. for 2 hours and then 120° C. for another 2 hours. 6.4319 g polymer powder was collected (yield: 46.23%). VBC content in the copolymer was 33.79 wt %.

Synthesis of methylimidazolium-poly(VBC-co-MMA-co-BA) chloride (PVMBMIM-Cl): 1-methylimidazole (Sigma-Aldrich) (0.55 ml, 0.5616 g) was added to the solution of the poly(VBC-co-MMA-co-BA) (2.06 g) in anhydrous N,N-Dimethylformamide (DMF) (Sigma-Aldrich) (15 ml). The mixture was stirred at room temperature for more than 26 hours.

Membrane preparation: (1) PVMBMIM-Cl polymer solution prepared above was cast onto a flat glass (8 cm×10 cm) with a 0.1 to 1 ml pipette. (2) The membrane was air dried at room temperature for overnight. (3) The glass plate with membranes was put in an oven (MTI Corporation); the membranes were then dried at 80° C. for 2 hours and then 120° C. for another 2 hours under the protection of nitrogen. (4) After the oven temperature cooled down to room temperature, the membranes were taken out and soaked in a 1 M KOH (Fisher Scientific) bath. Membranes were peeled off from the substrates and soaked in 1 M KOH solution for at least 24 hours for completely anion exchange (Cl$^-$→OH$^-$) before testing.

The PVMBMIM-Cl membrane was transparent with very good mechanical strength. The membranes were tested according to the test set forth in the Summary of the Invention section of the present application with results set forth in Table 8 below.

TABLE 8

| Membrane # | 13 |
|---|---|
| VBC in terpolymer (wt %) | 33.79 |
| Cell potential (V) | 2.8 |
| Current (mA/cm$^2$) | 68 |
| CO selectivity (%) | 90.56 |

The membranes were tested and determined to meet the classification as a Helper Membrane according to the test set forth in the Summary of the Invention section of the present application. The membrane supported 55 mA/cm$^2$ of $CO_2$ conversion current at an applied potential of 2.8 V. The selectivity was about 90%. Therefore, PVMBMIM is a Helper Membrane.

SPECIFIC EXAMPLE 8

The objective of this example is to demonstrate that hydrophilic materials can be added to the membrane to improve water retention. In this example, hygroscopic oxide materials were introduced during the membrane preparation to improve water uptake and water retention in the membrane. Hygroscopic oxide materials include silica ($SiO_2$), zirconia ($ZrO_2$), and titania ($TiO_2$). In this example, zirconia was tested.

Zirconium (IV) propoxide (70 wt. % in propanol, 333972, Sigma-Aldrich) was mixed with the polymer solution prepared as set forth in Specific Example 1 for the synthetic route depicted in FIGS. 3 to 15 wt % in DMF. The mixture was sonicated in an ultrasonic bath for 30 minutes to obtain a homogeneous solution. The solution containing zirconia was cast to form a membrane on a glass slide following the procedure set forth in Specific Example 1 for casting the PSMMIM solution. The membrane was dried at 80° C. for 1 hour and 120° C. for 30 minutes in a vacuum oven. Then the membrane was detached from the glass slide in 1 M KOH solution and allowed to exchange to the hydroxide form. The membrane was rinsed with deionized water to remove free KOH and was sandwiched between an Ag cathode and a $RuO_2$ anode following the procedure set forth in the Summary of the Invention section of the present application to classify as a Helper Membrane. The whole assembly was mounted in a Fuel Cell Technologies 5 cm$^2$ fuel cell hardware assembly. The membrane showed 60 mA/cm$^2$ at 2.8 V with 84% selectivity so the membrane is a Helper Membrane.

SPECIFIC EXAMPLE 9

The objective of this example is to demonstrate that a deliquescent material, ZnBr, can be added to the membrane to improve water retention.

The cathode was prepared as follows. First a silver nanoparticle ink was prepared via the addition of 50 mg of silver nanoparticles (20-40 nm, 45509, Alfa Aesar) to 0.8 ml of deionized water (18.2 Mohm, Millipore) and 0.4 ml of isopropanol (3032-16, Macron). The mixture was then sonicated for one minute. The resulting silver ink was air-brushed onto carbon fiber paper (Toray Paper 120, 40% wet-proofing, Toray Industries Inc., Tokyo, Japan) covering an area of 5 cm×5 cm. This square was then cut into four equally-sized squares of 2.5 cm×2.5 cm each.

The anode was prepared the same way in each cell, as follows. First a ruthenium oxide nanoparticle ink was prepared via the addition of 50 mg of $RuO_2$ nanoparticles (11804, Alfa Aesar) to 0.8 ml of deionized water (18.2 Mohm, Millipore) and 0.4 ml of isopropanol (3032-16, Macron). The mixture was then sonicated for one minute. The resulting $RuO_2$ ink was air-brushed onto carbon fiber paper (Toray Paper 120, 40% wet-proofing) covering an area of 5 cm×5 cm. This square was then cut into four equally-sized squares of 2.5 cm×2.5 cm each.

For the cell with ZnBr added to the membrane surface, 25 mg of ZnBr (Sigma Aldrich, 02128) were spread across the surface of a PSMMIM membrane prepared as set forth in Specific Example 5 for the synthesis of poly(4-vinylbenzyl chloride-co-styrene). For the cell with ZnBr incorporated into the membrane solution, 7.5 mg of ZnBr were added to 3 ml of membrane solution prior to casting. The PSMMIM membrane was then cast and prepared in the typical fashion as described previously.

For each cell, the cathode, PSMIM membrane, and anode were sandwiched together such that the metal catalysts of each electrode faced the membrane. The assembly was mounted in a Fuel Cell Technologies 5 cm$^2$ fuel cell hardware assembly with serpentine graphite flow fields.

Each cell was tested by holding the cell at 2.8 V for at least one hour. Air was permitted to flow over the anode flow field while humidified $CO_2$ was passed through the cathode flow field at a flow rate of 15 sccm.

In the case of the membrane with a ZnBr coating, the initial current was only 22 mA/cm$^2$ but it was very stable. No membrane dry-out was detected.

The membrane that had been soaked in ZnBr initially showed 60 mA/cm$^2$ current, but fell to 22 mA/cm$^2$ after about 1 hour.

Still, both membranes are Helper Membranes.

SPECIFIC EXAMPLE 10

The objective of this experiment is to demonstrate that Helper Membranes are useful for water electrolyzers.

A 50-300 micron thick PSMMIM membrane was synthesized as in Specific Example 1. The membrane was sandwiched between the anode and the cathode with the catalysts facing the membrane. A cathode is prepared as follows: a cathode ink was made by mixing 30 mg of $IrO_2$ nanoparticles (A17849, Alfa Aesar) with 0.2 ml deionized water (18.2 Mohm, Millipore) and 0.4 ml isopropanol (3032-16, Macron). The mixture was then sonicated for 1 minute. The cathode ink was sprayed onto a gas diffusion layer (Sigracet 35 BC GDL, Ion Power) covering an area of 2.5 cm×2.5 cm. An anode was prepared as follows: a catalyst ink was made by mixing 15 mg of Pt black (43838, Alfa Aesar) with 0.2 ml deionized water (18.2 Mohm Millipore), 0.2 ml isopropanol (3032-16, Macron). The anode catalyst ink was hand-painted onto a gas diffusion layer (Sigracet 35 BC GDL, Ion Power) covering an area of 2.5 cm×2.5 cm. The whole assembly was mounted in Fuel Cell Technologies 5 cm$^2$ fuel cell hardware assembly with serpentine flow fields. A 1 M KOH solution of water is fed to both cathode and anode chambers at a flow rate of 5 sccm. The cell was run at room temperature either potential dynamically or at constant current. For instance, the current output was 300 and 400 mA/cm$^2$ at a cell potential of 1.8 V and 1.9 V, respectively.

The use of an anion exchange membrane also enables the use of non-precious metal as catalysts. Nickel foam (EQ-bcnf-16m, MTI) was used as both cathode and anode. A current density of 80 mA/cm$^2$ was achieved at a cell potential of 2 V and room temperature.

SPECIFIC EXAMPLE 11

This example shows that Helper Membranes are also useful for alkaline membrane fuel cell power generator.

Pt black (43838, Alfa Aesar) was used as the catalysts for both cathode and anode. The catalysts ink was made by mixing 15 mg of Pt black with 0.4 ml of anion exchange polymer solution (1 wt % in DMF) and was hand-painted onto a gas diffusion layer (Sigracet 35 BC GDL, Ion Power) covering an area of 2.5 cm×2.5 cm. The electrodes were dried under vacuum at 120° C. for 30 minutes. A 50-300 micrometer thick membrane prepared as set forth in Specific Example 1 for the preparation of the first inhibitor-free styrene was sandwiched between cathode and anode, with the respective catalysts facing the membrane. The entire assembly was mounted in Fuel Cell Technologies 5 cm² fuel cell hardware assembly with serpentine flow fields. H₂ and O₂ were humidified via 350 cc water bottles at room temperature, and were fed to anode and cathode chambers at 20 ccm, respectively. The cell was run at room temperature and atmosphere pressure. The cell was conditioned by repeatedly applying a cell potential of 0.3 V and 0.6 V for 1 hour until the cell performance was stable. Currents of 60 mA and 150 mA were achieved at 0.6 V and 0.2 V, respectively. A power of 36 mW was attained at ambient conditions.

SPECIFIC EXAMPLE 12

The objective of this example is to provide a Helper Membrane made from methylimidazolium-poly(2,6-dimethyl-1,4-phenylene oxide) bromide (PPOMIM-Br) polymer solution.

PPOMIM-Br solution was prepared by a two-step reaction process: (1) Methyl-brominated poly(2,6-dimethyl-1,4-phenylene oxide) (PPO-Br) synthesis from the reaction of poly(2,6-dimethyl-1,4-phenylene oxide) (PPO) with N-bromosuccinimide (NBS) in chlorobenzene under argon gas (S.J. Smith) protection with 2,2'-Azobis(2-methylpropionitrile) (AIBN) as initiator. (2) PPO-Br was reacted with 1-methylimidazole at room temperature to 60° C. for more than 15 hours to obtained PPOMIM-Br polymer solution.

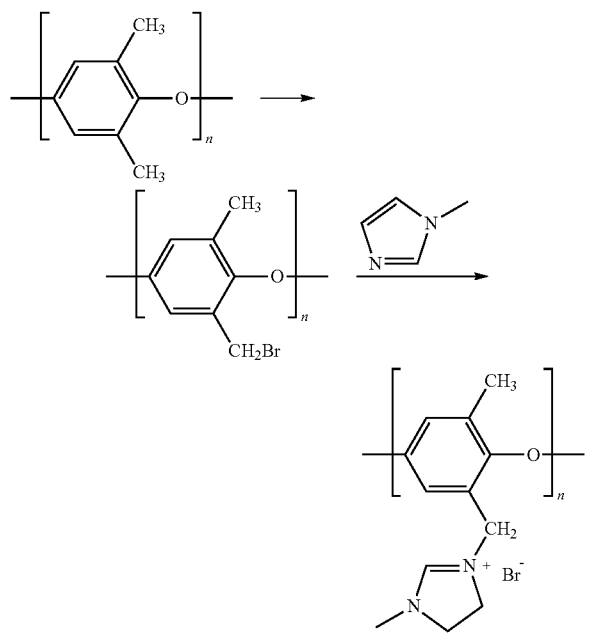

Synthesis of methyl-brominated poly(2,6-dimethyl-1,4-phenylene oxide) (PPO-Br). PPO-Br #14 with low bromination ratio was synthesized according to the literature (Reactive & Functional Polymers 70 (2010) 944-950), a detail procedure can be summarized as follows: NBS (2.84 g, 15.96 mmol) (Sigma-Aldrich) and AIBN (0.12 g, 0.73 mmol) were added to a solution of PPO (2.839, 24.08 mmol) (Sigma-Aldrich) in chlorobenzene (200 ml). The mixture was stirred at 125-135° C. for 4-6 hours under nitrogen protection, the reaction mixture was then added to excess methanol to precipitate the product. After filtration and washing with methanol for several times, the polymer was dried at room temperature under vacuum for more than 2 days. 2.45 g of light yellow powder was collected (yield: 51.14%). The bromination ratio of PPO-Br was calculated from the integration of the NMR methyl peak and methylene peak (18.3%):

$$X_{CH_2Br}(\%) = \frac{3 \times I_{CH_2}}{2 \times I_{CH_3} + 3 \times I_{CH_2}} \times 100\%$$

PPO-Br membrane #14a with high bromination ratio was synthesized according to the literature (Journal of Membrane Science 425-426 (2013) 131-140), a detail procedure can be summarized as follows: NBS (6.27 g, 35.2 mmol) (Sigma-Aldrich) and AIBN (0.4 g, 2.4 mmol) were added to a solution of PPO (2.89, 24.1 mmol) (Sigma-Aldrich) in chlorobenzene (160 ml). The mixture was stirred at 125-135° C. for 18 hours under nitrogen protection, the reaction mixture was then added to excess Methanol to precipitate the product. After filtration and washing with methanol for several times, the polymer was dried at room temperature under vacuum for more than 2 days. 3.04 g of light yellow powder was collected (yield: 63.4%). Bromination ratio: 56.6%

Synthesis of methylimidazolium-poly(2,6-dimethyl-1,4-phenylene oxide) bromide (PPOMIM-Br membrane #14): 1-methylimiazole (Sigma-Aldrich) (0.37 ml, 4.6 mmol) was added to the solution of the PPO-Br membrane #14 (1.0 g) in 15 ml tetrahydrofuran (THF) (Sigma-Aldrich) and 5 ml methanol (Avantor Performance Materials Inc.). The mixture was refluxed at 55-65° C. for 18 hours.

Synthesis of methylimidazolium-poly(2,6-dimethyl-1,4-phenylene oxide) bromide (PPOMIM-Br membrane #14a): 1-methylimiazole (Sigma-Aldrich) (0.67 ml, 8.5 mmol) was added to the solution of the PPO-Br membrane #14a (1.5 g) in 24 ml tetrahydrofuran (THF) and 8 ml methanol. The mixture was stirred at room temperature to 65° C. for 18 hours. Brown polymer separated from the solution at the end of the reaction.

Membrane preparation: (1) Cast PPOMIM-Br #14 polymer solution prepared above onto a flat glass (8 cm×10 cm) with a 0.1 to 1 ml pipette. (2) The membrane was air dried at room temperature for overnight for solvent evaporation. (3) The membrane was soaked in a 1 M KOH (Fisher Scientific) bath for at least 24 hours for complete anion exchange (Cl⁻→OH⁻) before testing.

PPOMIM-Br membrane #14a polymer solution was taken after 4 hours reaction of PPO-Br with 1-methylimidazole at room temperature for membrane casting. PPOMIM-Br membrane #14a membrane was very soft and mechanical strength was very weak. The text results are set forth in Table 9 below.

TABLE 9

| Membrane # | 14 |
|---|---|
| Bromination ratio (%) | 18.3 |
| Cell potential (V) | 3.0 |
| Current (mA/cm²) | 14 |
| CO selectivity (%) | 31.5 |

SPECIFIC EXAMPLE 13

The objective of this example is to determine whether a methylimidazolium-poly(4-vinylbenzylchloride) membrane with no styrene is also a Helper Membrane.

PVMIM-Cl solution was prepared from commercial available poly(vinylbenzyl chloride) (PVBC) and 1-methylimidazole as shown in the structural diagram below.

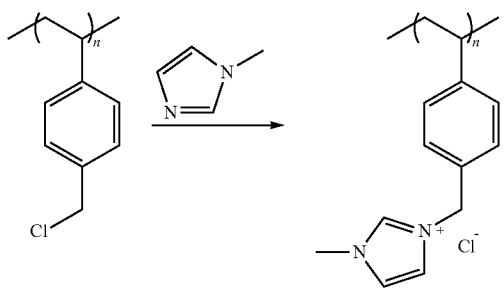

Synthesis of methylimidazolium-PVBC (PVMIM-Cl): 1-methylimiazole (Sigma-Aldrich) (2.33 ml, 29.23 mmol) was added to the solution of the PVBC (Sigma-Aldrich) (4.9466 g) in anhydrous N,N-Dimethylformamide (DMF) (Sigma-Aldrich) (40 ml). The mixture was stirred at room temperature for 46.9 hours. PVMIM-Cl polymer solution was not stable and not suitable for long time storage.

Membranes preparation: (1) Cast PVMIM-Cl polymer solution prepared above onto a flat glass (8 cm×10 cm) with a 0.1 to 1 ml pipette. (2) Put the glass plate with membranes in an oven (MTI Corporation); the membranes were then dried at 80° C. for 4 hours and then 120° C. for another 2 hours under the protection of nitrogen. (3) After the oven temperature cooled down to room temperature, the membranes were taken out and soaked in a 1 M KOH (Fisher Scientific) bath. Membranes were peeled off from the substrates and soaked in 1 M KOH solution for at least 24 hours for complete anion exchange (Cl⁻→OH⁻) before testing.

In this case, when the membrane was exposed to water, it swelled to form a gel-like structure which was too soft to test. So it is uncertain as to whether the membrane is a Helper Membrane. This example indicates that methylimidazolium-poly(4-vinylbenzylchloride membrane with no styrene, PBI or other copolymers is not a suitable membrane. Instead, at least 10% of one of another polymer such as styrene or PBI is preferred to make a suitable membrane.

SPECIFIC EXAMPLE 14

The objective of this example is to provide a Helper Membrane made from blends of poly(vinylbenzyl chloride) (PVBC) and polybenzimidazole (PBI).

Two methods were tired for the preparation of Helper Membrane from PVBC and PBI. (1) A PBI and PVBC crosslinked membrane was prepared, which was then reacted with 1-methylimidazole. (2) PBI and PVBC were crosslinked in the solution and 1-methylimidazole was added during the crosslinking process.

Membrane preparation procedure from the first method: (1) Prepared 2 wt % (in DMAc) PBI and 2 wt % PVBC (in DMAc) solution polymer solution. (2) Added 3.2 ml PBI (2 wt %) solution into 2 wt % PVBC solution (2 ml). (3) The mixtures were kept at room temperature and ultrasonicated for 1 hour. (4) The resulting polymer solution was cast on a glass plate (8 cm×10 cm) with a 0.1 to 1 ml pipette. (5) The glass plate with membranes was put in an oven (MTI Corporation); the membranes were then dried at 70° C. overnight and then 120° C. for another 3 hours under vacuum. (6) After the oven temperature cooled down to room temperature, the membranes were taken out and soaked in DI water. (7) The membrane was dried at 200° C. for 1 hour. (8) The PVBC/PBI membrane was soaked in 1-methylimidazole solution for 2 days. (9) The membrane was rinsed with DI water and the membrane was then soaked in a 1 M KOH (Fisher Scientific) bath for at least 24 hours for complete anion exchange (Cl⁻→OH⁻) before testing.

The membranes were tested according to the test protocol set forth in the Summary of the Invention section of the present application with results set forth in Table 10 below.

TABLE 10

| Membrane # | 15 | 16 |
|---|---|---|
| PVBC (ml) | 2 | 2 |
| PBI (ml) | 3.2 | 2 |
| Functional group in blend membrane (wt %) | 38.46 | 50 |
| Cell potential (V) | 2.8 | 2.8 |
| Current (mA/cm$^2$) | 10 | 33 |
| CO selectivity (%) | 14.96 | 53.81 |

Membrane #17 preparation procedure: (1) 16.83 mmol PVBC was dissolved in 20 ml dimethylacetamide (DMAc). (2) 1.01 mmol PBI (in 15 ml DMAc) solution was added into the PVBC/DMAc solution. (3) A heater was turned on to increase temperature gradually to 90° C. for crosslinking of PBI with PVBC; part of polymer solution turned into gel after 2-3 hours reaction. (4) The heater was turned off and to let the solution cool to room temperature, then 15.1 mmol 1-methylimidazole was added to the polymer solution and the reaction was kept at room temperature for 4-6 hours. (5) The polymer solution was cast onto a flat glass plate (8 cm×10 cm) with a 0.1 to 1 ml pipette. (6) The glass plate with membranes was put in an oven (MTI Corporation); the membranes were then dried at 70° C. overnight and then 120° C. for another 3 hours under vacuum. (7) After the oven temperature cooled down to room temperature, the membranes were taken out and soaked in 1 M KOH bath for at least 24 hours for complete anion exchange (Cl⁻→OH⁻) before testing.

The membranes were tested according to the test protocol set forth in the Summary of the Invention section of the present application with results set forth in Table 11 below.

TABLE 11

| Membrane # | 17 |
|---|---|
| Functional group in blend membrane (wt %) | 81.75 |
| Cell potential (V) | 2.8 |
| Current (mA/cm$^2$) | 43 |
| CO selectivity (%) | 93.22 |

This result shows that unlike the membrane that was 100% methylimidazolium-poly(vinylbenzylchloride), a membrane with 81.75% methylimidazolium-poly(vinylbenzylchloride) is still a Helper Membrane. Extrapolation of the data indicates that up to 90% methylimidazolium-poly(vinylbenzylchloride) can be present in the membrane, and still have suitable performance.

COMPARATIVE EXAMPLE 3

The objective of this example is to show that $CO_2$ can be converted to formic acid in an electrochemical device by using a tin cathode catalyst and the PBI/PSMIM-Cl anion exchange membrane #6 in Table 4 above but the formic acid concentration is low, and the estimated current efficiency is below 20% without the central flow compartment.

The electrolysis was conducted in an electrolysis cell with an anode, a cathode and an anion exchange membrane assembled in a modified 5 cm² fuel cell hardware assembly (Fuel Cell Technologies) with gas and liquid channels and serpentine flow fields.

The anode in this example was prepared as follows. A $RuO_2$ ink solution was prepared by mixing 18 mg of $RuO_2$ (11804, Alfa Aesar) and 2 mg of graphene nanoplatelets (A-12, Graphene Laboratories, Calverton, N.Y.) with 0.4 ml deionized water (18.2 Mohm Millipore water), 0.4 ml isopropanol (3032-16, Macron) and 0.14 ml of 5% Nafion™ solution (1100EW, DuPont). The $RuO_2$ ink was sonicated for 1 min and then hand-painted onto a gas diffusion layer (TGP-H-120 40% wet proofing Toray Paper, Fuel Cell Earth, Woburn, Mass.) with an area of 3.0 cm×3.0 cm.

The cathode in this example was prepared as follows. A Sn ink solution was prepared by mixing 18 mg of Sn nanoparticles (60-80 nm) (SN-M-04-NP, American Elements, Los Angeles, Calif.) and 2 mg of graphene nanopowders (A-12, Graphene Laboratories) with 0.4 ml deionized water (18.2 Mohm Millipore water), 0.4 ml isopropanol (3032-16, Macron) and 0.14 ml of 5% Nafion™ solution (1100EW, DuPont). The Sn ink solution was sonicated for 1 min and then hand-painted onto a gas diffusion layer (TGP-H-120 40% wet proofing Toray Paper, Fuel Cell Earth) with an area of 3.0 cm×3.0 cm.

The anion exchange membrane used for this test was PBI/PSMIM-Cl membrane #6, as described above in Table 4. Before use, the membrane was soaked in 1 M KOH solution for at least 12 hours.

The electrolyte solution was prepared with deionized water (18.2 Megohm Millipore water).

In this example, 10 ml of catholyte was subjected to recirculation run for 5 hours, while 20 ml anolyte was replaced with fresh anolyte solution after every 1 hour of electrolysis.

The formate produced was detected and analyzed as follows. The formate produced was first subjected to derivatization at 60° C. for 1 hour in the presence of 2% sulfuric acid solution in ethanol. The product was then analyzed by an Agilent Technologies 6890N GC/5973 MS equipped with a Phenomenex Zebron ZB-WAX-Plus capillary GC column (L=30 m×I.D.=0.25 mm×df=0.25 µm).

Electrolysis conditions and results are summarized in Table 12 below:

TABLE 12

| | |
|---|---|
| Anolyte solution | 1M KOH |
| Catholyte solution | 0.45M $KHCO_3$ + 0.5M KCl |
| Anolyte flow rate | 8 ml/min |
| Catholyte flow rate | 8 ml/min |
| $CO_2$ gas flow rate | 10 sccm |
| Applied cell potential | 3.5 V |
| Current in 5 cm² cell | 60 mA/cm² |
| Final formic acid concentration in catholyte after 5 hours | 3.97% |
| Final formic acid concentration in anolyte after 5 hours | 0.28% |
| Estimated efficiency | 3% |

SPECIFIC EXAMPLE 15

The objective of this example is to show that a membrane made from (2-hydroxyethyl)imidazolium-poly(4-vinylbenzylchloride-co-styrene) chloride (PSIMOH-Cl) polymer solution is a helper membrane.

PSIMOH-Cl solution (in anhydrous dimethylformamide) was prepared by a two-step reaction process as shown in the following figure. 1) poly(4-VBC-co-St) synthesis from the reaction of styrene (St) with 4-vinylbenzyl chloride (4-VBC) in chlorobenzene under nitrogen gas (S.J. Smith, Urbana, Ill.) protection with 2,2'-Azobis(2-methylpropionitrile) (AIBN) as initiator; 2) poly(4-VBC-co-St) reacts with 1-(2-hydroxyethyl)imidazole at 50° C. for more than 20 hours to obtained PSMIMOH-Cl polymer solution.

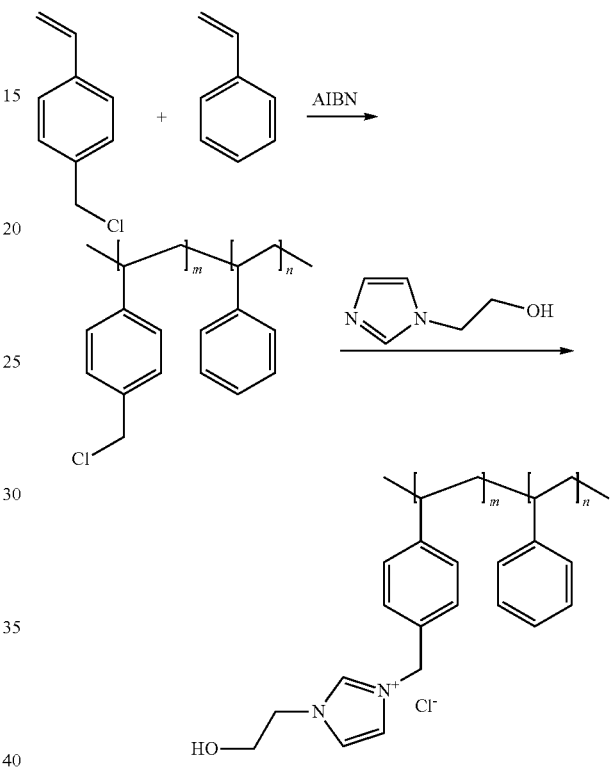

Synthesis of poly(4-vinylbenzyl chloride-co-styrene): A solution of inhibitor free styrene (Sigma-Aldrich, Milwaukee, Wis.) (19.53 g, 0.19 mol) and 4-vinylbenzyl chloride (Sigma-Aldrich, Milwaukee, Wis.) (16.16 g, 0.11 mol) in chlorobenzene (Sigma-Aldrich, Milwaukee, Wis.) (45 ml) was heated at 60-68□ in an oil bath for 17.83 h under nitrogen gas with AIBN (Sigma-Aldrich, Milwaukee, Wis.) (0.36 g, 1.02 wt % based on the total monomer weight) as initiator. The copolymer was precipitated in CH3OH/THF and dried under vacuum. VBC content in the copolymer was 45.28 wt %.

Synthesis of (2-hydroxyethyl)imidazolium-poly(4-VBC-co-St) chloride [PSIMOH-Cl]: 1-(2-hydroxyethyl)imidazole (Sigma-Aldrich, Milwaukee, Wis.) (0.7667 g, 6.84 mmol) was added to the solution of the poly(4-VBC-co-St) (1.9657 g) in anhydrous N,N-Dimethylformamide (DMF) (Sigma-Aldrich, Milwaukee, Wis.) (15 ml). The mixture was stirred at room temperature for 0.5-1 hour, and then heated at 50-54° C. for 22.25 hours.

Membrane preparation: (1) The PSIMOH-Cl polymer solution prepared above was cast onto a flat glass (13.5 cm×13.5 cm) with a 0.1 to 1 ml pipette. (2) The glass plate with membranes was put in an oven (MTI Corporation, Richmond, Calif.), the membranes were then dried at 80° C. for 7 hours and then 120° C. for another 2 hours under the protection of nitrogen. (3) After oven temperature cooled down to room temperature, the membranes were taken out and soaked in a 1 M KOH (Fisher Scientific, Fair Lawn, N.J.) bath. Membranes were peeled off from the substrates and soaked in 1 M KOH solution for at least 24 hours for complete anion exchange ($Cl^- \rightarrow OH^-$) before testing.

The resultant membrane 18 was tested and determined to meet the classification as a Helper Membrane according to the test set forth in the Summary of the Invention section of the present application. The testing results are listed in Table 13 below.

| Membrane # | 18 |
|---|---|
| Functional group in blend membrane (wt %) | 45.3 |
| Cell potential (V) | 3.0 |
| Current (mA/cm$^2$) | 118 |
| CO selectivity (%) | 96.8 |

This result satisfies the criterion for a Helper Membrane.

SPECIFIC EXAMPLE 16

A formic acid cell was assembled according to FIG. 4 with details outlined below.

The formic acid test cell utilized a fuel cell type cathode, consisting of a 0.875" thick graphite plate, being used as the cathode current collector, having a machined gas flow field (5 cm$^2$ cell hardware, Fuel Cell Technologies, Inc.). The cathode plate had an inlet port connection to a humidified $CO_2$ feed gas stream and an outlet gas port connection for the depleted $CO_2$ gas stream. A GDE cathode with a tin electrocatalyst (described below) was placed in contact with the graphite plate flow field with the tin catalyst layer facing the anion membrane and the uncoated backside of the GDE mounted against the cathode current collector.

The central flow compartment was constructed from a 1 mm polycarbonate plastic sheet having a central area of 2.24 cm width×2.24 cm length×1 mm thickness polycarbonate and having an inlet solution port and an outlet solution product port.

The formic acid test cell anode assembly consisted of a similar fuel cell type 0.875" thick graphite plate having a machined gas flow field (5 cm$^2$ cell hardware, Fuel Cell Technologies, Inc.) being used as the anode current collector. The anode current collector had an inlet port connection for a solution feed and an outlet port connection for the gas and liquid product. A Toray 5% wet proofed carbon paper (Lot # TGPH120-4005, Fuel Cell Earth) was mounted against the anode current collector. An $IrO_2$ electrocatalyst layer on the cation exchange Nafion™ membrane served as the active electrocatalyst anode. The cation exchange membrane was positioned with the anode electrocatalyst side facing and in contact with the Toray 5% wet proofed carbon paper.

Silicone rubber gaskets (Fuel Cell Store), 0.508 mm thick, were used for sealing the cell compartments and membranes.

The formic acid cell had the cathode and anode components prepared for placement onto the cathode and anode graphite block flow fields as described below. The GDE cathode was prepared as follows:

A tin (Sn) ink solution was prepared by mixing 144 mg of tin nanoparticles (60-80 nm, stock # US1136, US Research Nanomaterials, Inc.), 28 mg of multi-walled carbon nanotube (>90%, Aldrich Fine Chemicals), 1.5 ml DI water (18.2 megohm, EMD Millipore, Billerica, Mass.), 1.5 ml of isopropanol (stock #3032-16, Macron Fine Chemicals, Avantor Performance Materials, Center Valley, Pa.), and 0.45 ml of a 5% PTFE suspension (Aldrich). The solution mixture was then sonicated for 10 minutes.

The tin ink solution was then painted using an air-brush onto a gas diffusion layer (50% wet proofing Toray paper, Lot # TGPH120-4050, Fuel Cell Earth) having an area of about 3 cm×3 cm.

The cathode was treated at 220° C. in air for 60 minutes, followed by second stage treatment at 330° C. in air for 30 minutes.

The cation exchange Nafion™ membrane with an anode $IrO_2$ catalyst layer, was prepared as follows:

An $IrO_2$ ink was prepared by mixing 94 mg of iridium (IV) oxide particles (Alfa Aesar), 20 mg of multi-walled carbon nanotube (>90%, Aldrich), 4 ml DI water (18.2 megohm water, EMD Millipore, Billerica, MA), 4 ml of isopropanol (stock #3032-16, Macron Fine Chemicals, Avantor Performance Materials, Center Valley, Pa.), and 0.6 ml of a 5 wt. % Nafion™ solution (Ion Power, Inc.). The mixture was then sonicated for 10 minutes. The ink was air-brush painted onto the Nafion N115 membrane (Ion Power, Inc.). The $IrO_2$ layer served as the active anode electrocatalyst. The membrane was cut to a size of 4 cm×4 cm and mounted against the graphite anode flow field. The anion membrane was a PSTMIM-DVD membrane made as follows:

A PSTMIM-DVB powder was prepared by a two-step reaction process in a similar fashion to Specific Example 5: (1) Poly(4-VBC-co-St) synthesis from the reaction of styrene (St) with 4-vinylbenzyl chloride(4-VBC) in chlorobenzene under argon gas protection with 2,2'-Azobis (2-methylpropionitrile) (AIBN) as initiator. (2) Poly(4-VBC-co-St) was reacted with tetramethylimidazole (TMIM) and divinylbenzene crosslinker at 50° C. in DMF solvent in presence of AIBN initiator for more than 48 hours to obtain PSTMIM-DVB polymer solution.

Synthesis of poly(4-vinylbenzyl chloride-co-styrene): A solution of inhibitor free styrene (Sigma-Aldrich) (36.139 g, 350 mmol) and 4-vinylbenzyl chloride (Sigma-Aldrich) (29.7272 g, 190 mmol) in chlorobenzene (Sigma-Aldrich) (45 ml) was continually mixed at 60-65° C. in an oil bath for approximately 20 hours under argon gas with AIBN (α,α'-Azoisobutyronitrile, Sigma-Aldrich) (0.5927 g, 0.90 wt % based on the total monomer's weight) as the initiator. The copolymer was precipitated in CH3OH (methanol) and dried under vacuum.

Preparation of PSTMIM-DVB: Poly(4-vinylbenzyl chloride-co-styrene)-Diethylene benzene: tetramethylimidazole (TMIM) (TCI, Philadelphia) (4.05 g, 0.0326 mol) is added in a 250 ml 3-neck round bottom flask to the solution of the poly(4-VBC-co-St) (10 g, 0.0389 mol) in anhydrous N,N-dimethylformamide (DMF) (Sigma-Aldrich) (73 ml). After the TMIM was thoroughly dissolved within this reaction mixture, 1 ml of a DVB-DMF solution (DVB concentration=0.052 g/ml) was carefully added through a pipette to the mixture with continual magnetic stirring. After this, 1 ml of AIBN-DMF solution (AIBN concentration=0.00135 g/ml) is added to the mixture in a similar fashion. The reaction was then kept under nitrogen atmosphere at 50° C. for about 60 hours. PSTMIM was obtained as a white powder after purification by precipitation into diethyl ether.

The membrane casting process for preparing the anion membranes used in the formic acid cell were as follows:

The PSTMIM-DVB powder was dissolved in ethanol to yield a solution containing 22% by weight polymer.

The solution was cast onto a polyethylene terephthalate liner (Loparex) using a doctor blade gap of about 200 μm.

The film with the liner was then placed in a vacuum oven (MTI Corporation) and heated in a ramp of one hour to 70° C. under the application of a vacuum. After an hour at 70° C., the vacuum was slowly released and the prepared membranes were taken out to cool to room temperature.

The anion exchange membranes were then soaked for 1-3 hours in 1 M KOH solution to help peel it off the liner. After removal from the liner, the membranes were still stored in a 1 M KOH bath for at least 24 hours to allow for the complete anion exchange of the chloride to hydroxide form ($Cl^- \rightarrow OH^-$) before being used in the formic acid cell for testing.

The final cell assembly order was as follows: starting with the anode graphite flow field, then the Toray 5% wet proofed carbon paper mounted against the anode graphite flow field, then the cation Nafion N115 ion exchange membrane with the cation membrane side having the $IrO_2$ catalyst layer mounted against the Toray 5% proofed carbon paper, then the central flow compartment frame which was filled with Amberlite IR120 resin beads (strong acidic, hydrogen form, Aldrich Fine Chemicals), then the anion exchange membrane (PSTMIM-DVB) mounted between the ion reaction compartment and the tin GDE cathode, then the GDE cathode with the air-brush painted catalyst face mounted against the anion exchange membrane, and then the back side of the GDE cathode mounted directly against the graphite cathode flow field. Silicone gaskets were utilized to provide a leak-free seal for the cell assembly components. The back of the anode and cathode current collectors each had a copper sheet with an electrical lead connected to the DC power supply. Two steel endplates with bolts were used to compress and provide the sealing pressure for the formic acid cell stack.

SPECIFIC EXAMPLE 17

The formic acid cell assembly was the same as described in Specific Example 16. DI water was used for the anolyte loop, which used a 70 ml volume in a glass collection bottle, and the central flow compartment solution loop used a 28 ml volume solution in a glass collection bottle. Both solutions were separately recycled during cell test using small peristaltic pumps. The cell was operated at constant voltage mode with 3.50 V cell voltage at ambient temperature. The cell operated at a current density of 155 $mA/cm^2$. After 5 hours of run time, the cell central flow compartment product solution had a 7.8 wt % formic acid solution concentration having a pH of about 1.5 and had operated at a calculated 72.8% Faradaic efficiency based on formic acid.

The concentration of formic acid in the experiments were analyzed using a GC-MS (6890N/5973N, Agilent Technologies). The formic acid in the samples were converted to the ethyl formate ester using concentrated sulfuric acid in ethanol. The ethyl formate ester peak was measured in the GC-MS. The gas products were analyzed using a GC (HP Model 6890, Hewlett Packard).

TABLE 13

Cell performance under constant cell voltage and recycled anolyte and central flow compartment solutions

| Cell Operating Parameter | Value |
|---|---|
| Cell Voltage (V) | 3.50 |
| Current Density ($mA/cm^2$) | 155 |
| Formic Acid Concentration (wt %) | 7.8 |
| Formic Acid Faradic Efficiency (%) | 72.8 |

SPECIFIC EXAMPLE 18

Figure 9:
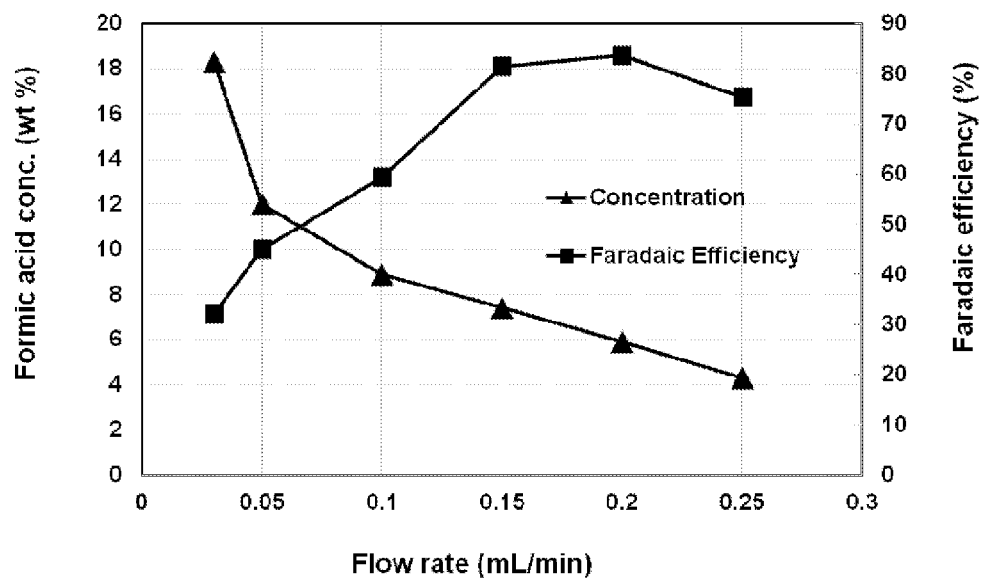
FIG. 9 shows the operating results of the formic acid cell of Specific Example 18.
Figure 10:
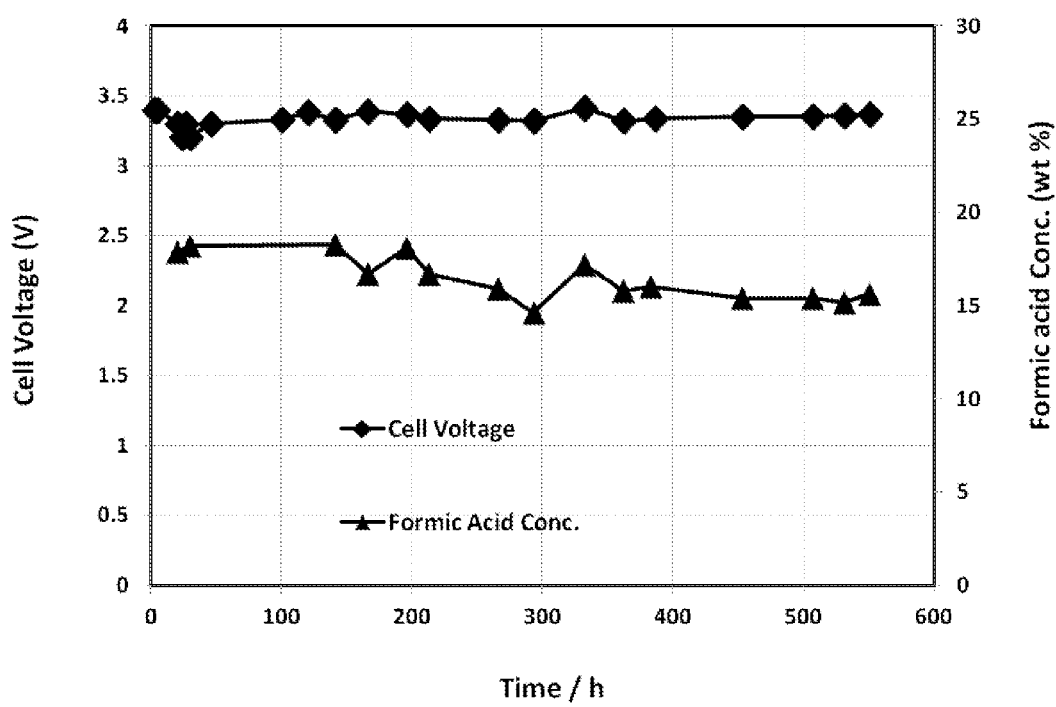
FIG. 10 shows the operating results of the formic acid cell operating results of Specific Example 19.

The formic acid cell assembly was the same as given in Specific Example 16. The formic acid cell was operated in a constant current mode with a current density of 145 $mA/cm^2$ at ambient temperature. The cell voltage was about 3.30 V during the cell test runs. DI water was fed into the cell central flow compartment in a single-pass mode at selected DI water input flow rates and the formic acid product solution was collected for analysis. The anolyte, consisting of DI water, was recirculated using a peristaltic pump using an external 50 ml volume collection bottle and was recycled back to the cell anode compartment. FIG. 9 summarizes the formic acid cell test results, showing how the wt % formic acid product concentration and the formic acid Faradaic efficiency varied as a function of the central flow compartment single pass DI water flowrate. For example, at a 0.1 ml/min flow rate, the cell produced 9.0% formic acid with formic acid Faradaic efficiency of about 59.3%. After increasing the DI water flowrate to 0.15 ml/min, the cell produced a lower formic acid 7.4% concentration compared to the results at 0.1 ml/min, however, the formic acid cell operated at a higher Faradaic formic acid efficiency of 81.4%.

SPECIFIC EXAMPLE 19

The cell assembly was the same as in Specific Example 16. The cell was operated in constant current mode at a current density of 145 $mA/cm^2$ for a long term test run. The DI water was fed into the central flow compartment in single-pass mode at a flowrate of 0.03 ml/min. The DI water anode compartment output was collected in an external 50 ml collection bottle and recycled back to the anode compartment using a peristaltic pump. The formic acid cell voltage stabilized to about 3.40 V over a continuous run of more than 500 hours at ambient temperature. The formic acid cell continuously produced formic acid at concentrations beginning at about 20 wt %, which declined to about 15 wt % after about 550 hours of run time. Some variability in the periodically measured formic acid concentration during the run was partly due to small flow variations in the DI water syringe pump and in the formic acid analysis using a GC-MS method, where the formic acid was converted into the ethyl formate ester and analyzed in the GC-MS. The pH of the formic acid product solutions from the cell was less than a pH of 2.0, with a pH range of about 1.3 to 1.7. One measurement of the cathode compartment gas had a gas composition of about 9.5 volume % $H_2$ and 4.8 volume % CO with the remainder being excess $CO_2$.

SPECIFIC EXAMPLE 20

The cell assembly was the same as in Specific Example 16. The cell was operated in a constant voltage mode at a 3.5 V cell voltage. About 20 ml of 0.5 M $K_2SO_4$ solution with a pH of about 3 (adjusted using $H_2SO_4$) was recirculated into the cell central flow compartment using a peristaltic pump using an external 50 ml volume collection bottle. The DI water anode compartment anolyte product was passed into an external 50 ml collection bottle and was recycled back to the anode compartment using a peristaltic pump. The cell current density increased with time, and approached a current density of 255 $mA/cm^2$ after 3 hours operation at ambient temperature. The formic acid cell produced 9.6 wt % formic acid after 3 hours. The cell cathode potential was measured during this experiment to be −0.9 V with respect to an Ag/AgCl reference electrode, equivalent to less −0.68 V vs. the standard hydrogen electrode (SHE).

COMPARATIVE EXAMPLE 4

The formic acid cell assembly was the same as in Specific Example 16 except that no anion exchange membrane (PSTMIM-DVB) was used between the cell central flow compartment and the tin catalyst GDE cathode. The cell central flow compartment contained no ion exchange media. The cell was operated at a constant voltage mode at a 3.5 V cell voltage. About 20 ml of a 0.5 M $K_2SO_4$ solution with a pH of about 3 (adjusted using $H_2SO_4$) was recirculated into the cell central flow compartment using a peristaltic pump and external 50 ml collection bottle. The DI water anolyte was passed to an external 50 ml bottle and recycled back to the anode using a peristaltic pump. The current density increased with time and approached a current density of 368 mA/cm$^2$ after 3 hours operation at ambient temperature. However, the dominant cathode product was hydrogen, as measured by GC, and only a trace amount of formic acid was detected in the recirculated central flow compartment product solution.

COMPARATIVE EXAMPLE 5

The formic acid cell assembly was the same as in Specific Example 16. Instead of using a PSTMIM-DVB anion membrane, an AMI-7001S anion exchange membrane (strong base form, Membranes International Inc.) was used between the cell central flow compartment and the tin catalyst GDE cathode. The cell was operated at a constant voltage mode at a 3.5 V cell voltage at ambient temperature. About 20 ml of a 0.5 M $K_2SO_4$ solution with pH of about 3 (adjusted using $H_2SO_4$) was recirculated into the cell central flow compartment using a peristaltic pump and external 50 ml collection bottle. The DI water anolyte was passed to an external 50 ml bottle and recycled back to the anode using a peristaltic pump. The maximum cell current was only about 6 mA, showing no sign of current increase after 4 hours of operation.

COMPARATIVE EXAMPLE 6

The formic acid cell assembly was the same as in Specific Example 16. Instead of using a PSTMIM-DVB membrane, an ACM anion exchange membrane (weak base form, ASTOM Corporation) was used between the cell central flow compartment and the tin catalyst GDE cathode. The cell was operated at a constant voltage mode at a 3.5 V cell voltage at ambient temperature. About 20 ml of a 0.5 M $K_2SO_4$ solution with pH of about 3 (adjusted using $H_2SO_4$) was recirculated into the cell central flow compartment using a peristaltic pump and external 50 ml collection bottle. The DI water anolyte was passed to an external 50 ml bottle and recycled back to the anode using a peristaltic pump. The maximum cell current was only about 2 mA, showing no sign of current increase after 4 hours of operation.

The examples given above are merely illustrative and are not meant to be an exhaustive list of all possible embodiments, applications or modifications of the present electrochemical device. Thus, various modifications and variations of the described methods and systems of the invention will be apparent to those skilled in the art without departing from the scope and spirit of the invention. Although the invention has been described in connection with specific embodiments, it should be understood that the invention as claimed should not be unduly limited to such specific embodiments. Indeed, various modifications of the described modes for carrying out the invention that are obvious to those skilled in the chemical arts or in the relevant fields are intended to be within the scope of the appended claims.

While particular elements, embodiments and applications of the present invention have been shown and described, it will be understood that the invention is not limited thereto since modifications can be made by those skilled in the art without departing from the scope of the present disclosure, particularly in light of the foregoing teachings.

What is claimed is:

1. An electrochemical device for converting $CO_2$ to a reaction product, the device comprising:
   (a) an anode comprising a quantity of anode catalyst, said anode having an anode reactant introduced thereto via at least one anode reactant flow channel;
   (b) a cathode comprising a quantity of cathode catalyst, said cathode having a cathode reactant introduced thereto via at least one cathode reactant flow channel;
   (c) a central flow compartment, located between said anode and said cathode having an inlet solution feed and an outlet solution product output;
   (d) a cation exchange membrane interposed between said anode and said central flow compartment;
   (e) an anion exchange membrane interposed between said central flow compartment and said cathode; and
   (f) a source of electrical energy that applies a potential difference across the anode and the cathode,
   wherein said cathode is encased in a cathode chamber and at least a portion of the cathode catalyst is directly exposed to gaseous CO2 during electrochemical conversion of the CO2 to the reaction product, and wherein the anion exchange membrane comprises a polymer in which at least one constituent monomer is (p-vinylbenzyl)-R, where R is selected from the group consisting of positively charged cyclic amines, imidazoliums, pyridiniums and phosphoniums, and wherein said polymer comprises 15% - 90% by weight of polymerized (p-vinylbenzyl)-R.

2. The electrochemical device of claim 1, wherein said central flow compartment comprises an acidic medium.

3. The electrochemical device in claim 2, wherein the device satisfies a test comprising:
   (1) with said anode open to atmospheric air, introducing a stream of $CO_2$ humidified at 50° C. into the cathode chamber while the device is at room temperature and atmospheric pressure;
   (2) applying a potential difference of 3.5 V across a cell via an electrical connection between said anode and said cathode with the device at room temperature;
   (3) measuring the current across the cell and the concentration and production rates of formic acid in the central flow compartment and production rate of CO and $H_2$ at the exit of said cathode chamber;
   (4) calculating the formate ion selectivity, Selectivity$_{FO}$, as follows:

$$Selectivity_{FO} = \frac{\text{(Formate ion production rate)}}{\text{(CO production rate} + H_2 \text{ production rate} + \text{Formate ion production rate)}}$$

where the CO, $H_2$ and formate ion production rates are measured in moles per minute leaving the electrolyzer;

(5) performing steps (1)-(4) with room temperature water being directed to said anode; and (6) determining that the device has satisfied the test if the average current density at the membrane is at least 20 mA/cm$^2$, where the cm$^2$ is measured as the area of the cathode gas diffusion layer on which the catalyst is disposed, and formate ion selectivity is at least 25% at a cell potential difference of 3.5 V.

4. The electrochemical device in claim 1, wherein at least 50% by mass of the cathode catalyst is directly exposed to gaseous CO$_2$ during electrochemical conversion of the CO$_2$ to the reaction product.

5. The electrochemical device of claim 4, wherein the gaseous CO$_2$ is directed within 2 mm of the cathode catalyst or the gas diffusion layer on which the cathode catalyst is disposed.

6. The electrochemical device in claim 5, wherein at least 90% by mass of the cathode catalyst is directly exposed to gaseous CO$_2$ during electrochemical conversion of the CO$_2$ to the reaction product.

7. The electrochemical device in claim 1, wherein the central flow compartment contains a structure comprising an ion exchange resin.

8. The electrochemical device of claim 1, wherein at least a portion of said anion exchange membrane is a Helper Membrane identifiable by applying a test comprising:

(1) preparing a cathode comprising 6 mg/cm$^2$ of silver nanoparticles on a carbon fiber paper gas diffusion layer;

(2) preparing an anode comprising 3 mg/cm$^2$ of RuO$_2$ on a carbon fiber paper gas diffusion paper;

(3) preparing a polymer electrolyte membrane test material;

(4) interposing the membrane test material between the anode and the cathode, the side of cathode having the silver nanoparticles disposed thereon facing one side of the membrane and the side of the anode having RuO$_2$ disposed thereon facing the other side of the membrane, thereby forming a membrane electrode assembly;

(5) mounting the membrane electrode assembly in a fuel cell hardware assembly having cathode reactant flow channels and anode reactant flow channels;

(6) directing a stream of CO$_2$ humidified at 50° C. into the cathode reactant flow channels while the fuel cell hardware assembly is at room temperature and atmospheric pressure, with the anode reactant flow channels left open to the atmosphere at room temperature and pressure;

(7) applying a potential difference of 3.0 V across the cell via an electrical connection between the anode and the cathode;

(8) measuring the current across the cell and the concentration of CO and H$_2$ at the exit of the cathode flow channel;

(9) calculating the CO selectivity as follows:

$$\text{Selectivity} = \frac{(\text{CO production rate})}{(\text{CO production rate} + H_2 \text{ production rate})};$$

and where the CO and H$_2$ production rates are measured in moles per minute leaving the electrolyzer;

(10) identifying the membrane as a Helper Membrane if the average current density at the membrane is at least 20 mA/cm$^2$, where the cm$^2$ is measured as the area of the cathode gas diffusion layer that is covered by catalyst particles, and CO selectivity is at least 50% at a cell potential difference of 3.0 V.

9. The electrochemical device of claim 8, wherein the anion exchange membrane is entirely a Helper Membrane.

10. The electrochemical device of claim 1, wherein said anion exchange membrane comprises a polymer comprising at least one of:
(a) a positive charged cyclic amine,
(b) an imidazolium,
(c) a pyridinium,
(d) a guanidinium, and
(e) a phosphonium.

11. The electrochemical device of claim 1, wherein:
(a) said anode catalyst is applied as a coating on said cation exchange membrane, or as a coating on a substrate, wherein said anode catalyst is facing said cation exchange membrane, and
(b) said cathode catalyst is applied as a coating on said anion exchange membrane, or as a coating on a substrate, wherein said cathode catalyst is facing said anion exchange membrane.

12. The electrochemical device of claim 1, wherein the potential difference is 5 V or less.

13. The electrochemical device of claim 1, wherein the reaction product is selected from the group consisting of CO, HCO$^-$, H$_2$CO, (HCO$_2$)$^-$, H$_2$CO$_2$, CH$_3$OH, CH$_4$, C$_2$H$_4$, CH$_3$CH$_2$OH, CH$_3$COO$^-$, CH$_3$COOH, C$_2$H$_6$, (COOH)$_2$, (COO$^-$)$_2$, H$_2$C=CHCOOH, and CF$_3$COOH.

14. The electrochemical device of claim 1, wherein the cathode catalyst further comprises a Catalytically Active Element.

15. The electrochemical device of claim 14, wherein said Catalytically Active Element is selected from the group: Au, Ag, Cu, Sn, Sb, Bi, Pb, Zn and In.

16. The electrochemical device of claim 1, wherein said anion exchange polymer comprises a membrane in which at least one constituent monomer is styrene.

17. The electrochemical device of claim 16, wherein said anion exchange membrane further comprises at least one of a polyolefin, a chlorinated polyolefin, a fluorinated polyolefin, and a polymer comprising at least one of cyclic amines, phenyls, nitrogen and carboxylate (—COO—) groups in its repeating unit.

18. The electrochemical device of claim 1, wherein said anion exchange membrane has a thickness of 25-1000 micrometers.

19. The electrochemical device of claim 18, wherein said anion exchange membrane further comprises a copolymer of at least one of methyl methacrylate and butylacrylate.

20. The electrochemical device of claim 1, wherein R is selected from at least one of:
(a) imidazoliums of the formula:

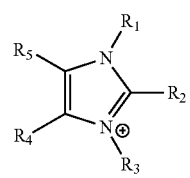

where R$_1$-R$_5$ are each independently selected from the group consisting of hydrogen, halides, linear alkyls, branched alkyls, cyclic alkyls, heteroalkyls, aryls, heteroaryls, alkylaryls, heteroalkylaryls, and polymers thereof;

(b) pyridiniums of the formula:

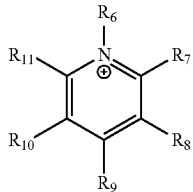

where $R_6$-$R_{11}$ are each independently selected from the group consisting of hydrogen, halides, linear alkyls, branched alkyls, cyclic alkyls, heteroalkyls, aryls, heteroaryls, alkylaryls, heteroalkylaryls, and polymers thereof; and (c) phosphoniums of the formula:

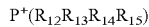

where $R_{12}$-$R_{15}$ are each independently selected from the group consisting of hydrogen, halides, linear alkyls, branched alkyls, cyclic alkyls, heteroalkyls, aryls, heteroaryls, alkylaryls, heteroalkylaryls, and polymers thereof.

21. The electrochemical device of claim 20 wherein R is an imidazolium, pyridinium or polymer thereof wherein no aromatic nitrogen is attached to hydrogen.

22. An electrochemical device for converting $CO_2$ to a reaction product, the device comprising:
(a) an anode comprising a quantity of anode catalyst, said anode having an anode reactant introduced thereto via at least one anode reactant flow channel;
(b) a cathode comprising a quantity of cathode catalyst, said cathode having a cathode reactant introduced thereto via at least one cathode reactant flow channel;
(c) a central flow compartment, located between said anode and said cathode having an inlet solution feed and an outlet solution product output;
(d) a cation exchange membrane interposed between said anode and said central flow compartment; and
(e) an anion exchange membrane interposed between said central flow compartment and said cathode;
wherein said cathode is encased in a cathode chamber and at least a portion of the cathode catalyst is directly exposed to gaseous $CO_2$ during conversion of $CO_2$ to a reaction product, wherein the cathode comprises a cathode catalyst layer comprising an anion exchange polymer, and wherein the anion exchange polymer of the cathode catalyst layer comprises a polymer in which at least one constituent monomer is (p-vinylbenzyl)-R, where R is selected from the group consisting of imidazoliums, pyridiniums and phosphoniums, and where said polymer comprises 15% - 90% by weight of polymerized (p-vinylbenzyl)-R.

23. The electrochemical device of claim 22 wherein the reaction current is higher with the anion exchange polymer in the cathode catalyst layer than without the anion exchange polymer in the cathode catalyst layer.

24. The electrochemical device of claim 22 wherein the selectivity to a desired product is higher with the anion exchange polymer in the cathode catalyst layer than without the anion exchange polymer in the cathode catalyst layer.

25. The electrochemical device of claim 22, wherein the $CO_2$ reaction product is selected from the group consisting of CO, $HCO^-$, $H_2CO$, $(HCO_2)^-$, $H_2CO_2$, $CH_3OH$, $CH_4$, $C_2H_4$, $CH_3CH_2OH$, $CH_3COO^-$, $CH_3COOH$, $C_2H_6$, $(COOH)_2$, $(COO^-)_2$, $H_2C=CHCOOH$, and $CF_3COOH$.

26. The electrochemical device of claim 25, wherein the $CO_2$ reaction product is the formate ion or formic acid.

27. The electrochemical device of claim 22, wherein said cathode catalyst further comprises a Catalytically Active Element.

28. The electrochemical device of claim 27, wherein said Catalytically Active Element is selected from the group consisting of Au, Ag, Cu, Sn, Sb, Bi, Pb, Zn and In.

29. The electrochemical device of claim 22, wherein said anion exchange polymer comprises a polymer in which at least one constituent monomer is styrene.

30. The electrochemical device of claim 22, wherein the anion exchange polymer of the cathode catalyst layer further comprises a copolymer of at least one of methyl methacrylate and butylacrylate.

31. The electrochemical device of claim 22, wherein the anion exchange polymer of the cathode catalyst layer further comprises at least one of a polyolefin, a chlorinated polyolefin, a fluorinated polyolefin, and a polymer comprising at least one of cyclic amines, phenyls, nitrogen and carboxylate (—COO—) groups in its repeating unit.

32. The electrochemical device of claim 22, wherein R is selected from at least one of:
(a) imidazoliums of the formula:

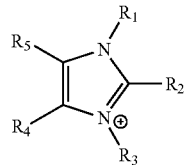

where $R_1$-$R_5$ are each independently selected from the group consisting of hydrogen, halides, linear alkyls, branched alkyls, cyclic alkyls, heteroalkyls, aryls, heteroaryls, alkylaryls, heteroalkylaryls, and polymers thereof;

(b) pyridiniums of the formula:

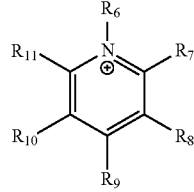

where $R_6$-$R_{11}$ are each independently selected from the group consisting of hydrogen, halides, linear alkyls, branched alkyls, cyclic alkyls, heteroalkyls, aryls, heteroaryls, alkylaryls, heteroalkylaryls, and polymers thereof; and (c) phosphoniums of the formula:

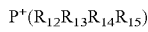

where $R_{12}$-$R_{15}$ are each independently selected from the group consisting of hydrogen, halides, linear alkyls, branched alkyls, cyclic alkyls, heteroalkyls, aryls, heteroaryls, alkylaryls, heteroalkylaryls, and polymers thereof.

33. The electrochemical device of claim 32, wherein R is an imidazolium, pyridinium or polymer thereof, wherein no aromatic nitrogen is attached to hydrogen.

34. The electrochemical device of claim 22, wherein the anion exchange membrane interposed between said central flow compartment and said cathode has a thickness of 25-1000 micrometers.

* * * * *